United States Patent
Yamamura et al.

(10) Patent No.: US 11,925,865 B2
(45) Date of Patent: Mar. 12, 2024

(54) STORAGE MEDIUM, GAME APPARATUS AND GAME CONTROL METHOD

(71) Applicant: NINTENDO CO., LTD., Kyoto (JP)

(72) Inventors: Tomohiro Yamamura, Kyoto (JP); Kodai Matsumoto, Kyoto (JP); Shinya Saito, Kyoto (JP); Hiroyuki Takahashi, Tokyo (JP); Shugo Takahashi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/495,230

(22) Filed: Oct. 6, 2021

(65) Prior Publication Data

US 2022/0168643 A1 Jun. 2, 2022

(30) Foreign Application Priority Data

Dec. 2, 2020 (JP) .................................. 2020-200081

(51) Int. Cl.
*A63F 13/56* (2014.01)
(52) U.S. Cl.
CPC .................................. *A63F 13/56* (2014.09)
(58) Field of Classification Search
CPC ....... A63F 13/56; A63F 13/812; A63F 13/573
See application file for complete search history.

(56) References Cited

U.S. PATENT DOCUMENTS

| 7,270,601 | B2 | 9/2007 | Takahashi et al. | |
| 2012/0077557 | A1* | 3/2012 | Miki | A63F 13/426 |
| | | | | 463/3 |
| 2013/0316819 | A1* | 11/2013 | Kinashi | A63F 13/795 |
| | | | | 463/31 |
| 2015/0294491 | A1* | 10/2015 | Nungester | G06F 3/0354 |
| | | | | 345/173 |

FOREIGN PATENT DOCUMENTS

JP 4213011 1/2009

* cited by examiner

*Primary Examiner* — Thomas H Henry
(74) *Attorney, Agent, or Firm* — Nixon & Vanderhye, PC

(57) ABSTRACT

A non-limiting example game system includes a processor incorporated in a main body apparatus, and the processor makes a first index image move toward an upper end from a lower end in a movement gauge in a parameter determination screen when a player starts a second parameter determination operation. When the first index image is stopped according to an operation of the player, a hitting power for a ball is determined based on the stopped position. Moreover, if the first index image is stopped, a second index image is moved up to a position that the first index image is stopped from the lower end in the movement gauge. The player performs a direction input during a direction input period that is a period of time that the second index image is being moved. Then, a trajectory after the ball starts moving is changed in a direction based on the direction input. For example, when a parabola that becomes a reference when hitting the ball is used as a reference trajectory, and this reference trajectory is changed based on the direction input.

20 Claims, 32 Drawing Sheets

IN BASIC AREA

IN BASIC AREA AND RISK AREA

FIG. 15A

DIRECTION INPUTS FOR EACH FRAME

| NUMBER OF OPERATION FRAMES | 1 | 2 | 3 | ... | p | p+1 | ... | pmax |
|---|---|---|---|---|---|---|---|---|
| VERICAL DIRECTION | 0.2 | 0.1 | 0 | ... | 0.1 | 0.1 | ... | 0 |
| HORIZONTAL DIRECTION | 0.8 | 0.9 | 1.0 | ... | 0.9 | -0.9 | ... | -1.0 |

FIRST OPERATION SECTION (columns 1 through p)
SECOND, THIRD AND FOURTH OPERATION SECTIONS (columns p+1 through pmax)

UP, RIGHT: POSITIVE NUMBER
DOWN, LEFT: NEGATIVE NUMBER

FIG. 15B

AVERAGED DIRECTION INPUTS

| NUMBER OF OPERATION FRAMES | 1 | 2 | 3 | ... | p | p+1 | ... | pmax |
|---|---|---|---|---|---|---|---|---|
| VERTICAL DIRECTION | 0.1 | 0.1 | 0.1 | ... | 0.1 | 0.1 | ... | 0 |
| HORIZONTAL DIRECTION | 0.9 | 0.9 | 0.9 | ... | 0.9 | -0.9 | ... | -1.0 |

FIRST OPERATION SECTION (columns 1 through p)
SECOND, THIRD AND FOURTH OPERATION SECTIONS (columns p+1 through pmax)

FIG. 16

CORRESPONDENCE TABLE

| NUMBER OF MOVING FRAMES | 1 | 2 | 3 | ... | n | ... | nmax |
|---|---|---|---|---|---|---|---|
| HORIZONTAL DISTANCE | $d_1$ | $d_2$ | $d_3$ | ... | $d_n$ | ... | $d_m$ |

FIG. 23

```
         DATA STORAGE AREA    854
        ┌─────────────────────────────┐  854a
        │      OPERATION DATA         │
        ├─────────────────────────────┤  854b
        │   IMAGE GENERATION PROGRAM  │
        ├─────────────────────────────┤  854c
        │      CHARACTER DATA         │
        ├─────────────────────────────┤  854d
        │         GAME DATA           │
        ├─────────────────────────────┤  854e
        │   HITTING POWER VALUE DATA  │
        ├─────────────────────────────┤  854f
        │       DEVIATION DATA        │
        ├─────────────────────────────┤  854g
        │    DIRECTION INPUT DATA     │
        ├─────────────────────────────┤  854h
        │       STRENGTH DATA         │
        ├─────────────────────────────┤  854i
        │  CORRESPONDENCE TABLE DATA  │
        ├─────────────────────────────┤  854j
        │  CORRESPONDENCE RANGE DATA  │
        ├─────────────────────────────┤  854k
        │      BALL POSITION DATA     │
        ├─────────────────────────────┤  854m
        │    HIGHLIGHTING TARGET DATA │
        ├─────────────────────────────┤  854n
        │ FIRST PARAMETER DETERMINATION FLAG │
        ├─────────────────────────────┤  854p
        │ SECOND PARAMETER DETERMINATION FLAG│
        ├─────────────────────────────┤  854q
        │     BALL MOVEMENT FLAG      │
        ├─────────────────────────────┤
        │            ⋮                │
        └─────────────────────────────┘
```

STORAGE MEDIUM, GAME APPARATUS AND GAME CONTROL METHOD

CROSS REFERENCE OF RELATED APPLICATION

This application claims priority to Japanese Patent Application No. 2020-200081 filed on Dec. 2, 2020, and the entire contents of which are incorporated herein by reference.

FIELD

This application describes a storage medium, a game apparatus and a game control method, and more specifically, describes a storage medium, a game apparatus and a game control method, in which a trajectory of a moving object is made to be changed.

SUMMARY

It is a principal object of an embodiment(s) to provide a novel storage medium, game system and game control method.

Moreover, it is another object of the embodiment(s) to provide a storage medium, game system and game control method, capable of improving interest of game.

A first embodiment is a non-transitory computer-readable storage medium storing a game program, which is for a sports game that is advanced by moving a moving object according to a player operation, executable by a computer provided with one or more processors, wherein the game program causes the one or more processors to execute: determining a parameter for moving the moving object when started according to a player operation; detecting, during a predetermined period of time in a time that the parameter is being determined, a player operation indicative of a temporal direction input for determining a change of a trajectory after starting of movement of the moving object; and moving the moving object based on a detected player operation indicative of the temporal direction input after determination of the parameter while reflecting the temporal direction input onto the trajectory.

According to the first embodiment, since the moving object is moved while temporally reflecting the temporal direction input within a predetermined period of time in the time of executing determining the parameter for moving the moving object, it is possible to cause the player to interest in the direction input itself, and also in what occurs the trajectory of the moving object. That is, it is possible to make the player have interest continuously. Therefore, it is possible to improve interest of game.

A second embodiment is the storage medium according to the first embodiment, wherein the game program further causes the one or more processors to execute: setting a movement distance parameter related to a movement distance of the moving object, and making the predetermined period of time longer as a set movement distance parameter is larger.

According to the second embodiment, the larger the movement distance, the longer the predetermined period of time, so that the temporal direction input can be performed for a long time. Therefore, it is possible to improve the interest of game.

A third embodiment is the storage medium according to the first embodiment, wherein the game program further causes the one or more processors to execute: setting a movement distance parameter related to a movement distance of the moving object; moving a first index indicative of the movement distance parameter toward one end from an initial position; stopping the first index according to an operation of the player; and making the predetermined period of time longer as a distance between the initial position and a stop position that the first index is stopped is larger.

A fourth embodiment is the storage medium according to the third embodiment, wherein the game program further causes the one or more processors to execute: moving a second index for the temporal direction input toward at least the stop position from the initial position when the movement distance parameter is made to be set; and detecting a player operation indicative of the temporal direction input until the second index is moved from the initial position to the stop position.

According to the fourth embodiment, since the second index is moved, it is possible to easily know a period of time that the direction input can be performed. Therefore, operability is good.

A fifth embodiment is the storage medium according to the fourth embodiment, wherein the game program further causes the one or more processors to execute displaying a designation image indicative of a detected temporal direction input on a display portion, superposed with or along a movement path of the second index.

According to the fifth embodiment, since the designation image indicative of the detected temporal direction input is displayed, it is possible to perform the direction input taking into consideration whether the moving object moves on what type of trajectory.

A sixth embodiment is the storage medium according to the fifth embodiment, wherein the game program further causes the one or more processors to execute displaying the designation image by a number smaller than a number of the temporal direction inputs represented by the detected player operation.

According to the sixth embodiment, since the number of displaying the designation images is made less than the number of the detected direction inputs, a moving direction of the moving object is easily understood.

A seventh embodiment is the storage medium according to the fifth embodiment, wherein the designation image indicates a section direction input that is a single direction input that is determined, in each of a plurality of sections in the predetermined period of time, based on a plurality of temporal direction inputs.

An eighth embodiment is the storage medium according to the seventh embodiment, wherein the game program causes the one or more processors to execute determining the section direction input based on strength of a plurality of temporal direction inputs in the section.

According to the eighth embodiment, since the strength of the direction input is also taken into consideration, it is possible to variably set a magnitude of change reflected into the trajectory.

A ninth embodiment is the storage medium according to the eighth embodiment, wherein the game program further causes the one or more processors to execute: applying strength that is determined based on the strength of the temporal direction input to the section direction input designated by the designation image; and classifying applied strength into a plurality of classifications that are set according to strength.

According to the ninth embodiment, since the strength is classified into a plurality of classifications, it is possible to know the strength of the direction input intuitively.

A tenth embodiment is the storage medium according to the fifth embodiment, wherein the game program further causes the one or more processors to execute: displaying a gauge for determining the stop position of the first index on the display portion, the gauge including the initial position and the one end for moving the first index, and being divided in advance corresponding to a plurality of sections; and displaying the designation image for each of divided areas of the gauge.

According to the tenth embodiment, since it is possible to stop the first index in consideration of not only the hitting power but also how much the direction input is to be performed by displaying the first index from the beginning, the strategic characteristic of game can also be improved.

An eleventh embodiment is the storage medium according to the tenth embodiment, wherein the game program further causes the one or more processors to execute shortening the predetermined period of time in a case where the first index is stopped in a middle of the divided area in comparison with a case where the first index is stopped at a trailing end of the division area.

A twelfth embodiment is the storage medium according to the fifth embodiment, wherein the game program further causes the one or more processors to execute setting a number of the plurality of sections according to at least one of a type of a character that the player uses, ability of the character and an item that the character uses.

According to the twelfth embodiment, since the number of the plurality of sections is set according to the type of the character to be used, etc., it is possible to select a character to be used or an item to be used according to an operation ability of the player or/and strategy.

A thirteenth embodiment is the storage medium according to the fifth embodiment, wherein the game program further causes the one or more processors to execute highlighting the designation image corresponding to a position of the moving object under movement.

According to the thirteenth embodiment, since the designation image is highlighted during movement of the moving object, it is possible to easily confirm that the moving object is moving in a direction that the direction input indicates.

A fourteenth embodiment is the storage medium according to the tenth embodiment, wherein the game program further causes the one or more processors to execute highlighting the section corresponding to a position of the moving object under movement.

According to the fourteenth embodiment, it is possible to easily know the moving object is moving at a position corresponding to which section.

A fifteenth embodiment is the storage medium according to the seventh embodiment, wherein the game program further causes the one or more processors to execute, on assumption that a distance that the first index is moved from the initial position to a position that the first index is stopped corresponds to a straight-line distance of the reference trajectory of the moving object, reflecting changes due to a plurality of temporal direction inputs within a target section including a position corresponding to a position of the reference trajectory in a time from the moving object starts moving into the trajectory of the moving object.

According to the fifteenth embodiment, it is possible to move the moving object in a direction of the direction input that is determined for each section.

A sixteenth embodiment is the storage medium according to the fifteenth embodiment, wherein the game program further causes the one or more processors to execute: replacing each of the plurality of temporal direction inputs with a corresponding section direction input for each of the plurality of sections; and reflecting changes due to a predetermined number of section direction inputs including the section direction input of a position corresponding to a position of the reference trajectory in a time from the moving object starts moving into the trajectory of the moving object.

A seventeenth embodiment is the storage medium according to the sixteenth embodiment, wherein the game program further causes the one or more processors to execute: replacing each of the plurality of temporal direction inputs with a corresponding section direction input for each of the plurality of sections; and reflecting changes due to a predetermined number of section direction inputs including the section direction input of a position corresponding to a position of the reference trajectory in a time from the moving object starts moving into the trajectory of the moving object.

According to the seventeenth embodiment, the trajectory of the moving object is smoothly changed even when straddling the sections.

An eighteenth embodiment is the storage medium according to the sixteenth embodiment, wherein the game program further causes the one or more processors to execute: determining the section direction input based on the strength of the plurality of temporal direction inputs in the section; and reflecting the change due to the section direction input into the trajectory of the moving object by using the strength.

According to the eighteenth embodiment, it is possible for the player to have interest to the direction input itself since the direction input is performed by taking the strength into consideration.

A nineteenth embodiment is the storage medium according to the second embodiment, wherein the game program further causes the one or more processors to execute enabling to increase ability related to movement of the moving object from next time by satisfying a predetermined condition, the predetermined condition including that the movement distance parameter that is set in the setting is less than a predetermined value.

According to the nineteenth embodiment, there occurs the strategic characteristic on whether priority is to be given to the movement distance or increase of the ability related to the movement, it is possible to improve the interest of game.

A twentieth embodiment is the storage medium according to the tenth embodiment, wherein the game program further causes the one or more processors to execute: reducing or expanding the gauge according to progress of the sports game: and moving the second index at a speed in proportion to length that is reduce or expanded.

According to the twentieth embodiment, the movement distance can be changed by reducing or expanding the gauge, and the second index is moved at the speed in proportion to the length of the gauge, and therefore, the predetermined period of time is not shortened. That is, operability is not impaired.

A twenty-first embodiment is a game apparatus that is executable a sports game that is advanced by moving a moving object according to a player operation, and provided with one or more processors, wherein the one or more processors execute: determining a parameter for moving the moving object when started according to a player operation; detecting, during a predetermined period of time in a time that the parameter is being determined, a player operation indicative of a temporal direction input for determining a change of a trajectory after starting of movement of the moving object; and moving the moving object based on a detected player operation indicative of the temporal direction input after determination of the parameter while reflecting the temporal direction input onto the trajectory.

A twenty-second embodiment is a game control method of a computer that is executable a sports game that is advanced by moving a moving object according to a player operation, comprising steps of: (a) determining a parameter for moving the moving object when started according to a player operation; (b) detecting, during a predetermined period in the step (a), a player operation indicative of a temporal direction input for determining a change of a trajectory after starting of movement of the moving object; and (c) moving the moving object based on a player operation indicative of the temporal direction input detected in the step (b) after the step (a) while reflecting the temporal direction input onto the trajectory.

According to the twenty-first embodiment and the twenty-second embodiment, similar to the first embodiment, it is possible to improve the interest of game.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 15A is a table showing a non-limiting example of a direction input for each frame, and FIG. 15B is a table showing a non-limiting example a direction input averaged for each operation section.

FIG. 16 is a view showing a non-limiting example correspondence table of a moving time on a reference trajectory and a horizontal distance.

FIG. 23 is a view showing a non-limiting example data storage area shown in FIG. 22.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
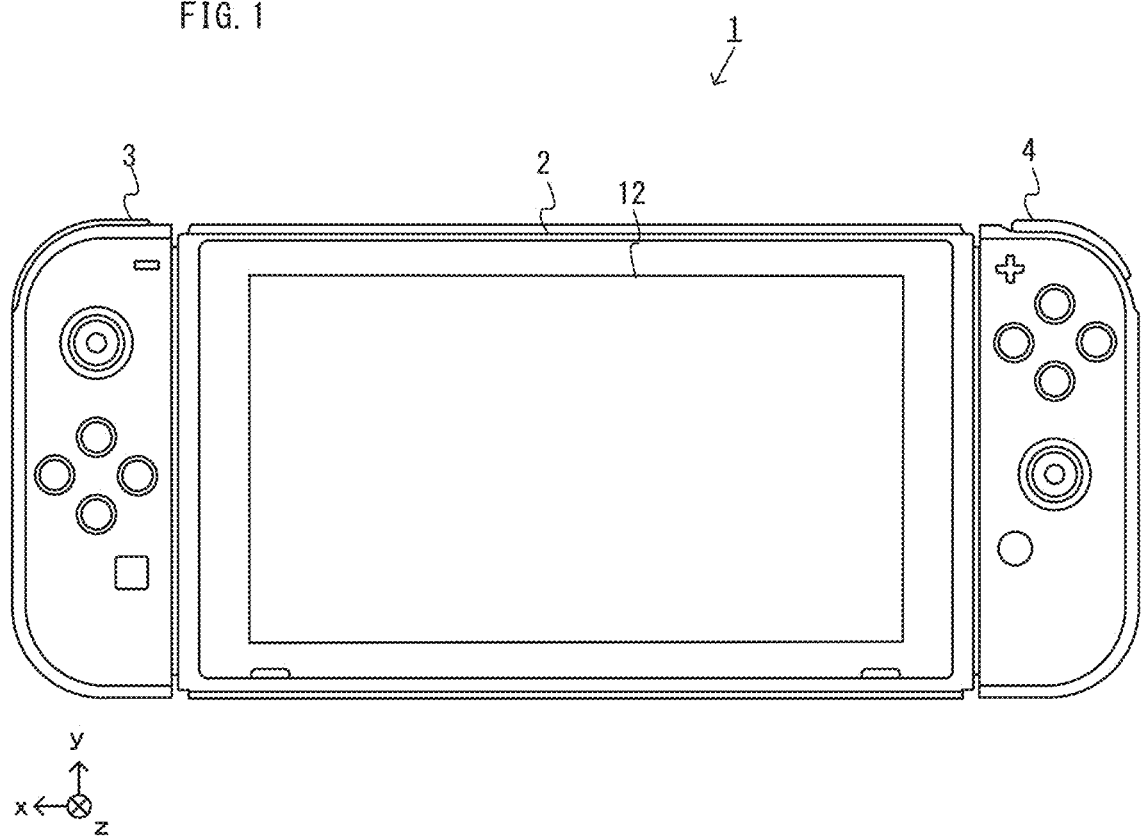
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
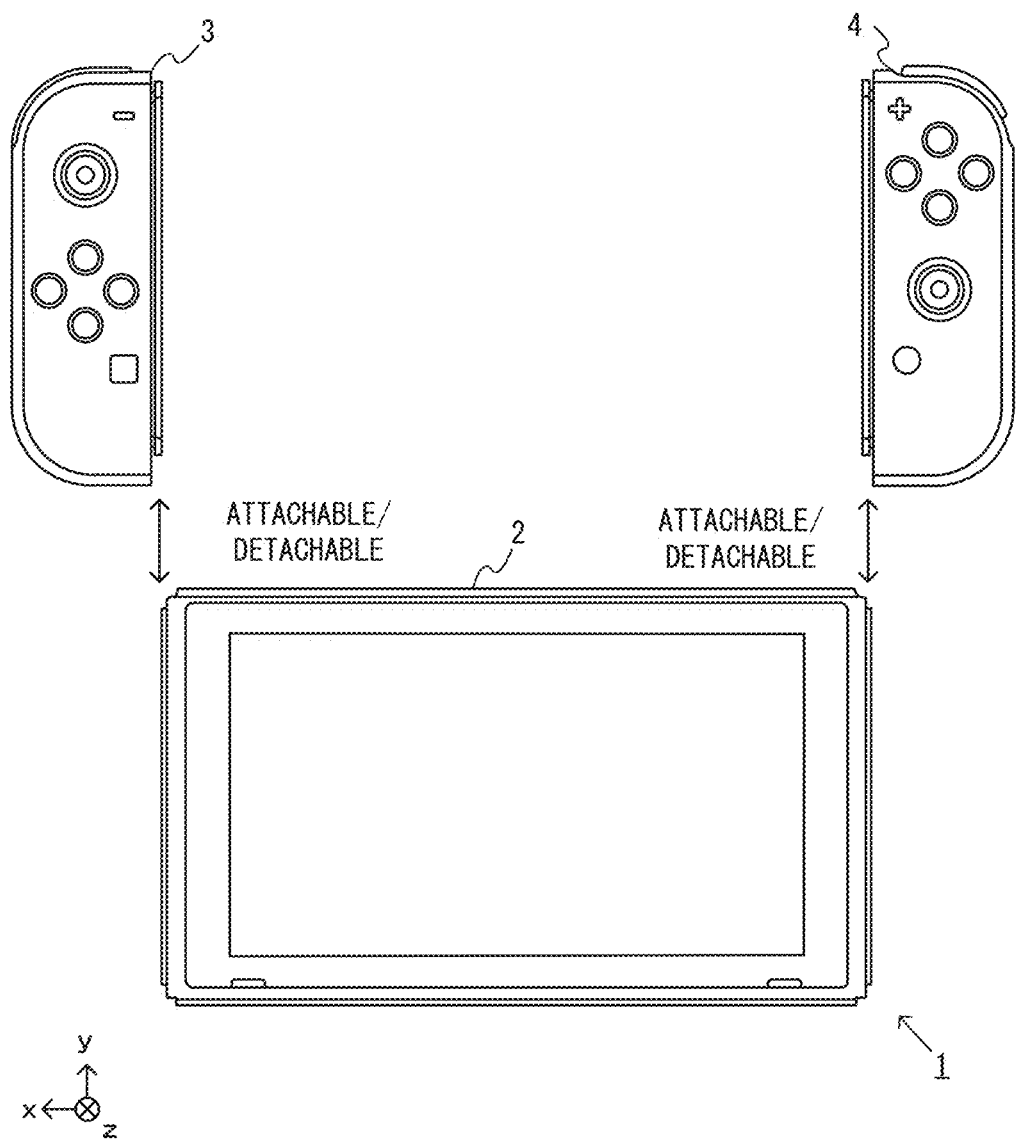
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
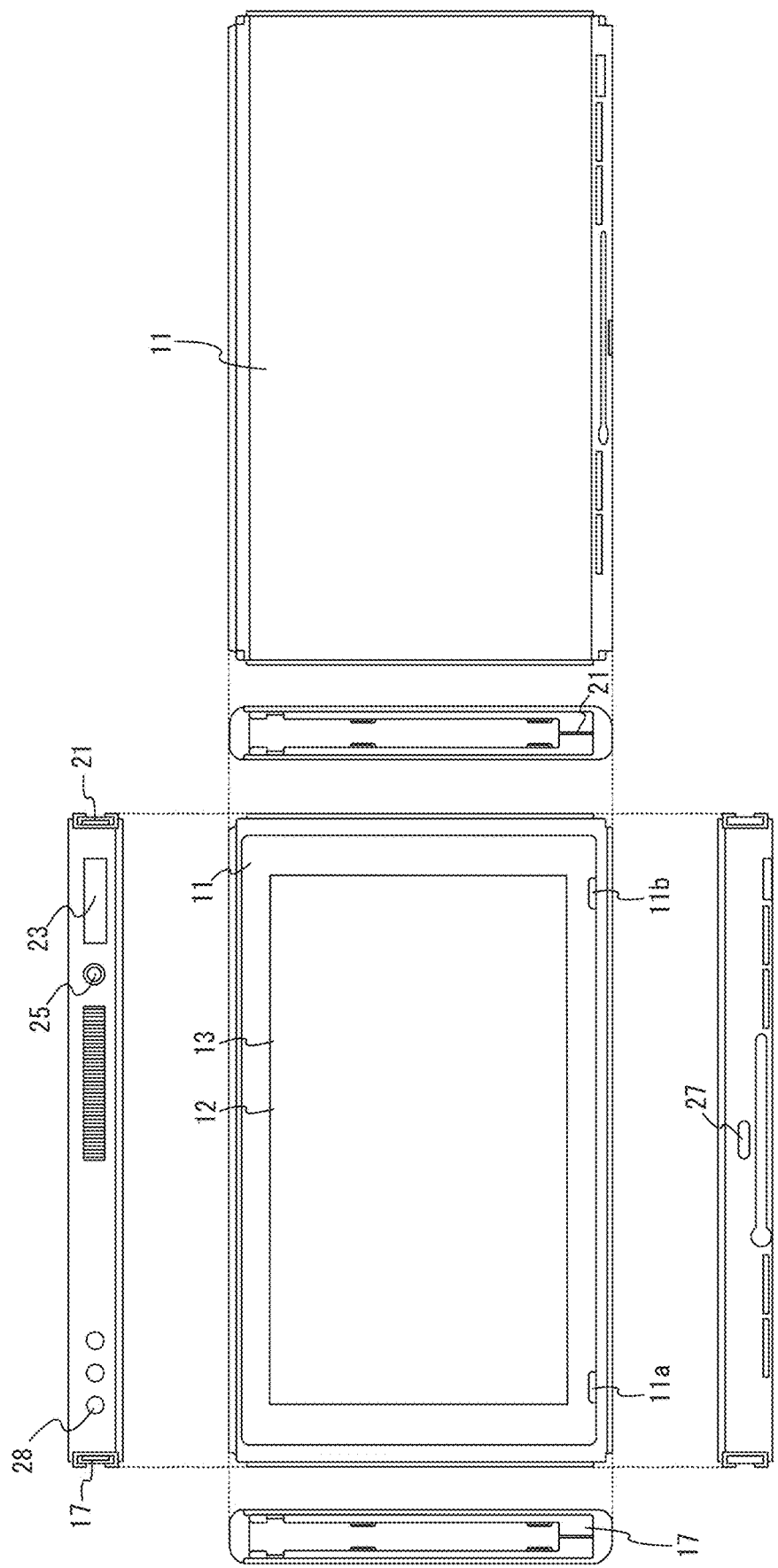
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
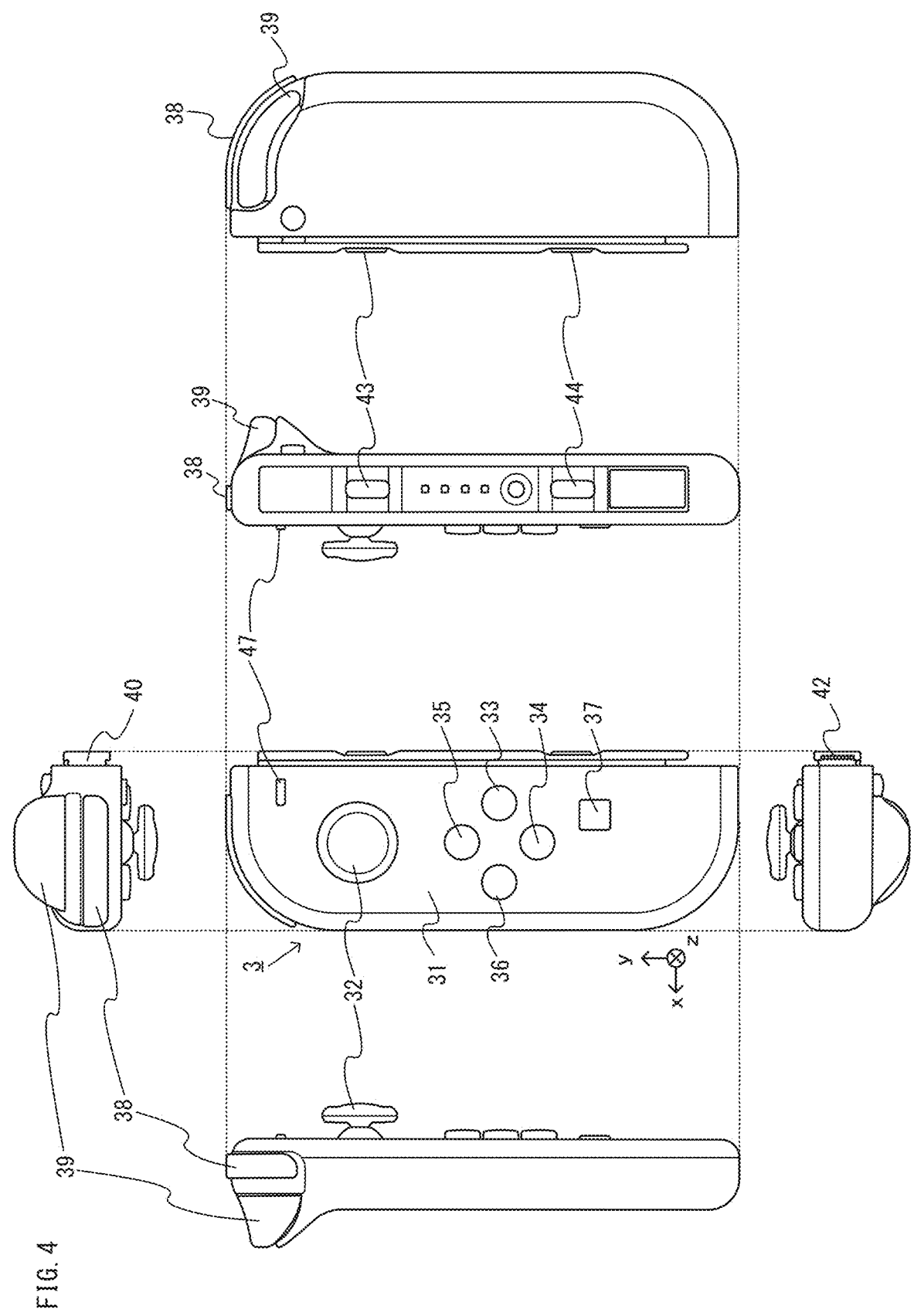
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
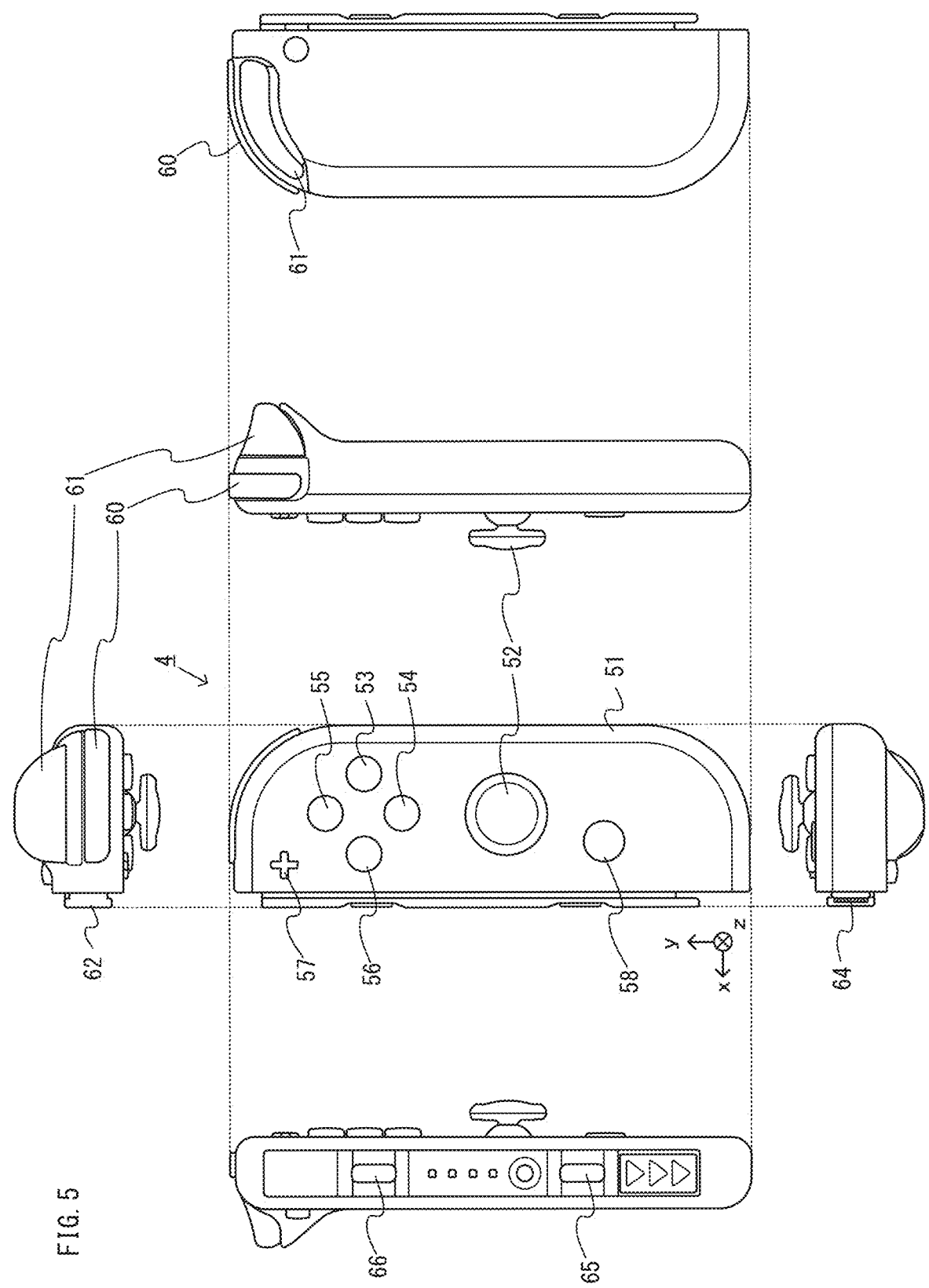
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
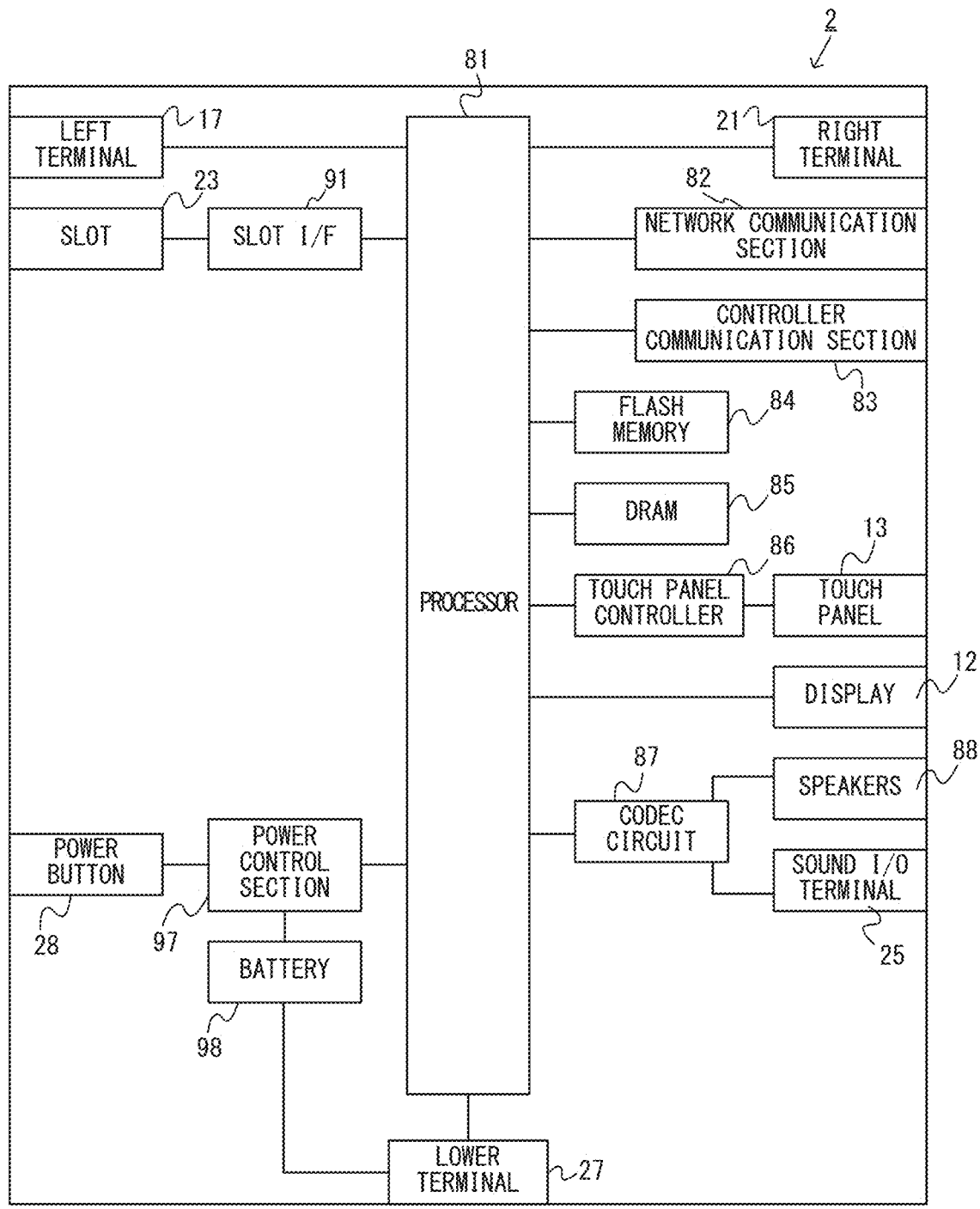
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
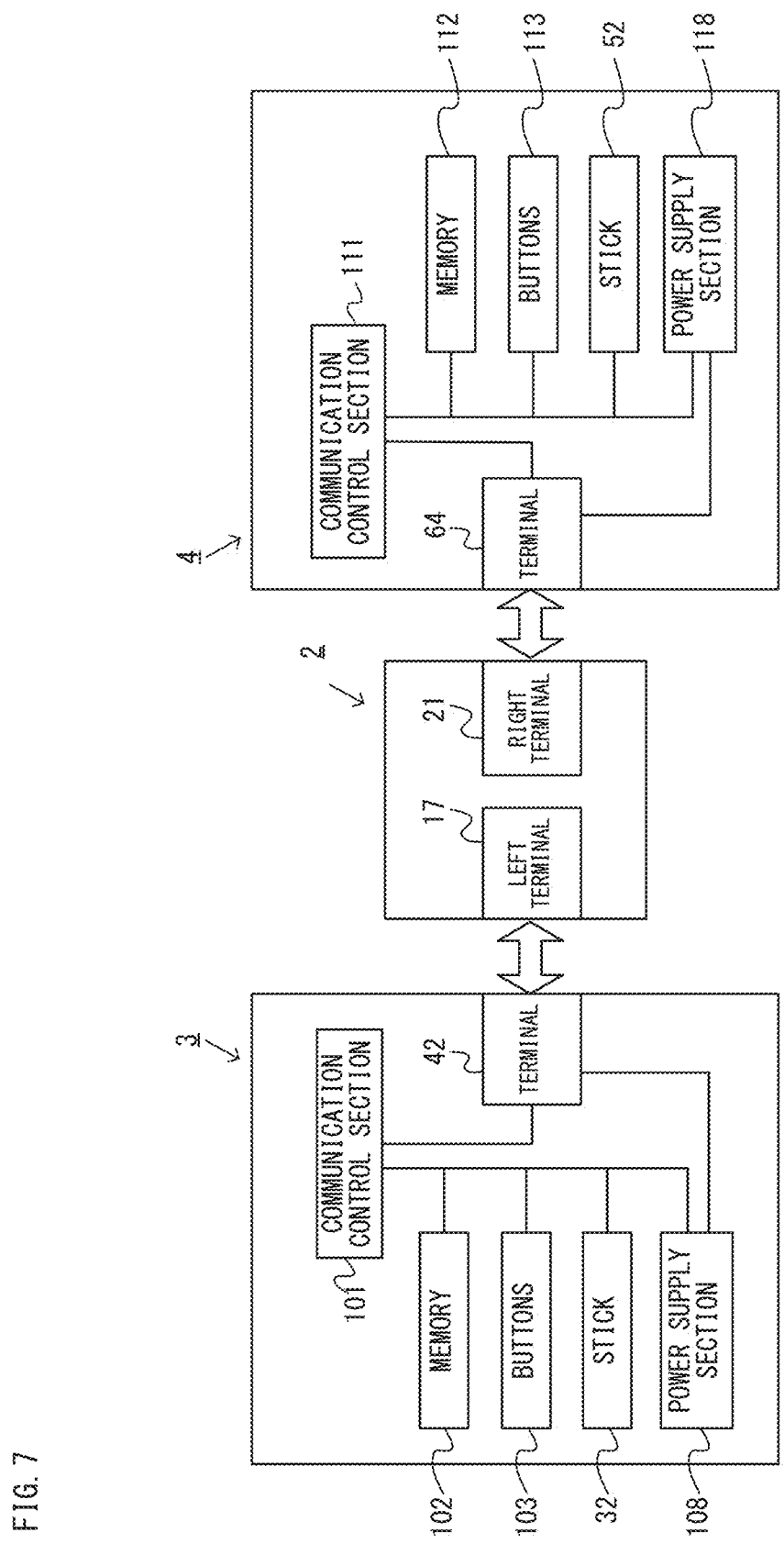
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined period of time. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Next, with reference to FIG. 8-FIG. 21, an outline of game processing of a virtual golf game executed in the game system 1 according this embodiment will be described. Although detailed description is omitted, in the virtual golf game, a player can perform stroke play alone or with another player (human player or computer player). However, it is possible to also play another golf game such as match play. In the following, a case where the player plays the golf game using a player character will be described, and since another player is the same as the player, duplicate description will be omitted.

In this embodiment, when starting a golf game application to be played, a type of the golf game to be played (stroke play or match play, for example) and a golf course to be played are selected, and a character to be used is also selected out of a plurality of characters. If such selections are ended, the golf game is started in response to an operation of the player or automatically.

Although detailed description is omitted, the plurality of characters are different from each other in appearance, and a maximum flight distance for each club is individually assigned to each of the plurality of characters.

The main body apparatus 2 functions also as an image processing apparatus, and generates and outputs (or displays) display image data corresponding to various kinds of screens such as a game image. The processor 81 arranges various kinds of objects and characters in a three-dimensional virtual space, and generates a certain sight or scene. An image taking (that is, viewing from a viewing point) this sight or scene by a virtual camera is displayed on the display 12 as the game image.

In addition, in this specification, a hole on a green that the golf ball is to be put in is referred to as a "cup", and a district or area to be played from a teeing area to the green in the golf course (that is, a range where the character is movable) is referred to as a "hole". Moreover, in this specification, a "cup-in" means that the golf ball goes into the cup.

When the golf game is started, and a game image including an image (background image) of a teeing area of a start hole of the selected golf course and a part of the hole viewable from the teeing area is displayed on the display 12. For example, the start hole in the golf course is generated in a game space or game field, and a position and orientation of the virtual camera are set so as to face a direction that the player character hits the ball from a predetermined position behind the teeing area. As a non-limiting example game image, a parameter determination screen 300 as shown in FIG. 8 is displayed on a display device (for example, display 12).

Figure 8:
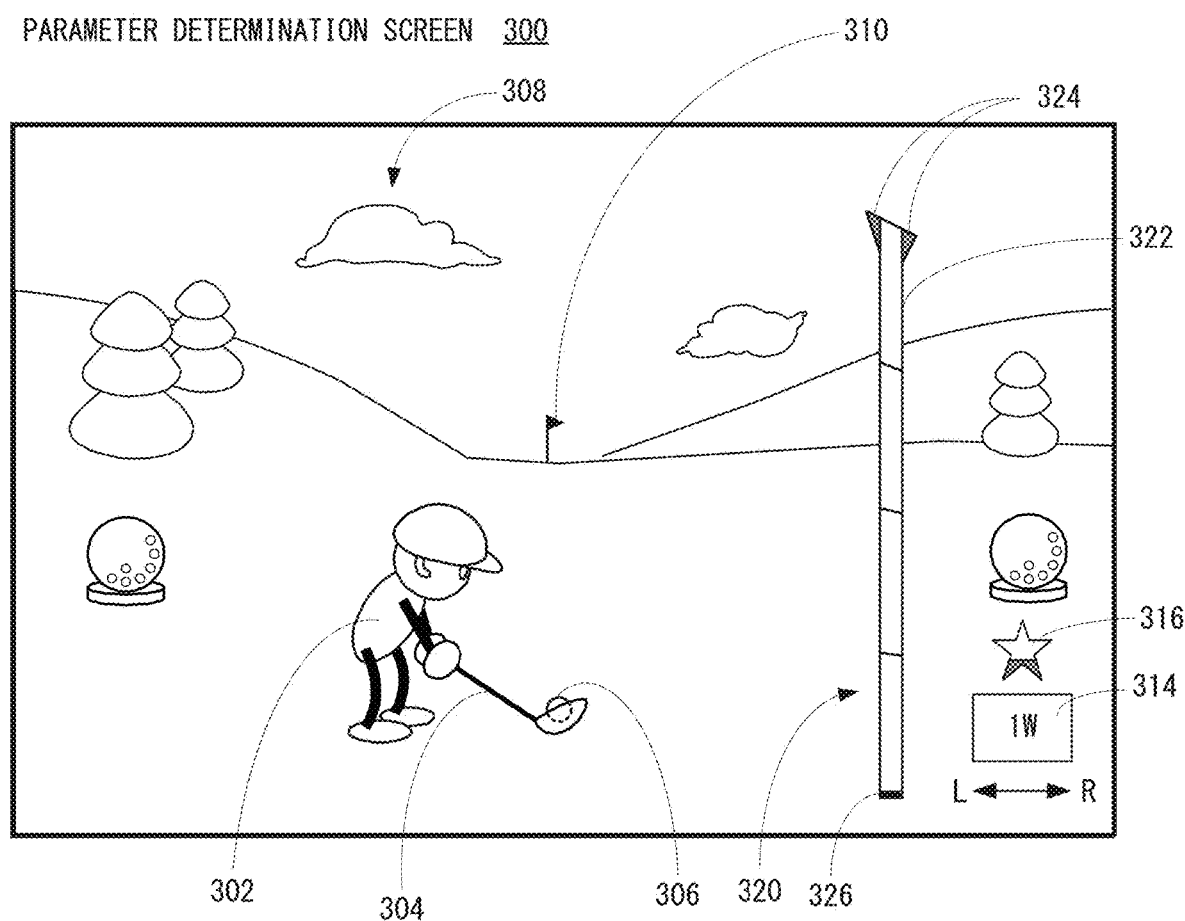
FIG. 8 is a view showing a non-limiting first example parameter determination screen.

As shown in FIG. 8, a player character 302 is displayed in the parameter determination screen 300, and the player character 302 holds a virtual golf club (hereinafter, simply referred to as "club") 304. As can be seen also in FIG. 8, the player character 302 is displayed in an address state, and a virtual golf ball (hereinafter, simply referred to as "ball") 306 that is teed-up is placed at a predetermined position. As described above, the background image 308 is displayed in the parameter determination screen 300. In an example shown in FIG. 8, as the background image 308, virtual objects such as the teeing area, left and right tee markers, fairways, trees, sky and clouds are displayed. Moreover, in FIG. 8, a virtual pin 310 is displayed at an approximately center of the parameter determination screen 300.

A display area 314 for displaying the type of club 304 used by the player character 302 for hitting is provided in a lower right corner of the parameter determination screen 300. If the type of club 304 is changed in the parameter determination screen 300, an image of the club 304 that the player character 302 holds is changed to an image to a club 304 of a type after changed. At this time, the type of club 304 to be displayed in the display area 314 is also changed. In this embodiment, it is possible to change the type of club 304 by depressing the L-button 38 or the R-button 60. If the L-button 38 is depressed, the type of club is changed to a club 304 longer than the current club 304, and the type of club is changed to a club 304 shorter than the current club 304 if the R-button 60 is depressed. According to the type of club 304, the flight distance of the ball 306 at the time of hitting the ball 306 with 100% (percent) of a hitting power is determined. However, the flight distance may be changed according to a type of player character 302.

Moreover, a star-shaped ability gauge 316 is displayed above the display area 314. The ability gauge 316 displays a magnitude (or accumulative amount) of the parameter (hereinafter, referred to as "ability increase parameter") for determining whether the ability of the club 304 to be used can be increased. If the ability increase parameter is accumulated, a color in the star-shaped ability gauge 316 is changed according to the accumulative amount. If the ability gauge 316 becomes full, that is, if the ability increase parameter reaches a maximum value (for example, 100), according to an operation of the player, the ability of the club 304 to be used can be increased. For example, when the player depresses the Y button 56, increasing the ability of the club 304 is selected. It is possible to cancel increasing the ability of the club 304 by depressing the Y button 56 again or depressing the B-button 54. Moreover, if the player character 302 hits the ball 306 in a state that the ability of the club 304 is increased, the ability increase parameter is made into a minimum value (for example, 0 (zero)).

In this embodiment, if a predetermined condition is satisfied, the ability increase parameter is accumulated. As an example, the predetermined condition is to hit the ball 306 by less than 75% of the hitting power of the maximum value (100%). In other embodiments, the predetermined condition may be to acquire or use a predetermined item or/and to fulfill a predetermined quota. The accumulative amount of the ability increase parameter may be a fixed value or a variable value. For example, if the hitting power is less than 75%, a predetermined accumulative amount (for example, 20) is added to the ability increase parameter. However, the accumulative amount may be increased as the hitting power becomes smaller from 75%.

An operation for changing the type of the club 304 and increasing the ability of the club 304, that is, determining some parameters related to the movement of the ball 306 (hereinafter, referred to as "first parameter") (hereinafter, "first parameter determining operation") is performed prior to an operation, using the movement gauge 320, for determining a second parameter related to movement of the ball 306 (hereinafter, referred to as "second parameter") (hereinafter, referred to as "second parameter determination operation") described later. Moreover, detailed description is omitted, prior to the second parameter determination operation, it is possible to perform not only selection of the club 304 and selection whether the ability is to be increased but also a change of a launch direction of the ball 306 according to an operation of the player, that is, a direction in a left and right direction (horizontal direction) at the time of starting the movement of the ball 306. This launch direction in the horizontal direction is also the above-described first parameter related to the movement of the ball 306. For example, it is possible to change the launch direction in the horizontal direction of the ball 306 by tilting the analog stick 32 to left or right.

Furthermore, a movement gauge 320 for determining the second parameter related to the movement of the ball 306 is displayed in the right side of the center of the parameter determination screen 300 and in the left side of the display area 314 and the ability gauge 316. In this embodiment, the second parameter related to the movement of the ball 306 is the hitting power of the ball 306, the change of a trajectory of the ball 306 and the deviation of the trajectory of the ball 306.

In this embodiment, the change of the trajectory means a change direction in the vertical (up and down) direction and horizontal (left and right) direction and a change amount with respect to the trajectory when the ball 306 is hit in a launch direction that is determined in advance (hereinafter, referred to as "reference trajectory"). Here, the reference trajectory means the parabola that is determined by the type of the club 304 to be used (specifically, a launch angle in the vertical direction) and the hitting power (specifically, an initial velocity of the ball 306) (see FIG. 17). Moreover, in this embodiment, the deviation of the trajectory means a deviation direction (in this embodiment, in the horizontal direction) and a deviation amount of the launch direction of the ball 306.

The parabola can be calculated according to Equation 1 in the general physical calculation of projectile motion. Moreover, a position of the ball 306 at the time t can be calculated according to Equation 2. However, it is assumed that a predetermined gravitational acceleration g is set in the virtual game space. Moreover, theta ($\theta$) is a launch angle in the vertical direction of the ball 306, and $v_0$ is an initial velocity of the ball 306. The launch angle $\theta$ in the vertical direction of the ball 306 is set in advance for each club 304. Furthermore, the initial velocity $v_0$ of the ball 306 is set according to the hitting power and the maximum flight distance of the club 304 to be used. Moreover, t is time (frame). A frame is a unit time of screen update, for example, 1/60 second.

Moreover, a local coordinates system is set when calculating the reference trajectory. Specifically, the current position of the ball 106 is set at a reference position (origin point), an axis that is horizontally extended toward a virtual landing point from the current position of the ball 106 is set on an X-axis, and an axis that is perpendicular to this X-axis and extended in a height direction of the virtual space is set on a Y-axis. Furthermore, a Z-axis perpendicular to both the X-axis and the Y-axis is set. Moreover, a direction horizontally extending toward the virtual landing point from the current position of the ball 106 is set as a plus or positive direction of the X-axis, a direction toward an upper direction of the virtual space is set as a plus or positive direction of the Y-axis, and a direction toward the right when viewing the positive direction of the X-axis is set as a plus or positive direction of the Z-axis.

However, when calculating the reference trajectory, it is assumed that the terrain (or the ground) has no slope. Therefore, in the game space, a parabola from the current position of the ball 306 to a position at the same height as the height at this current position (i.e., a position at a horizontal arrival distance) is calculated as the reference trajectory.

Reference trajectory $$y = \tan\theta * x - (gx^2)/(2v_0^2 \cos^2\theta) \qquad \text{[Equation 1]}$$

Position $$x = v_0 \cos\theta * t$$

$$y = v_0 \sin\theta * t - (gt^2)/2 \qquad \text{[Equation 2]}$$

In addition, although the reference trajectory is a parabola calculated by general physical calculation in this embodiment, the reference trajectory may be evaluated based on simulation processing that takes into account the influences of the air resistance and the lift force accompanying the ball spin in the virtual space.

Here, the movement gauge 320 will be described in detail. As shown in FIG. 8, the movement gauge 320 includes a rectangular area (hereinafter, referred to as "basic area") 322 formed in a vertically long bar shape (belt shape), and the basic area 322 is divided into four sections (or areas). In this embodiment, the four divided sections are called a first operation section 322a, a second operation section 322b, a third operation section 322c and a fourth operation section 322d in an order from the bottom in the parameter determination screen 300. The movement gauge 320 is displayed in white color lines as an example, and an inside of the basic area 322 is in black color prior to the second parameter determination operation.

Moreover, the movement gauge 320 includes an area (hereinafter, referred to as "risk area") 324 that a size and a shape are variably set outside the basic area 322. Although described later in detail, the risk area 324 is an area for determining the deviation of the ball 306 to a direction in left or right beyond a range of the basic area 322. A size and a shape of the risk area 324 are variably determined based on the club 304 to be used and a state of a lie. Briefly, like a case of general actual golf, as the difficulty of hitting increases, the size of the risk area 324 increases. Moreover, as an example, an inside of the risk area 324 is in red color.

In this embodiment, although the basic area 322 and the risk area 324 are separated by color in order to show the risk area 324 intelligibly, these may be shown integrally without separating by color. For example, the risk area 324 may be formed by a part of basic area 322 that is deformed to spread in the left and right directions.

In the parameter determination screen 300 shown in FIG. 8, if there is an instruction to start the second parameter determination operation (in this embodiment, depressing the A-button 53), the first index image 326 is started to be moved toward one end (i.e., an upper end of the movement gauge 320) from an initial position (i.e., a lower end of the movement gauge 320). The first index image 326 is an index for determining the hitting power, and is moved with a movement speed V1.

Figure 9:
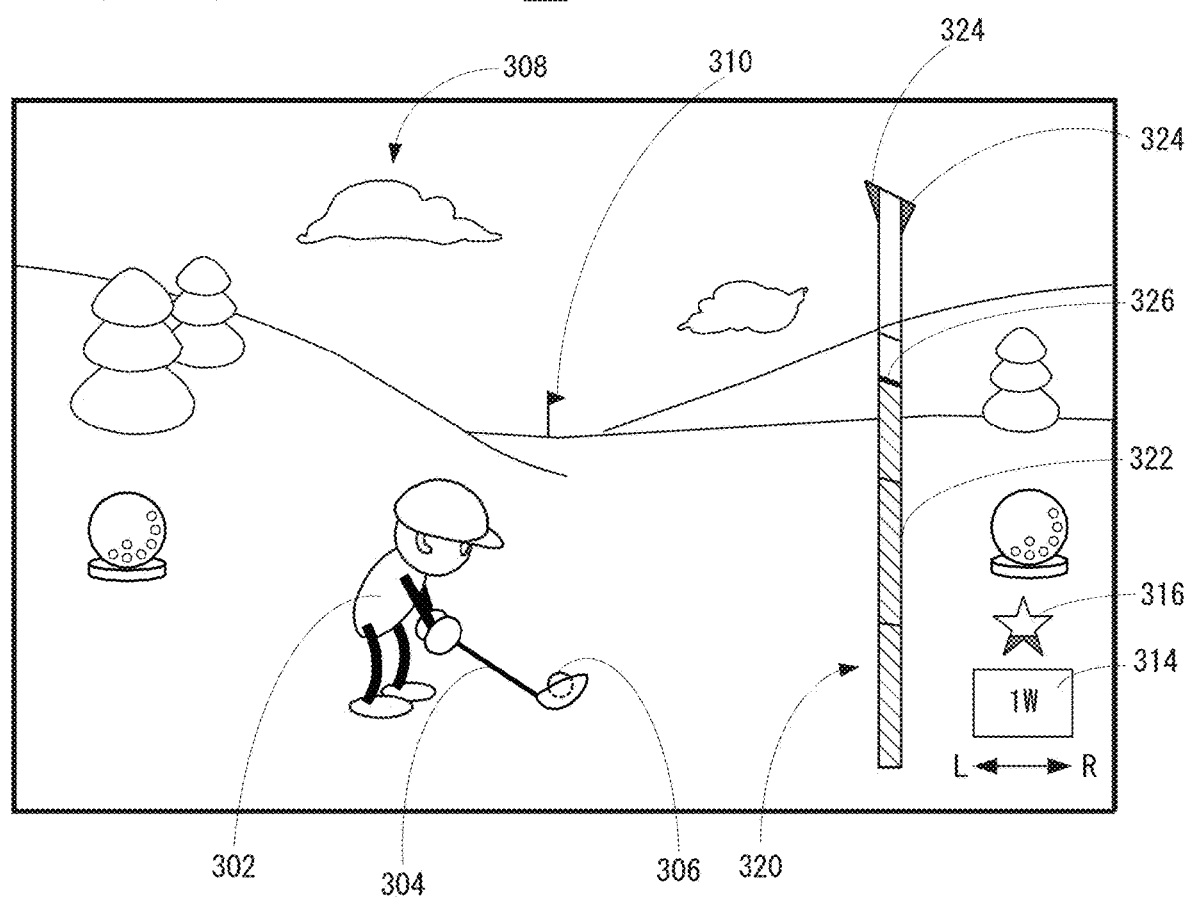
FIG. 9 is a view showing a non-limiting second example parameter determination screen.

As shown in FIG. 9, if the first index image 326 is moved, a color of a portion that the first index image 326 is moved in the movement gauge 320 is changed (slant-line portion in FIG. 9). As an example, if the first index image 326 is moved in the movement gauge 320, the color of the portion being moved is changed to yellow. In this embodiment, although a color of the basic area 322 is changed, a color of the risk area 324 is not changed.

In addition, although the color of the portion that the first index image 326 is moved is changed, in this embodiment, instead of the movement of the first index image 326, a color of an inside of the movement gauge 320 may be gradually changed from the lower end toward the upper end of the movement gauge 320. In this case, a speed that the color is changed is the movement speed V1.

The hitting power is determined according to a position that the first index image 326 is made to be stopped within a range that is equal to or larger than a minimum value (0%) and equal to or smaller than a maximum value (100%). However, when the first index image 326 is located at the lower end of the movement gauge 320, the hitting power is a minimum, and the hitting power is a maximum when the first index image 326 is located at the upper end of the movement gauge 320. If there is an instruction to stop (depressing the A-button 53 in this embodiment), the first index image 326 is stopped moving. The hitting power is determined according to a rate of the length from the lower end of the movement gauge 320 to the first index image 326 having been stopped, with respect to full length of the movement gauge 320. Strictly, since the first index image 326 is slanted gradually according to deformation of each of the operation sections 322a-322d as it goes to the upper end from the lower end of the movement gauge 320, the hitting power is determined by the length from the lower end of the movement gauge 320 to a position of the center of the first index image 326. That is, the closer the first index image 326 to the upper end of the movement gauge 320, the larger the hitting power. Since the initial velocity $v_0$ of the ball 306 is determined based on the hitting power as described above, the closer the first index image 326 to the upper end of the movement gauge 320, the longer the movement distance of the ball 306.

When there is no instruction to stop, the first index image 326 is moved, while a moving direction thereof is reversed, toward the lower end of the movement gauge 320 after reaching the upper end of the movement gauge 320. If the first index image 326 reaches the lower end of the movement gauge 320, the first index image 326 is stopped moving, it becomes necessary to perform again the second parameter determination operation, or a missed shot or whiff (swing and a miss) occurs.

In addition, even when the first index image 326 is moved toward the lower end of the movement gauge 320, it is possible for the player to stop movement of the first index image 326.

Moreover, in other embodiments, the first index image 326 may be moved again toward the upper end from the lower end when reaching the upper end of the movement gauge 320.

Figure 10:
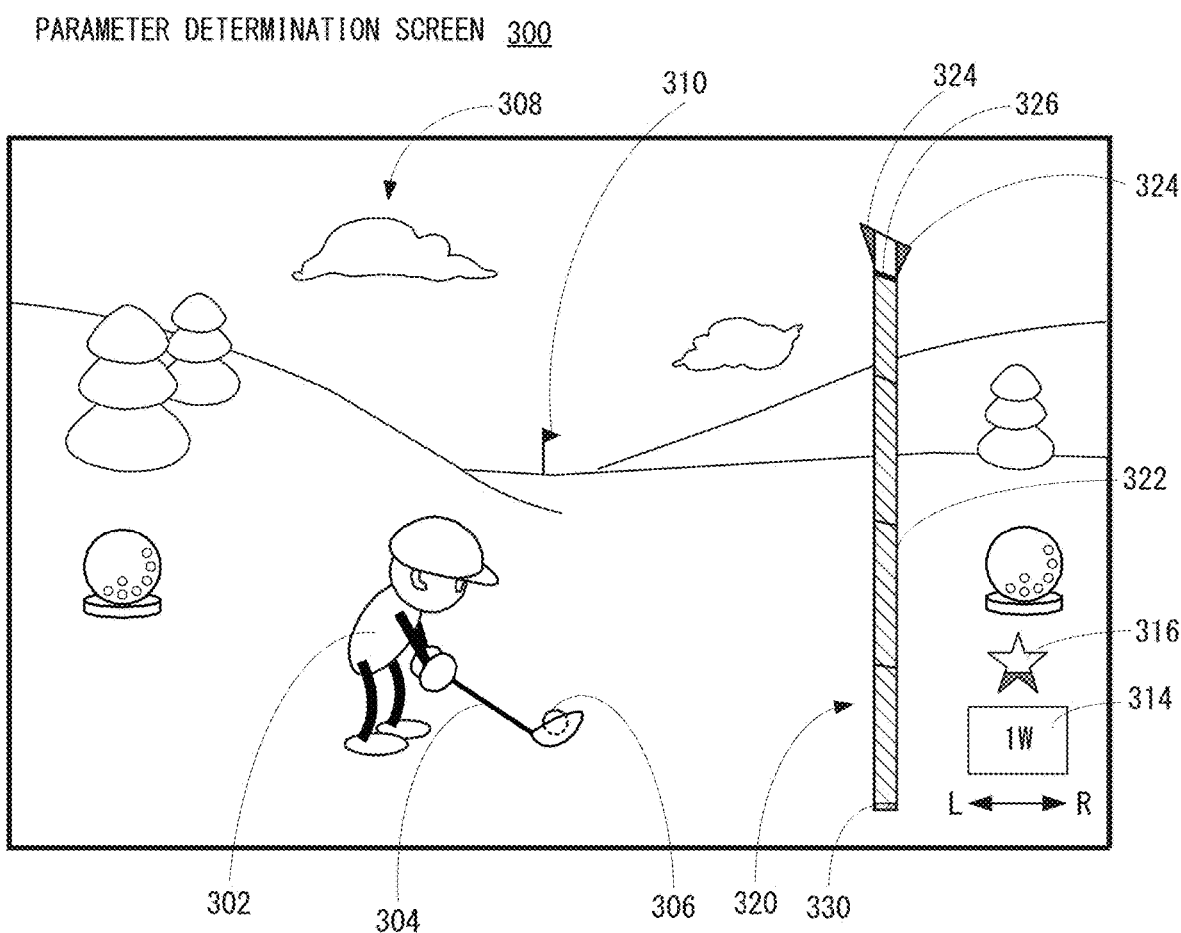
FIG. 10 is a view showing a non-limiting third example parameter determination screen.

FIG. 10 shows a non-limiting example parameter determination screen 300 when movement of the first index image 326 is stopped. As shown in FIG. 10, the first index image 326 is stopped at a position closer to the upper end from the center of the fourth operation section 322d. If the first index image 326 is stopped, the second index image 330 is started moving toward the upper end from the lower end of the movement gauge 320 with the movement speed V2. The second index image 330 is an index that indicates a predetermined period of time (hereinafter, referred to as "direction input period") capable of inputting a direction changing the trajectory of the ball 306 and a magnitude to be changed (i.e., change amount) and a portion (or section) that the trajectory of the ball 306 is to be changed. Although the movement speed V2 is the same as the movement speed V1 as an example, the movement speed V2 may be a different speed.

The second index image 330 is moved from the lower end of the movement gauge 320 to a position of the stopped first index image 326. This period of time is the direction input period. Therefore, when the first index image 326 is stopped in the middle of the operation section 322a, 322b, 322c or 322d, the direction input period is made to be shorter in comparison to a case where this first index image 326 is stopped at a trailing end of the same operation section 322a, 322b, 322c or 322d. The player can perform, in the direction input period, the direction input temporally (in a time course manner) if the hitting power is specified by stopping the movement of the first index image 326. By this temporal (over-time) direction input, it is possible to change the trajectory of the ball after hitting from the reference trajectory. That is, it is possible to move the ball 306 while temporally (over-time) reflecting into the trajectory the temporal direction input. As described above, since the second index image 330 is moved with the movement speed V2, the direction input period is variably set according to the position of the first index image 326.

Therefore, since the player can stop the first index image 326 in consideration of not only the hitting power but the direction input period, the interest and strategic characteristic of the game can be improved.

However, the temporal direction input is a direction input detected in the direction input period, and the player does not always perform the direction input during this direction input period.

The player can perform the direction input by tilting the analog stick 32. The analog stick 32 can be tilted in the direction of 360 degrees, and therefore, it is possible to perform the direction input of 360 degrees. Moreover, according to a magnitude of an angle that the analog stick 32 is tilted, i.e., a tilt amount, a magnitude (or strength) that changes the trajectory of the ball 306 in a direction that the analog stick 32 is tilted (hereinafter, referred to as "tilt direction"). That is, the player can determine not only a direction that the trajectory of the ball 306 is changed but a degree of change. Therefore, it is possible to make the player have interest to the direction input itself.

Figure 11:
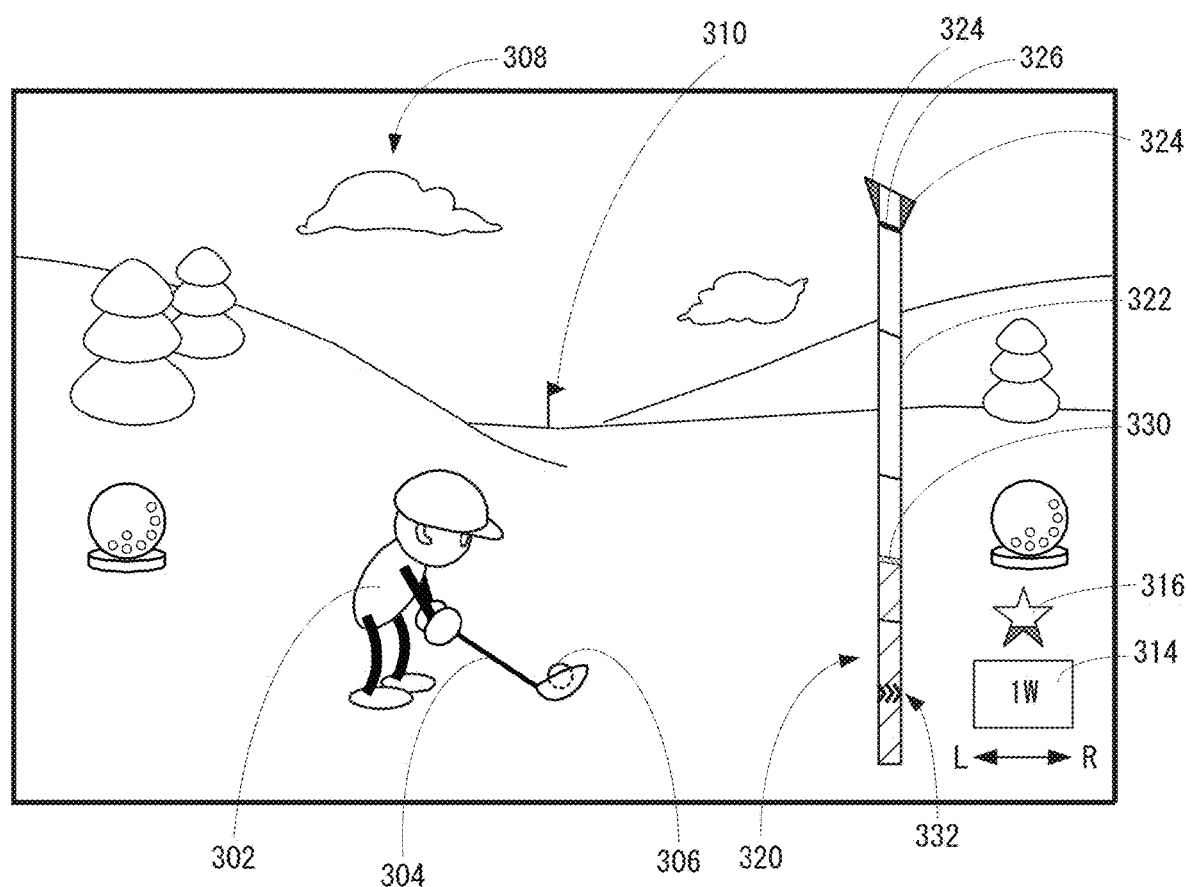
FIG. 11 is a view showing a non-limiting fourth example parameter determination screen.

FIG. 11 shows a non-limiting example parameter determination screen 300 during movement of the second index image 330. As shown in FIG. 11, when the second index image 330 is moved, a color of a portion that the second index image 330 is moved in the movement gauge 320 is changed into orange color. However, a color of the risk area 324 is not changed. Moreover, in FIG. 11, in order to distinguishably show a color that is changed when the first index image 326 is moved and a color that is changed when the second index image 330 is moved, a direction of the slant lines and a gap between adjacent slant lines are changed in comparison to those in the parameter determination screen 300 shown in FIG. 9 and FIG. 10, and the slant lines indicative of the color that is changed due to movement of the first index image 326 are omitted. Moreover, instead the movement of the second index image 330, the color of an inside of the movement gauge 320 may be changed gradually from the lower end of the movement gauge 320 to the position that the first index image 326 is stopped. In this case, a speed that the color is changed is the movement speed V2.

Moreover, as shown in FIG. 11, an image 332 indicative of the direction input (hereinafter, referred to as "arrow image") is displayed in the center of the first operation section 322a. The arrow image 332 is an image indicative of a direction input that a plurality of direction inputs detected for each frame in the operation section 322a, 322b, 322c or 322d displayed are unified into one (hereinafter, referred to as "section direction input"). As described above, the direction input is the tilt amount that the analog stick 32 is tilted in up, down, left or right, respectively, and therefore, the section direction input is a single two-dimensional vector that input values in up, down, left or right are added to each other. That is, in each of the operation sections 322a-322d, an average value of a plurality of direction inputs detected for each frame is calculated as the section direction input.

In this embodiment, since the arrow image 332 is an image that indicates single section direction input unifying a plurality of direction inputs, the section direction input is displayed in a number smaller than that of the detected direction inputs. Therefore, the section direction input is easy to understand.

A timing that the arrow image 332 is displayed is, as an example, a timing that the predetermined number (for example, 10-12) of direction inputs are detected. Therefore, if a predetermined number of direction inputs are detected, the section direction input is calculated, and the arrow image 332 indicating the section direction input is displayed in the corresponding operation section 322a, 322b, 322c or 322d. Therefore, even if the second index image 330 is being moved in the middle of the operation section 322a, 322b, 322c or 322d, at a timing that the predetermined number of the direction inputs are detected, the section direction input is calculated, and accordingly, the arrow image 332 that indicates the calculated section direction input is displayed in the corresponding operation section 322a, 322b, 322c or 322d.

In another example, the section direction input may be calculated when the second index image 330 reaches the center of the operation section 322a, 322b, 322c or 322d, and the arrow image 332 that indicates the calculated section direction input is displayed in the corresponding operation section 322a, 322b, 322c or 322d.

However, in any case, the arrow image 332 corresponding to the section direction input calculated from all the direction inputs detected in the operation section 322a, 322b, 322c or 322d is eventually displayed in the corresponding operation section 322a, 322b, 322c or 322d. That is, the arrow image 332 displayed in the middle of the operation section 322a, 322b, 322c or 322d that the second index image 330 is under movement is updated at the time that the second index image 330 is moved to the trailing end of the corresponding operation section 322a, 322b, 322c or 322d.

Therefore, by looking the arrow image 332 displayed during movement of the second index image 330 in the operation section 22a, 322b, 322c or 322d, when the section direction input indicated by the arrow image 332 does not indicate desired direction and magnitude (or strength), the player can modify the direction input so that the section direction input becomes the desired direction and magnitude. Therefore, the arrow image 332 not only can show the section direction input but can be said to be an index for modifying the section direction input. In this embodiment, the strength that changes the trajectory of the ball 306 differs dependent on the tilt amount of the direction input, and in order to make the player understand the strength, the arrow image 332 is made to be displayed or hidden, and to be changed to the content corresponding to the strength.

In this embodiment, the strength that changes the trajectory of the ball 306 is, including the tilt amount is 0 (zero), classified into three stages (for example, strong, medium and weak) in a case where the tilt amount is larger than 0 (zero). The tilt amount of the analog stick 32 is changed by "0.1" between "0" and "1.0", and the tilt amount at the time of not tilted is "0" and the tilt amount at the time of tilted at the maximum is "1.0". Moreover, when the tilt amount is larger than 0 (zero) and equal to or less than "0.3", the stage of strength is determined as "weak", when the tilt amount is larger than "0.3" and equal to or less than "0.7", the stage of strength is determined as "medium" (i.e., between "strong" and "weak"), and when the tilt amount is larger than "0.7" and equal to or less than "1.0", the stage of strength is determined as "strong".

Therefore, in this embodiment, when the trajectory of the ball 306 is to be changed, the arrow image 332 that the strength that changes the trajectory of the ball 306 is expressed by three stages is displayed, and when not changing the trajectory of the ball 306, the arrow image 332 is not displayed. The arrow image 332 shown in FIG. 11 is an arrow image 332 in a case where the strength that changes the trajectory of the ball 306 is "strong", and three arrows (arrowheads) are displayed side by side. Although illustration is omitted, when the strength that changes the trajectory of the ball 306 is "weak", an arrow image 332 that the arrow is one. Moreover, when the strength that changes the trajectory of the ball 306 is "medium", an arrow image 332 that the arrows (arrowheads) are two.

However, the above-described classification of the strength is performed only for displaying or hiding the arrow image 332, and is not used when actually changing the trajectory. In other embodiments, this classification may be utilized when actually changing the trajectory. A method of changing the trajectory of the ball 306 will be described later.

In addition, although the strength that changes the trajectory of the ball 306 is classified into three stages in a case where the tilt amount of the analog stick 32 is larger than 0 (zero) in this embodiment, this is a mere example, and if it is two or more stages, it is also possible to classify into four or more stages.

Figure 12:
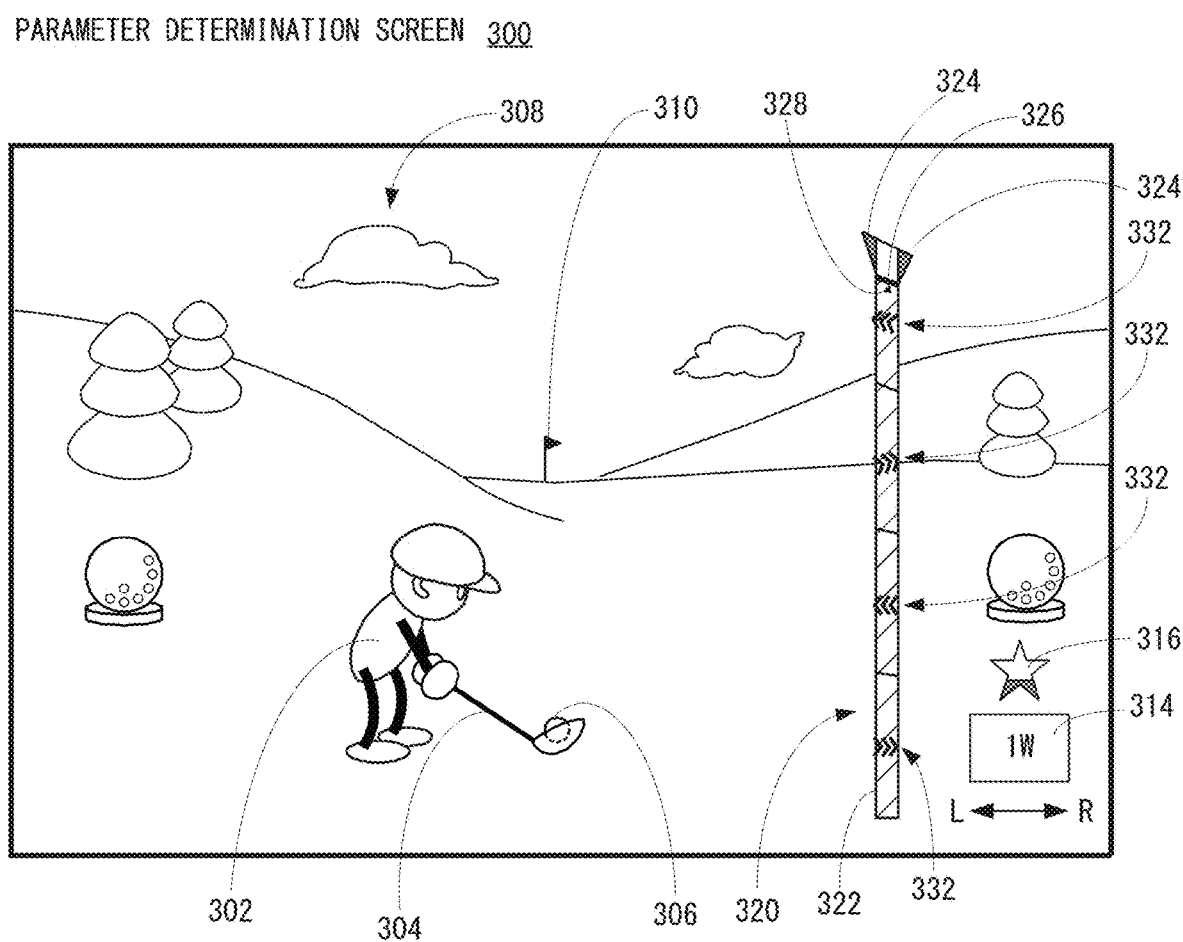
FIG. 12 is a view showing a non-limiting fifth example parameter determination screen.

FIG. 12 shows a non-limiting example parameter determination screen 300 when the second index image 330 is moved to a position that the first index image 326 is stopped. As shown in FIG. 12, the second index image 330 is made to be hidden, and a color up to the position that the first index image 326 stopped from the initial position of the movement gauge 320 is changed to orange color. Moreover, in the parameter determination screen 300 shown in FIG. 12, the arrow image 332 is displayed in each of the operation sections 322a-322d. The trajectory of the ball 306 is changed in a direction indicated by the arrow image 332. Therefore, in an example shown in FIG. 12, when the player character 302 hits the ball 306, the ball 306 is moved along the trajectory that the reference trajectory is changed toward right in a portion corresponding to the first operation section 322a, is changed toward left in a portion corresponding to the second operation section 322b, is changed toward diagonally upper right in a portion corresponding to the third operation section 322c, and is changed toward diagonally upper left in a portion corresponding to the fourth operation section 322d.

Furthermore, an image (hereinafter, referred to as "designation image") 328 that contacts a lower side of the first index image 326 is displayed in the parameter determination screen 300 shown in FIG. 12. The designation image 328 is an image indicative of deviation of the trajectory of the ball 306. In this embodiment, the hitting power is determined according to an operation of the player, and when the change of the trajectory is determined, the deviation of the trajectory is determined by a lottery.

A position that the designation image 328 is displayed is determined by a lottery within a range of breadth of the movement gauge 320 (or the first index image 326). In this embodiment, a lottery period (hereinafter, referred to as "deviation lottery period") of predetermined time length (for example, 0.5 seconds (30 frames) grade) is set. The deviation is automatically determined at the time of an end of the deviation lottery period. Moreover, in the deviation lottery period, a display position of the designation image 328 is changed at random along the first index image 326, and a manner thereof is displayed in the parameter determination screen 300 (hereinafter, referred to as "lottery display").

When the designation image 328 is located in the center of the breadth of the movement gauge 320, there is no deviation and a deviation amount in left and right is 0 (zero). When the designation image 328 is located in the left from the center of the movement gauge 320, the trajectory of the ball 306 is deviated to the left. Moreover, when the designation image 328 is located in the right from the center of the movement gauge 320, the trajectory of the ball 306 is deviated to the right. When the ball 206 is deviated to the left or the right, in either case, a deviation amount is enlarged as the designation image 328 is moved away from the center of the breadth of the movement gauge 320.

Figure 13A:
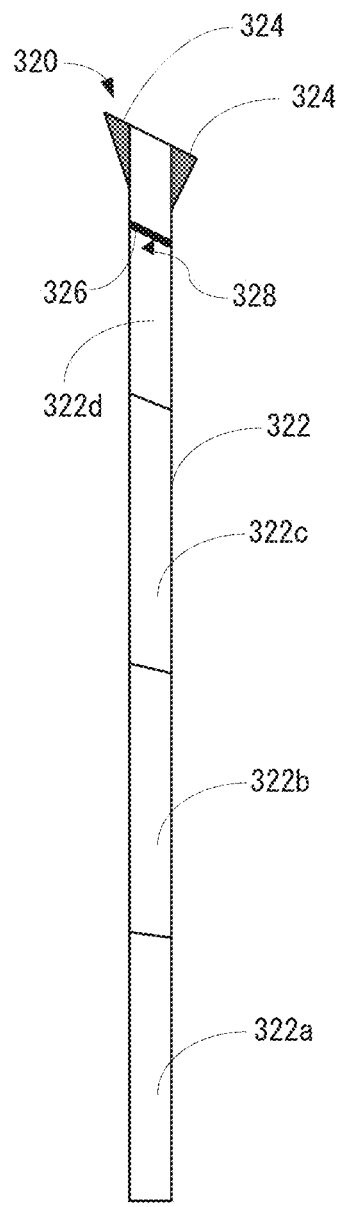
FIG. 13A is a view showing a non-limiting example range that deviation is determined.
Figure 13B:
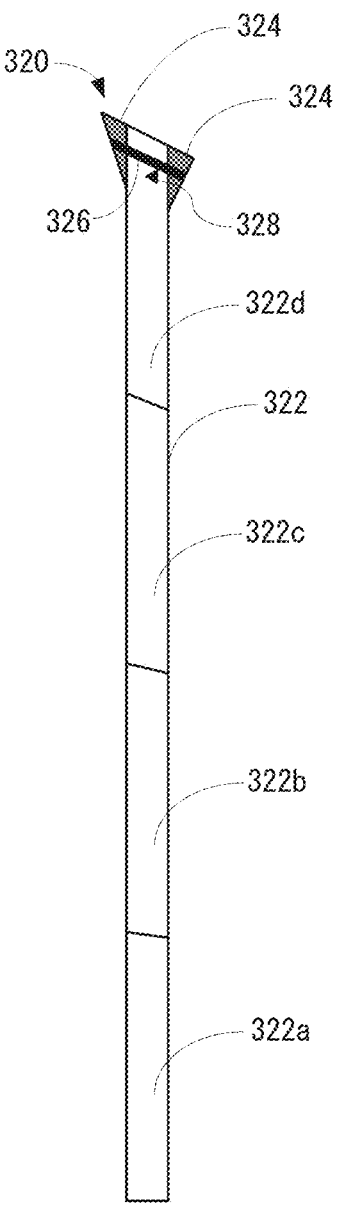
FIG. 13B is a view showing another non-limiting example that deviation is determined.

FIG. 13A is a view showing a non-limiting example range that the deviation is determined, and FIG. 13B is a view for showing another non-limiting example range that the deviation is determined. In FIG. 13A, the first index image 326 is stopped in a position that the risk area 324 is not formed on the movement gauge 320. Therefore, in a case shown in FIG. 13A, the deviation is determined within a range of the basic area 322. On the other hand, in FIG. 13B, the first index image 326 is stopped in a position that the risk area 324 is formed on the movement gauge 320. At this time, in a case shown in FIG. 13B, the deviation is determined within ranges of the basic area 322 and the risk area 324. Therefore, in the case shown in FIG. 13B, the hitting power becomes larger than the case shown in FIG. 13A, and therefore, the movement distance of the ball 306 becomes long, but the deviation amount may become large. Therefore, the player can play the golf game in consideration of the selection of the club 304 and the magnitude of the hitting power depending on whether the movement distance is emphasized or the directionality is emphasized.

In this embodiment, when there is deviation, the launch direction of the ball 306 in the horizontal direction (left and right) is changed. The amount of change of the launch direction of the ball 306 is made to be larger in proportion to the deviation amount. However, in another example, when there is deviation, only the magnitude may be changed (or moved) according to the deviation amount in a direction of the deviation in a part or whole of the trajectory. In a further example, when there is deviation, both the launch direction of the ball 306 and the trajectory may be changed. These may be individually adopted according to the type of the player character 302 or/and club 304.

Moreover, a line at a side of a trailing end (or upper end) of each of the first operation section 322a, the second operation section 322b, the third operation section 322c and the fourth operation section 322d is set aslant. A slant degree of the line at a side of the trailing end of each of the operation sections 322a-322d is made larger as it goes to the fourth operation section 322d from the first operation section 322a. This slant degree is related to the deviation amount in the horizontal direction (left and right) of the ball 306. In general, as for a draw ball and a fade ball, the draw ball has a longer movement distance. Therefore, in a case of a right-handed character, as shown in FIG. 13A and FIG. 13B, the line at side of the trailing end is slanted downwardly as it goes to right from left. That is, as to the right-handed character, the movement distance of right deviation is longer than that of left deviation. However, not only the line at a side of the trailing end is slanted but also each of the operation sections 322a-322d is deformed so that the change becomes larger toward the upper end from the lower end of the movement gauge 320.

Therefore, as described above, the first index image 326 is slanted gradually toward the upper end from the lower end of the movement gauge 320.

Although illustration is omitted, in a case of left-handed character, a direction of the slant of the boundary line at a side of the trailing end of each of the operation sections 322a-322d becomes opposite to a case of the right-handed character.

In addition, although detailed description is omitted, when there is deviation, the movement distance that is changed due to the deviation affects a distance that a rolling distance after the ball 306 is landed. When the designation image 328 is closer to the upper end of the movement gauge 320 than a position determining the hitting power, the distance that the ball 306 rolls is made longer, and inversely, when the designation image 328 is farther from the upper end of the movement gauge 320 than the position determining the hitting power, the distance that the ball 306 rolls is made shorter. However, in a case where the terrain is sloped and a case where a landing point is a bunker, a rough and a hazard, the ball 306 rolls according to a slope of the terrain, and moves or stops according to the landing point.

When the direction input period expires, a deviation lottery is started, and in parallel therewith, the player character 302 starts the swing motion to hit the ball 306. However, the swing motion of the player character 302 may be started when the direction input period expires and the deviation lottery is ended.

Figure 14:
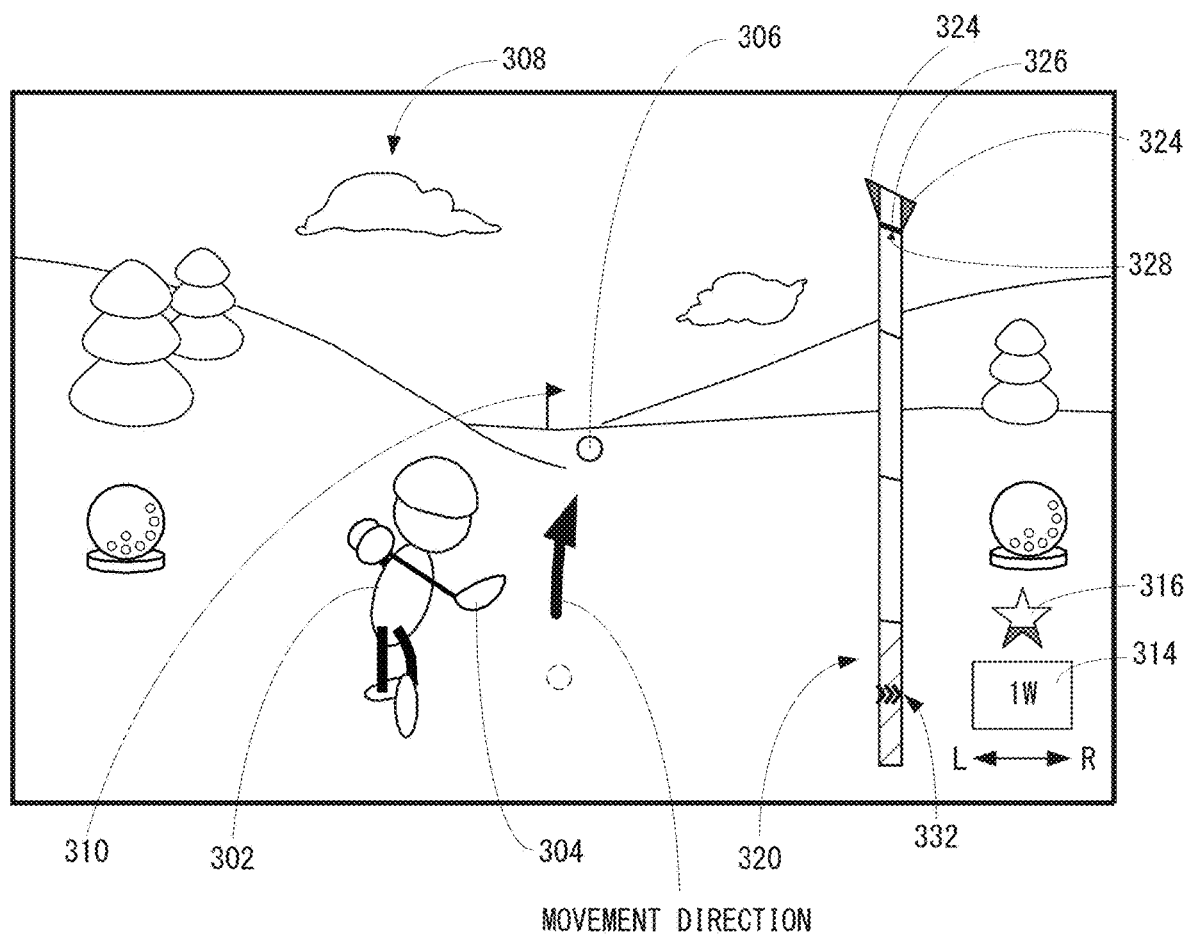
FIG. 14 is a view showing a non-limiting sixth example parameter determination screen.

FIG. 14 shows a non-limiting example parameter determination screen 300 immediately after the player character hits the ball 306. In an example shown in FIG. 14, the designation image 328 does not have deviation or is slightly toward the right since the designation image 328 is located near the center of the breadth of the basic area 322. Therefore, the ball 306 is started to move in a predetermined launch direction or slightly to the right from the predetermined launch direction.

Although illustration is omitted, when the ball 306 starts moving, the virtual camera is moved behind the ball 306 so as to take a bird's-eye view from diagonally above. However, although detailed description is omitted, the virtual camera is moved so as to follow the virtual ball in a case of assuming that the ball 306 is moved on the reference trajectory. This is for showing by the game screen to the player change of the trajectory of the ball 306. Therefore, a field angle of the virtual camera is appropriately adjusted so that the ball 306 is included in the game screen.

Moreover, when the ball 306 starts moving, in the parameter determination screen 300 and the game screen until the ball 306 is stopped after landing, in the movement gauge 320, the operation section 322a, 322b, 322c or 322d corresponding to the position of the ball 306 being currently moved is distinguishably displayed, and the arrow image 332 for the operation section 322a, 322b, 322c or 322d is displayed. The operation section 322a, 322b, 322c or 322d corresponding to the position of the ball 306 being currently moved is displayed in a color (in this embodiment, yellow color) different from a color (in this embodiment, orange color) of other operation sections. However, each of the arrow images 332 of each of the operation sections 322a-322d displayed in the direction input period may be once made in white color when the direction input period expires and the player character 302 starts the swing motion, and the arrow image 332 of the operation section 322a, 322b, 322c or 322d corresponding to the position of the ball 306 being currently moved may be displayed in a color (for example, black color) different from those of other operation sections. That is, the operation section 322a, 322b, 322c or 322d corresponding to a position of the ball 306 being currently moved and its arrow image 332 are made to stand out (or highlighted). Therefore, the player can know that the trajectory of the ball 306 is being changed to a direction according to an own direction input.

However, in this specification, the operation section 322a, 322b, 322c or 322d corresponding to a position of the ball 306 being currently moved means the operation section 322a, 322b, 322c or 322d including a position in the movement gauge 320 equivalent to a movement distance in the horizontal direction (hereinafter, referred to as "horizontal distance") of the reference trajectory at the time "t" from a start of movement of the ball 306 when assuming that the length from the initial position of the movement gauge 320 to the stop position of the first index image 326 at the time that the hitting power is determined corresponds to the horizontal arrival distance of the reference trajectory.

In addition, when the player character 302 hits the ball 306, the color in the movement gauge 320 is returned to the color (yellow) of the time that the hitting power is determined, and the arrow images 332 of the respective operation sections 322a-322d are made to be hidden. However, the arrow images 332 may be displayed in semitransparent white color.

Moreover, although it is made to be displayed in this embodiment so that a whole of the operation section 322a 322b, 322c or 322d corresponding to the position of the ball 306 being currently moved is distinguishable, it does not need to be limited to this. A predetermined designation image such as a point or a line may be displayed at a position of the movement gauge 320 corresponding to the position of the ball 306 being currently moved. Moreover, it is sufficient that only the arrow image 332 of the operation section 322a 322b, 322c or 322d corresponding to the position of the ball 306 being currently moved is displayed. In this case, a color of only the arrow image 332 of the operation section 322a 322b, 322c or 322d corresponding to the position of the ball 306 being currently moved may be changed while displaying all the arrow images 332 of the respective operation sections 322a-322d.

Since the parameter determination screen 300 shown in FIG. 14 shows a state immediately after the player character 302 hits the ball 306, the first operation section 322a is displayed distinguishably and the arrow image 332 of the first operation section 322a is displayed. In a case of displaying each of the operation sections 322a-322d in an identifiable manner, it is performed by applying a predetermined color (in this embodiment, orange color) to each of the operation sections 322a-322d.

Next, a method of changing the trajectory of the ball 306 by using the direction input will be described. As described above, when the player wants to change the trajectory of the ball 306 from the reference trajectory, the player tilts the analog stick 32 in the direction to be changed. Since an operation input of the player is detected for each frame, when the analog stick 32 is tilted, a tilt direction and a tilt amount are detected for each frame.

In this embodiment, the trajectory of the ball 306 is changed by using the direction input in each of the operation sections 322a-322d of the movement gauge 320 (hereinafter, referred to as "section direction input"). The direction input is detected for each frame, after determining the hitting power, during the direction input period from the initial position of the second index image 330 is moved up to the position that the first index image 326 is stopped. In this embodiment, the ball 306 is moved while making a temporal direction input (i.e., section direction input) reflect into the trajectory temporally. However, there is an occasion that the player does not perform the direction input in all or a part of the direction input periods. For example, there is an occasion that the direction input is detected only one time in the direction input periods. Moreover, as described later, the section direction input that the direction inputs detected for each frame are averaged is calculated for each of the operation sections 322a-322d. Therefore, a temporal section direction input is the section direction input for each of the operation sections being continuous in time in two or more operation sections (in this embodiment, 322a-322d), and affects the trajectory of the ball 306 according to a time series.

As described later, when the trajectory of the ball 306 is to be changed, in order to calculate by dividing into the vertical (up and down) direction and the horizontal (left and right) direction, the direction input is stored as a tilt amount in the vertical direction and a tilt amount in the horizontal direction separately. However, in this specification, a direction to that the analog stick 32 is tilted means a direction out of four directions (up, down, left and right) at the time of viewing the left controller 3 from the front. That is, as shown in FIG. 1 and FIG. 3, when predetermined three axes (x-axis, y-axis and z-axis) are set for the game system 1 and its components (i.e., the main body apparatus 2, the left controller 3, the right controller 4), a direction in the horizontal (left and right) direction corresponds to an x-axis and a direction in the vertical (up and down) direction corresponds a y-axis. Moreover, the trajectory of the ball 306 is changed based on the direction input by the player in any direction of the four (up, down, left and right) directions at the time of viewing the reference trajectory in a positive direction of the X-axis from an origin point of the local coordinates system (see FIG. 17). However, the origin point of the local coordinates system is a moving start position of the ball 306. The moving start position is a position of the ball 306 prior to hitting.

FIG. 15A shows a non-limiting example table of the direction inputs detected for each frame in the direction input period. In order to distinguish from the number of frames of the reference trajectory described later, in the table of the direction inputs, the number of frames is referred to as the number of operation frames. This is the same also for a table of average direction input shown in FIG. 15B.

In the table of the direction inputs, in the vertical (up and down) direction, an upward direction tilt is expressed by positive numerals and a downward tilt is expressed by negative numerals. Moreover, in the horizontal (left and right) direction, a rightward direction tilt is expressed by positive numerals and a leftward tilt is expressed by negative numerals. As described above, a magnitude of the numeral indicates the tilt amount, and is expressed by the numbers from 0 (zero) to 1.0.

The ball 306 is to be moved in a direction indicated by the arrow image 332 in this embodiment, for each of the operation sections 322a-322d, a plurality of direction inputs are averaged. That is, the section direction input is calculated for each of the operation sections 322a-322d. If the section direction input is calculated, this is rewritten as a detected direction input in the operation section 322a, 322b, 322c or 322d that section direction input is calculated. That is, in each of the operation sections 322a-322d, the direction inputs having the same values (i.e., the section direction input) are written. FIG. 15B shows a non-limiting example table of average direction input for each of the operation sections 322a-322d. Thus, the trajectory of the ball 306 is changed using the direction input that is rewritten, i.e., the section direction input.

In order to determine which section direction input is to be reflected on which portion of the trajectory of the ball 306, in this embodiment, a correspondence table is created that describes a horizontal distance for each movement time (i.e., for each frame) for the reference trajectory. FIG. 16 shows a non-limiting example correspondence table. As shown in FIG. 16, in the correspondence table, corresponding to the number of frames (hereinafter, referred to as "number of moving frames"), the horizontal distance $d_n$ (n is an integer equal to or larger than 1 (one)) after a moving start in a case where the ball 306 is moved on the reference trajectory is described. However, as described above, when hitting the ball 306, the reference trajectory is calculated by Equation 1 using the initial velocity $v_0$ and the launch angle θ (theta) of the ball 306, and the horizontal distance $d_n$ is the position x calculated according to Equation 2.

Figure 17:
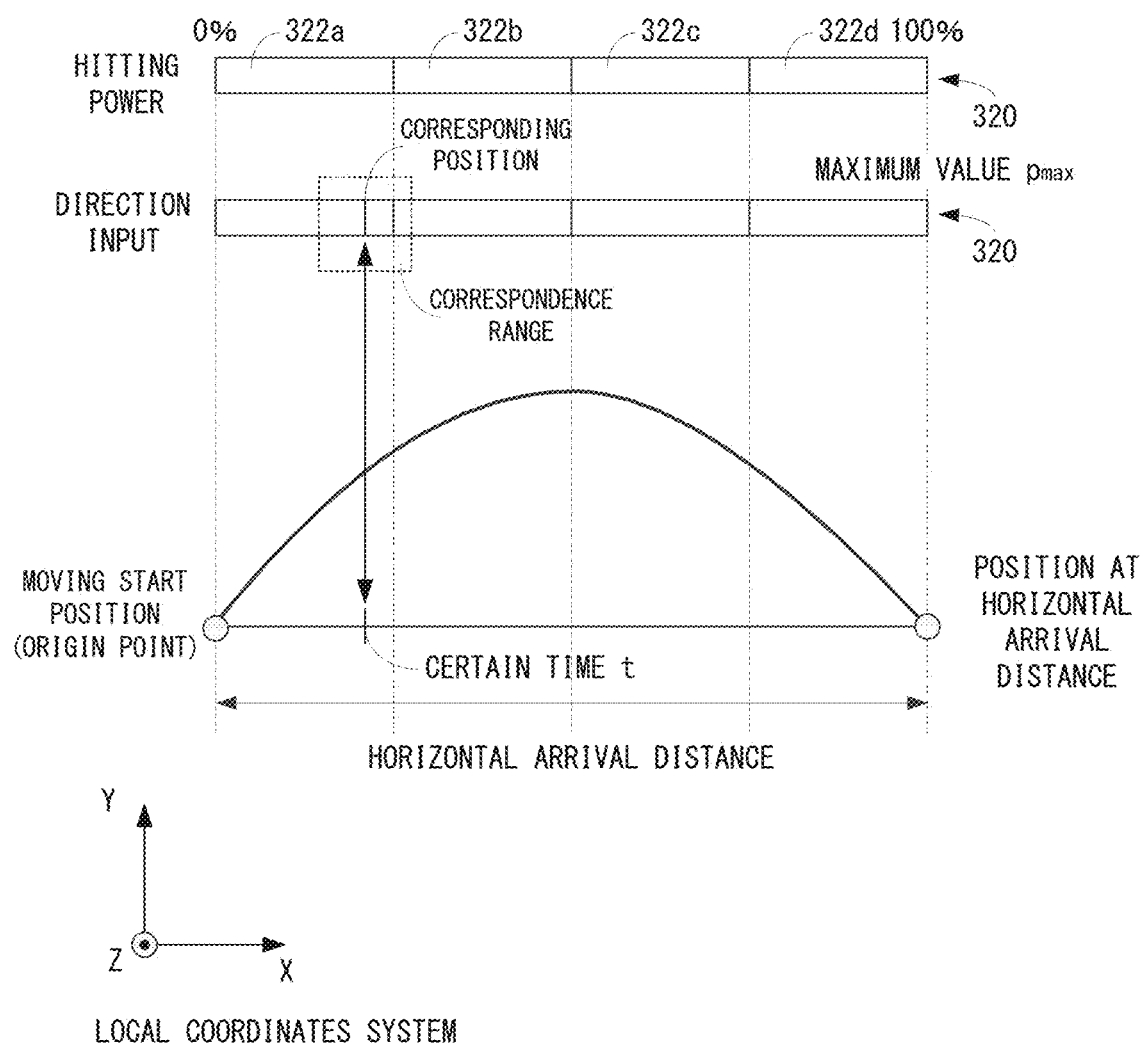
FIG. 17 is a view showing a non-limiting example method that determines a direction input affecting a trajectory of a ball in a certain time.

FIG. 17 shows an example of the reference trajectory based respectively on the movement gauge 320 when the hitting power is determined to 100%, the direction inputs for each of the operation sections 322a-322d detected in this case and the hitting power. Since the hitting power is 100% as shown in FIG. 17, a period of time that the second index image 330 is moved on the operation sections 322a-322d is the direction input period. Moreover, in FIG. 17, the movement gauge 320 is drawn sideways, and the reference trajectory is drawn corresponding to the movement gauge 320.

In addition, although a case where the hitting power is 100% is shown in FIG. 17, and a method of changing the trajectory of the ball 306 will be described using this FIG. 17, the same may be applied to a case where the hitting power is less than 100%.

As an example, it is conceivable that the horizontal distance $d_n$ of the reference trajectory at a certain time t (frame) is acquired from the correspondence table, a single section direction input is specified in a position corresponding to this horizontal distance $d_n$, and the trajectory of the ball 306 is changed by using this specified single section direction input. The horizontal distance $d_n$ of the reference trajectory at a certain time t is the horizontal distance $d_n$ corresponding to the number of moving frames from a moving start until the time t.

In addition, since this single section direction input is the direction input that a plurality of direction inputs are integrated into one for each of the operation sections 322a-322d as described above, especially, when straddling the operation section 322a-322d, there is a possibility that the trajectory of the ball 306 is not changed smoothly.

Therefore, in this embodiment, as shown by a dotted line frame in FIG. 17, an average value of a plurality of section direction inputs for several frames to a dozen frames before and after with center on the section direction input at the position corresponding to the horizontal distance $d_n$ at a certain time t is calculated, and the position of the ball 306 in a next frame is calculated using the averaged section direction input. Accordingly, also in a case of straddling operation sections 322a-322d, the trajectory of the ball 306 can be changed more smoothly.

In this embodiment, when the direction input period expires, a range of the number p of operation frames that effects on the trajectory of the ball 306 (hereinafter, referred to as "correspondence range") is determined for each horizontal distance $d_n$ (or the number n of moving frames) in the correspondence table. Then, when calculating the position of the ball 306 of a next frame, an average value of a plurality of section direction inputs included in the correspondence range that corresponds to the horizontal distance $d_n$ of the trajectory in the current frame is calculated.

However, the above-described method is an example, and should not be needed to be limited. In other embodiments, basically, the position of the ball 306 of the next frame is calculated using the section direction input of the position corresponding to the horizontal distance $d_n$ at a certain time t, only when an effect of one frame straddles the sections as such in a case where a start time of one frame corresponds to near the trailing end of the operation section 322a, 322b or 322c and an end time of this one frame corresponds to near the start of a next operation section 322b, 322c or 322d, depending on a ratio of time in one frame, a next position of the ball 306 may be calculated by using a section direction input obtained by combining the section direction inputs of two adjacent sections.

When calculating the position of the ball 306 of the next frame, a velocity vector of the ball 306 in the current frame and a two-dimensional vector on the average value of a plurality of section direction inputs included in the correspondence table corresponding to the horizontal distance $d_n$ of the reference trajectory in the current frame are synthesized with each other.

However, the velocity vector of the ball 306 is a movement direction and a movement amount of the ball 306 in the current frame. The movement direction is gradually changed according to the physical calculation of projectile motion with the launch direction of the ball 306 as the initial direction, and is also changed by the influence of the section direction input. Moreover, the movement amount is a value that the horizontal distance $d_n$ up to the current frame is subtracted from the horizontal distance $d_{n+1}$ up to the next frame. The horizontal distance is acquirable from the correspondence table shown in FIG. 16.

Figure 18A:
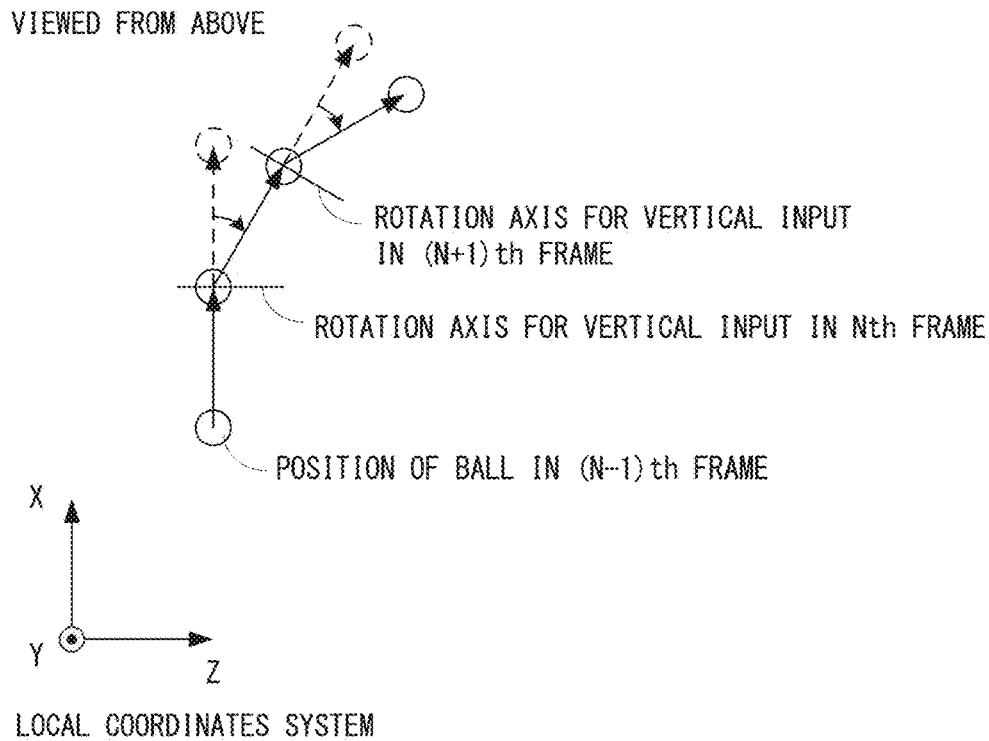
FIG. 18A is a view showing a non-limiting example method that rotates a velocity vector of a ball rightward.
Figure 18B:
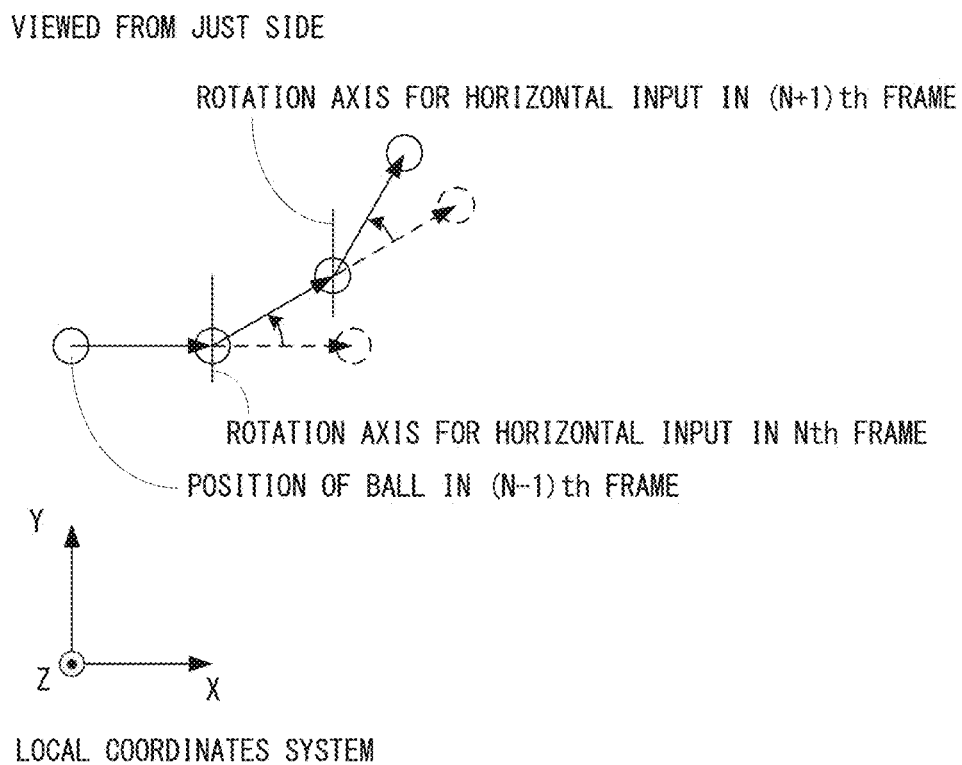
FIG. 18B is a view showing a non-limiting example method that rotates the velocity vector of the ball upward.

Moreover, in this embodiment, as shown in FIG. 18A and FIG. 18B, the velocity vector is rotated for each of a horizontal (left and right) component and a vertical (up and down) component of the two-dimensional vector indicative of the averaged section direction input.

However, the movement of the ball 306 is calculated by the above-described local coordinates system, and FIG. 18A is a view that the virtual space of the local coordinates system is viewed from right above, and FIG. 18B is a view that the virtual space of the local coordinates system is viewed from just beside.

In addition, as shown in FIG. 18A and FIG. 18B, in the immediately before the frame N (i.e., the frame N−1), the velocity vector is parallel to a direction of the X-axis of the local coordinates system, and intersects perpendicularly with each of the Y-axis and the Z-axis of the local coordinates system.

Moreover, in FIG. 18A and FIG. 18B, for simplicity, magnitudes of the velocity vectors in respective frames are made the same. Actually, the tilt amount of the analog stick 32, that is, the strength of the direction input is also taken into consideration.

Furthermore, a vertical (up and down) input rotation axis shown in FIG. 18A corresponds to a rotation axis in a case of tilting the analog stick 32 in the vertical direction, and a horizontal (left and right) input rotation axis shown in FIG. 18B corresponds to a rotation axis in a case of tilting the analog stick 32 to the horizontal direction.

As shown in FIG. 18A, the velocity vector of the frame N is rotated around the horizontal input rotation axis perpendicular the vertical input rotation axis with respect to the last (frame N−1) velocity vector according to the direction input of the horizontal direction. An example shown in FIG. 18A is rotated about 30 degrees rightward centering on the horizontal input rotation axis. Moreover, as shown in FIG. 18A, when an orientation of the movement vector of the frame N+1 is to be determined by the averaged section direction input, the horizontal input rotation axis is parallel to the Y-axis of the local coordinates system. Although detailed description is omitted, the velocity vector of the next frame N+1 is rotated about 30 degrees rightward centering on the horizontal input rotation axis with respect to a direction of the velocity vector of the frame N.

Moreover, as shown in FIG. 18B, the velocity vector of the frame N+1 is rotated around the vertical input rotation axis perpendicular the horizontal input rotation axis with respect to the last velocity vector according to the direction input of the vertical direction. In an example shown in FIG. 18B, the velocity vector of the next frame N+1 is rotated about 30 degrees upward centering on the vertical input rotation axis. Moreover, as shown in FIG. 18B, when an orientation of the movement vector of the frame N+1 is to be determined by a vertical component of the averaged section direction input, the vertical input rotation axis is parallel to the Z-axis of the local coordinates system. Although detailed description is omitted, the velocity vector of the next frame N+1 is rotated about 30 degrees upward centering on the vertical input rotation axis with respect to a direction of the velocity vector of the frame N.

Thus, the movement vector is rotated around the horizontal input rotation axis and the vertical input rotation axis, respectively using the two-dimensional vector for the averaged section direction input, whereby the position of the ball 306 of the next frame N+1 in a local coordinate can be calculated.

In addition, when displaying a game image, the position of the ball 306 calculated in the local coordinates system is converted into the position of the ball 306 of a world coordinates system.

Moreover, change of the trajectory by the direction input is performed up to the horizontal arrival position on the reference trajectory, that is, up to a maximum value of the number of moving frames ($n_{max}$) of in the correspondence table.

However, by the time that the number of moving frames progresses up to the maximum value of the correspondence table, if the ball 306 is cupped-in, if the ball 306 collides an object of the ground (e.g., fairway, bunker, rough, water hazard, OB (out of bounds)), if the ball 306 collides an object placed on the ground (e.g., tree, building, wall), or the ball 306 collides an object arranged in the air (e.g., airship, balloon, block floating in the air), the change of the trajectory by the direction input is ended.

Moreover, even when the number of moving frames progresses up to the maximum value of the correspondence table, if the ball 306 is not cupped-in, or if the ball does not collide the object of the ground, the object arranged on the ground or the object in the air, the ball 306 is moved until it collides any object in a direction of the velocity vector calculated at last while being affected by the influence of gravity in the virtual space.

However, the influence of air resistance in the virtual space and lift associated with ball spin may also be taken into consideration.

When the ball 306 collides with the fairway object or the rough object, processing such that the ball 306 rolls and further stops after the ball 306 bounces by the fairway object or the rough object is executed. However, the processing of bouncing or rolling is changed according to a state of the lie. Moreover, when the ball 306 collides the water hazard object and the OB object, processing such that the ball 306 stops at the time of collision with the water hazard object and the OB object, and then, the ball 306 is automatically moved in a position for hitting after applying penalty is executed. Furthermore, if the ball 306 collides with the bunker object, processing such that the ball 306 sinks into sand as it is and stops is executed, or processing such that the ball stops after bouncing and rolling is executed. Moreover, when the ball 306 collides the object placed on the ground, it bounces off, moves in a different direction, or falls on the spot. When the ball 306 bounces or moves in a different direction, thereafter, the ball 306 collides with the ground object or the water hazard object as described above. Hereinafter, these processing will be collectively referred to as "movement stop processing".

Moreover, until the ball 306 is cupped-in, the player character 302 is automatically moved to a position for hitting the ball 306 next (hereinafter, referred as to "next hitting position"), and is placed in an address state. That is, the parameter determination screen 300 for next moving the ball 306 is displayed on the display 12. However, the player character 302 may be moved according to an operation of the player to the next hitting position. In this case, an item may be acquirable during movement.

If the ball 306 is cupped-in, the score of the hole that the ball 306 is cupped-in is calculated and recorded. Then, when there is a next hole, the player character 302 is automatically moved to a teeing area of the next hole. When there is no next hole, a total score of the player character 302 is calculated and recorded, and the golf game about the golf course played this time is completed.

In addition, when playing with a further player(s), processing as described above is executed also for the further player(s). However, an order of hitting is determined according to the rule of golf, and the golf game is advanced.

Figure 19:
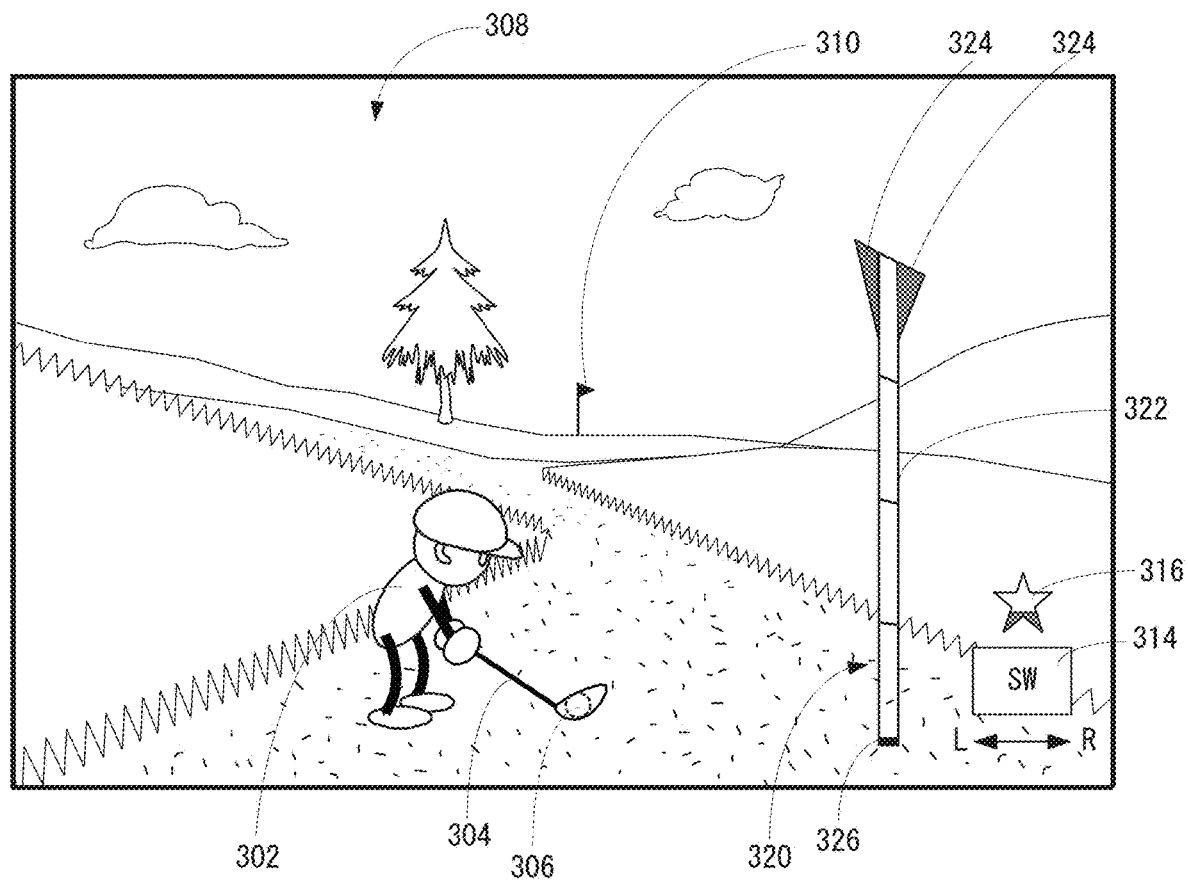
FIG. 19 is a view showing a non-limiting seventh example parameter determination screen.

Moreover, FIG. 19 shows a non-limiting example parameter determination screen 300 in a case of hitting the ball 306 existing in the bunker. On the parameter determination screen 300 shown in FIG. 19, length of the movement gauge 320 is set to be shorter in comparison with a case of hitting the ball 306 existing on the fairway. In an example shown in FIG. 19, the length is set to 80% of length of the movement gauge 320 of other parameter determination screens 300 shown in the FIG. 8 etc. This is because, in the golf of general sports, a bunker shot or sand shot has a shorter flight distance than hitting a ball 306 on the fairway. Therefore, although illustration is omitted, in a case of so-called flied egg lie, the movement gauge 320 is set to the length 50% of length of the movement gauge 320 of other parameter determination screens 300 shown in the FIG. 8 etc.

However, when shortening the length of the movement gauge 320, a whole of the movement gauge 320 is reduced, and accordingly, the movement speed V1 of the first index image 326 and the movement speed V2 of the second index image 330 are decreased in proportion to the length of the movement gauge 320. Therefore, the direction input period is not shortened due to shortening the movement gauge 320.

Although illustration is omitted, in a case of hitting the ball 306 existing in the rough, the length of the movement gauge 320 is shortened according to deepness of the rough. In other embodiments, in also a case where weight of the ball 306 used by the player character 302 is increased or the gravity acceleration g in the virtual space is increased, by an operation of the player or another player or occurrence of a predetermined event, the length of the movement gauge 320 is shortened.

However, in other embodiments, when hitting the ball 306 from a position that difficulty of hitting is relatively high, such as a bunker or rough, it may be possible not to change the movement speed V1 of the first index image 326 and the movement speed V2 of the second index image 330 even if the length of the movement gauge 320 is shortened. In such a case, by shortening a period of time capable of determining the hitting power and the direction input period, difficulty of hitting becomes high and thus difficulty of an operation is increased.

Moreover, in a case where weight of the ball 306 used by the player character 302 is decreased or the gravity acceleration g in the virtual space is decreased, by an operation of the player or another player or occurrence of a predetermined event, the length of the movement gauge 320 is increased. Therefore, even if the hitting power is the same as that in a case where the length of the movement gauge 320 is not made to be long, the flight distance is made be longer. In this case, although the length of the movement gauge 320 becomes long, similar to a case where the length is shortened, a whole of the movement gauge 320 is expanded, and accordingly, the movement speed V1 of the first index image 326 and the movement speed V2 of the second index image 330 are increased in proportion to the length of the movement gauge 320. Therefore, the direction input period does not become long.

Moreover, in the actual golf, a bunk shot is generally easy to come out a missed shot. That is, due to the high difficulty of hitting, the risk area 324 is relatively large even if the club 304 to be used is an iron or a wedge. In an example shown in FIG. 19, although the club 304 is a sand wedge (SW), the risk area 324 is formed from the hitting power of 85% approximately. That is, compared with a case of hitting from the fairway, for example, the risk area 324 is formed from a portion corresponding to a lower hitting power of the movement gauge 320. In addition, in other embodiments, instead of or in addition to such a setting of the risk area 324, the breadth of the risk area 324 may be made wider.

Figure 20:
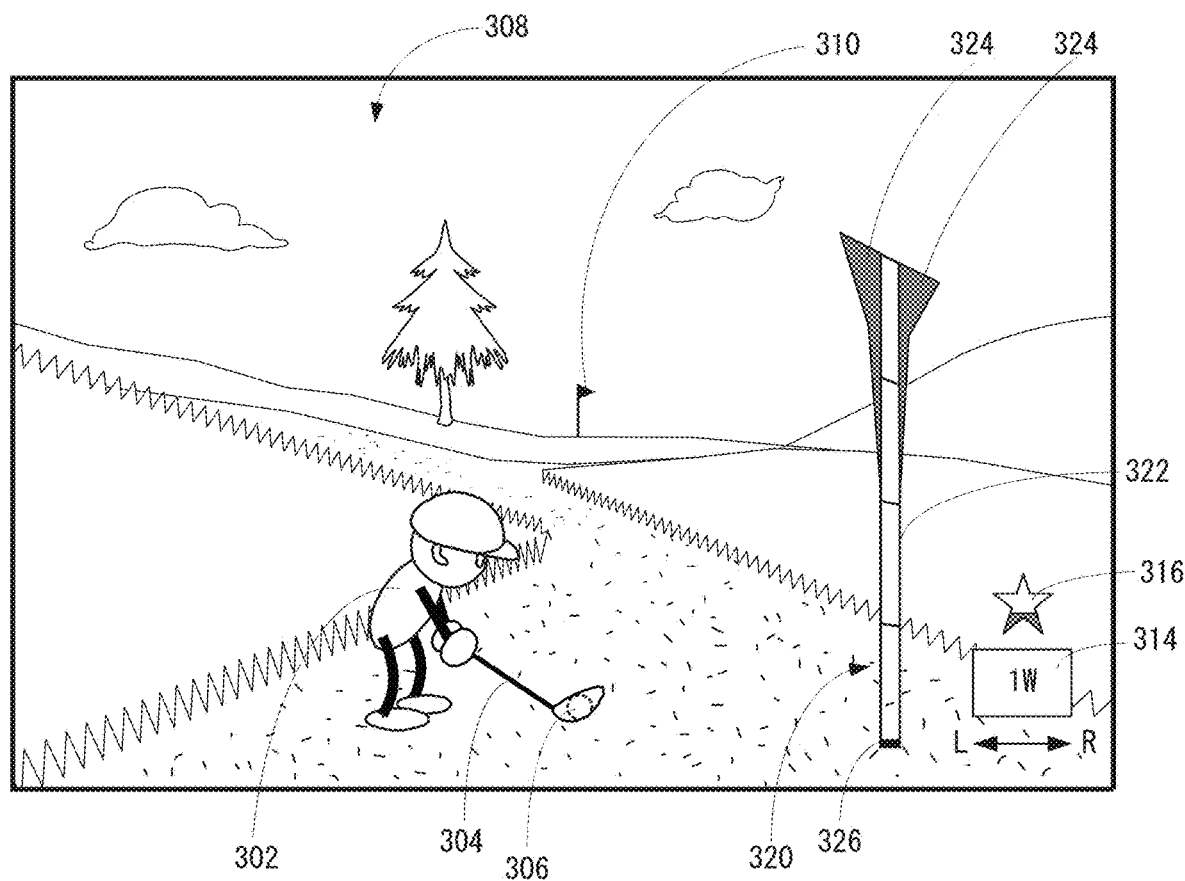
FIG. 20 is a view showing a non-limiting eighth example parameter determination screen.

FIG. 20 shows a non-limiting example parameter determination screen 300 at the time of changing the club 304 to 1 W in the same situation as the parameter determination screen 300 shown in FIG. 19. As for the bunker shot, since when using the 1 W, the difficulty of hitting is higher than a case of using an iron or a wedge, the risk area 324 is further enlarged rather than a case shown in FIG. 19. In an example shown in FIG. 20, the risk area 324 is formed from near 50% hitting power, is increased as the hitting power is increased, and the degree of increase is made larger from near 85% hitting power.

Figure 21:
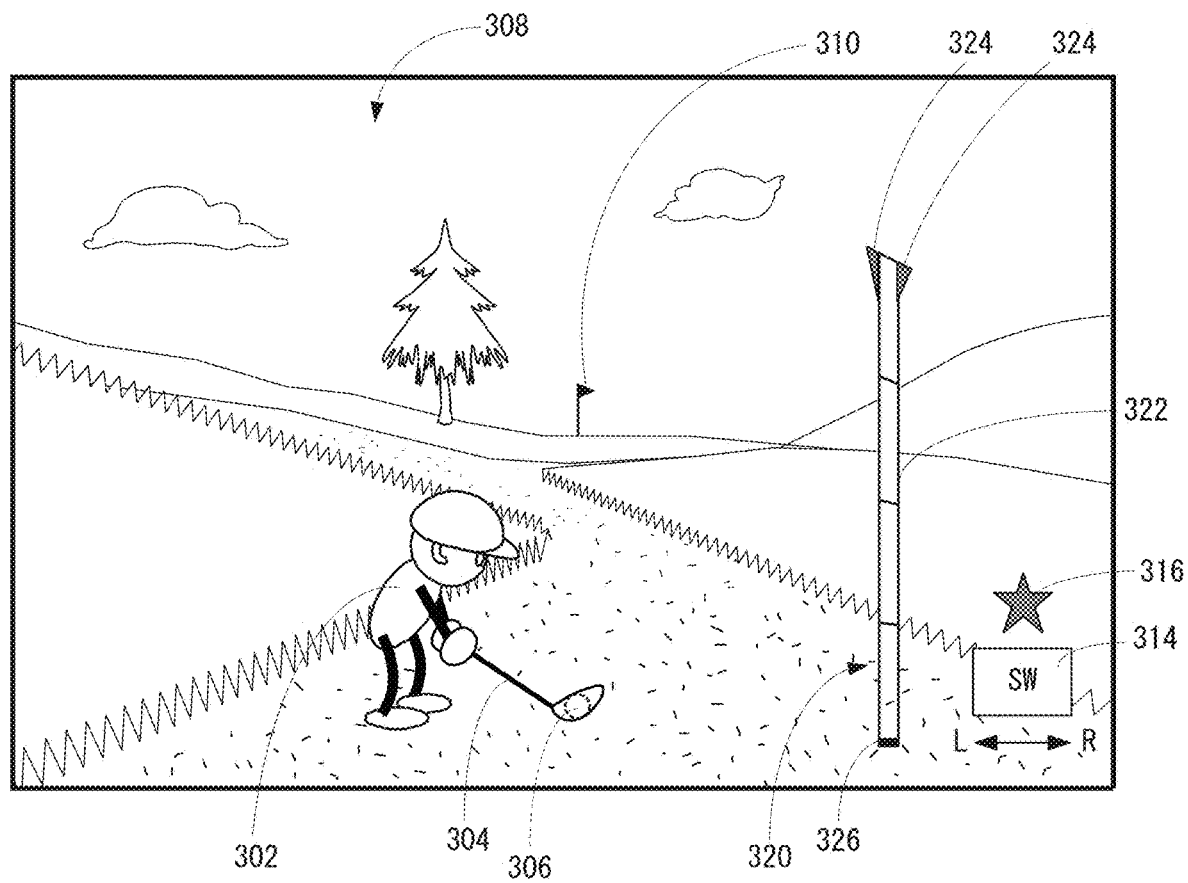
FIG. 21 is a view showing a non-limiting ninth example parameter determination screen.

FIG. 21 shows a non-limiting example parameter determination screen 300 in a state that it is selected to increase the ability of the club 304 to be used when the ability increase parameter reaches the maximum value in the same situation as the parameter determination screen 300 shown in FIG. 19. If the player depresses the Y button 56 when the ability increase parameter reaches the maximum value, it is selected to increase the ability of the club 304 to be used. Then, as shown in FIG. 21, the risk area 324 is reduced. As an example, the length of the vertical direction and the length of the horizontal direction of the risk area 324 are halved, respectively. Thus, if the ability of the club 304 to be used is increased, the risk area 324 is reduced, so that the ball 306 is not significantly deviated. That is, the deviation amount is lessened and directionality when the ball 306 is moved improved.

Although illustration is omitted, as described above, if the player character 302 hits the ball 306 in a state that the ability of the club 304 to be used is increased, the ability increase parameter is made to a minimum value and the color of the star-shaped ability gauge 316 is erased.

In addition, in this embodiment, the deviation amount is decreased when the ability of the club 304 to be used is increased, but it does not need to be limited to this. In another example, the flight distance of the club 304 to be used may be made longer. Alternatively, the flight distance may be increased or the deviation amount may be decreased, depending on the type of club 304 to be used.

Moreover, in this embodiment, although it is described "The ability of the club 304 to be used is increased", since the flight distance is increased or the deviation amount is decreased, it is able also to say that the skill of hitting of the player character 302 is increased. Therefore, dependent on the type of player character 302 to be used, the flight distance may be made longer or the deviation amount may be made to be decreased.

Figure 22:
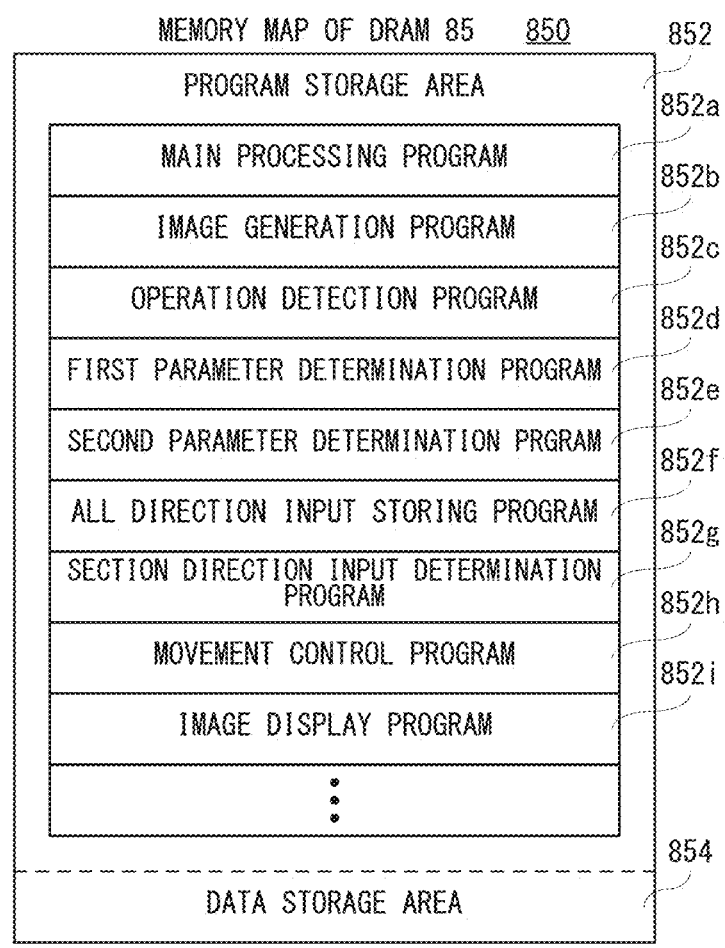
FIG. 22 is a view showing a non-limiting example memory map of a DRAM of a main body apparatus shown in FIG. 6.

FIG. 22 is a view showing a non-limiting example memory map 850 of the DRAM 85 shown in FIG. 6. As shown in FIG. 22, the DRAM 85 includes a program storage area 852 and a data storage area 854. The program storage area 852 is stored with a game application program (i.e., a game program of golf game). As shown in FIG. 22, the game program includes a main processing program 852a, an image generation program 852b, an operation detection program 852c, a first parameter determination program 852d, a second parameter determination program 852e, an all direction input storing program 852f, a section direction input determination program 852g, a movement control program 852h, an image display program 852i, etc. However, a function of displaying images such as a game image is a function that the main body apparatus 2 is provided with. Therefore, the image display program 852i is not included in the game program.

Although detailed description is omitted, at a proper timing after a power of the main body apparatus 2 is turned on, a part or all of each of the programs 852a-852i is read from the flash memory 84 and/or a storage medium attached to the slot 23 so as to be stored in the DRAM 85. However, a part or all of each of the programs 852a-852i may be acquired from other computers capable of performing communication with the main body apparatus 2.

The main processing program 852a is a program for executing overall game processing of a virtual golf game of this embodiment. The image generation program 852b is a program for generating, using image generation data 854b described later, display image data corresponding to various kinds of images such as a game image. The operation detection program 852c is a program for acquiring (receiving) the operation data 854a from the left controller 3 or/and the right controller 4 and the operation data 854a from a further controller so as to store in the data storage area 854 in an identifiable manner. Here, the further controller is a controller equivalent to the left controller 3 or the right controller 4, or a controller equivalent to a controller that the left controller 3 and the right controller 4 are combined with each other.

The first parameter determination program 852d is a program for changing the club 304 to be used, changing the launch direction in the horizontal direction of the ball 306, and for increasing the ability of the club 304 to be used, based on an operation of the player, prior to a start of a second parameter determination operation. However, it is possible to cancel increasing the ability of the club 304 to be used, prior to a start of the second parameter determination operation. The second parameter determination a program 852e is a program for determining the hitting power of the ball 306 and determining a change direction to the reference trajectory of the ball 306 based on an operation of the player, and for determining deviation of the ball 306 irrespective of an operation of the player.

The all direction input storing program 852f is a program for storing the direction inputs detected in the direction input period for each frame, and for rewriting the section direction input that the direction inputs detected in each frame according to the section direction input determination program 852g described later are unified as the direction input of corresponding operation sections 322a-322d for each frame.

The section direction input determination program 852g is a program for determining the section direction input that the direction inputs detected in each frame are unified for each of the operation sections 322a-322d, when the predetermined number of the detection input are detected or when the second index image 330 reaches the trailing end of each of the operation sections 322a-322d.

The movement control program 852h is a program for controlling movement of the ball 306. The trajectory of the ball 306 affected by the deviation and the temporal direction input using the reference trajectory that is determined based on the type of the club 304 and the hitting power, and the ball 306 is moved according to the determined trajectory. However, in this embodiment, the position of the ball 306 after being moved is calculated for each frame. In another example, a whole of trajectory may be calculated prior to the ball 306 starts movement, and the ball may be moved according to the calculated trajectory.

The image display program 852i is a program for outputting to a display device the display image data generated according to the image generation program 852b. Therefore, the images corresponding to the display image data, that is, the parameter determination screen 300, etc. are displayed on the display device such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, as shown in FIG. 23, the data storage area 854 is stored with the operation data 854a, the image generation data 854b, character data 854c, game data 854d, hitting power data 854e, deviation data 854f, direction input data 854g, strength data 854h, correspondence table data 854i, correspondence range data 854j, ball position data 854k and highlighting target data 854m. Moreover, a first parameter determination flag 854n, a second parameter determination flag 854p and a ball movement flag 854q are stored in the data storage area 854.

The operation data 854a is operation data received from the left controller 3 or/and the right controller 4 and operation data received from a further controller(s). In this embodiment, when the main body apparatus 2 receives the operation data from two or more controllers out of the left controller 3, the right controller 4 and the further controller, the main body apparatus 2 stores the operation data 854a with classifying into the respective controllers.

In addition, when a plurality of human players play the golf game, controllers used by the players are associated with the plurality of players or plurality of player characters, respectively, and therefore, the operation data 854a is stored in the data storage area 854 in a manner that the player or player character is identifiable.

Moreover, as for the competitive partner character 352 operated by the computer (processor 81), as an example, the operation data 854a that is generated by the computer (processor 81) is stored in the data storage area 854.

The image generation data 854b is data required for generating the display image data, such as polygon data and texture data. The character data 854c is data concerning on the characters that play the golf game of this embodiment (see FIG. 24). The character data 854c will be described in detail later. The game data 854d is data concerning on a middle or result of the golf game of this embodiment, including play data 900 described later.

The hitting power data 854e is data on a value (%) of the hitting power determined by an operation of the player. The deviation data 854f is data on a direction of deviation and a deviation amount that are determined at random.

The direction input data 854g is data of the direction input detected for each frame during the direction input period in the second parameter determination operation, and after the section direction input is detected, the direction input data detected for each frame is rewritten with the calculated section direction input for each of the operation sections 322a-322d. However, each direction input and each section direction input indicate a tilt direction and a tilt amount of the analog stick 32.

The strength data 854h is data on strength of the section direction input for each of the operation sections 322a-322d. As described above, the strength of the section direction input is classified into four (4) steps according to the magnitude of the tilt amount of the section direction input.

The correspondence table data 854i is data on the correspondence table as shown in FIG. 16. As described above, in the correspondence table, as to the reference trajectory, the horizontal distance $d_n$ is indicated corresponding to the number n of moving frames. The correspondence range data 854j is data on the correspondence range (i.e., a range of the number p of the operation frames) determined for each horizontal distance $d_n$ of the correspondence table.

The ball position data 854k is coordinates data of the current position (in this embodiment, three-dimensional position) of the ball 306 in the virtual space. The highlighting target data 854m is data indicative of the operation section 322a, 322b, 322c or 322d to be highlighted and its arrow image 332 in the movement gauge 320.

The first parameter determination flag 854n is a flag for determining whether the first parameter is to be determined. When performing the first parameter determination operation, the first parameter determination flag 854n is turned on, and when the second parameter determination operation is started, the first parameter determination flag 854n is turned off.

The second parameter determination flag 854p is a flag for determining whether the second parameter is to be determined. When performing the second parameter determination operation, the second parameter determination flag 854p is turned on, and the second parameter determination flag 854p is turned off when the second parameter determination operation is ended and thus the deviation is determined.

The ball movement flag 854q is a flag for determining whether the ball 306 is to be moved. When hitting the ball 306, the ball movement flag 854q is turned on, and when the movement of the ball 306 is stopped, the ball movement flag 854q is turned off.

Although illustration is omitted, the data storage area 854 is stored with other data required for executing the golf game, and is provided with other flags and timer(s) (counter(s)) required for executing the golf game.

Figure 24:
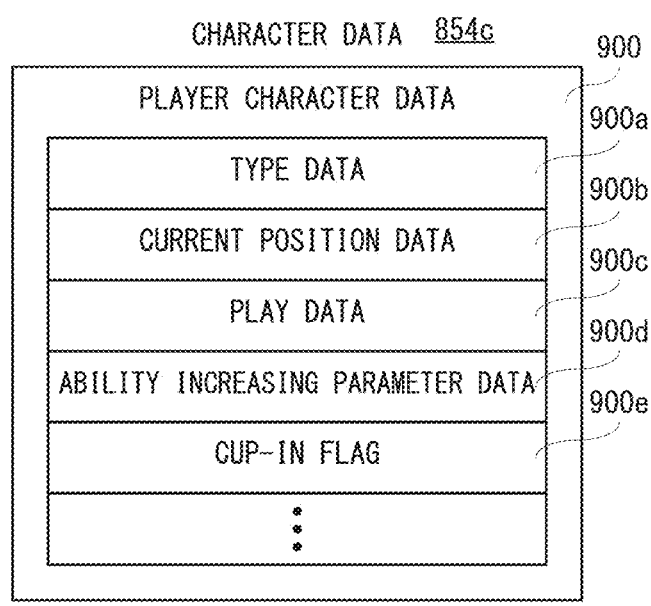
FIG. 24 is a view showing non-limiting example specific contents of character data shown in FIG. 23.

FIG. 24 is a view showing non-limiting example specific contents of the character data 854c shown in FIG. 23. As shown in FIG. 24, the character data 854c is data concerning on the player character 302 and a competitive partner character(s). Since a case where there is no competitive partner character is described in this embodiment, in FIG. 24, the character data 854c includes the player character data 900.

In addition, the contents of character data of each of one or more competitive partner are the same or similar to the player character data 900.

As shown in FIG. 24, the player character data 900 includes type data 900a, current position data 900b, play data 900c, ability increase parameter data 900d, etc. Moreover, the player character data 900 includes a cup-in flag 900e.

The type data 900a is data of a type of the player character 302, and is data concerning on identification information identifying the character selected by the player. The current position data 900b is coordinates data of a current position (in this embodiment, three-dimensional position) of the player character 302 in the virtual space.

The play data 900c is data concerning on the player character 302 in a case of playing the golf game. As an example, in a case of a stroke play, as the play data 900c, data concerning on the number of the strokes that are required from a tee shot up to a cup-in for each hole and a total number of strokes up to a current hole are stored.

The ability increase parameter data 900d is data of a numerical value of the ability increase parameter of the player character 302. The cup-in flag 900e is a flag for determining whether the ball 306 of the player character 302 is cupped-in. In this embodiment, when the ball 306 is cupped-in, the cup-in flag 900e is turned on, and when moving to a next hitting position, the cup-in flag 900e is turned off.

Figure 25:
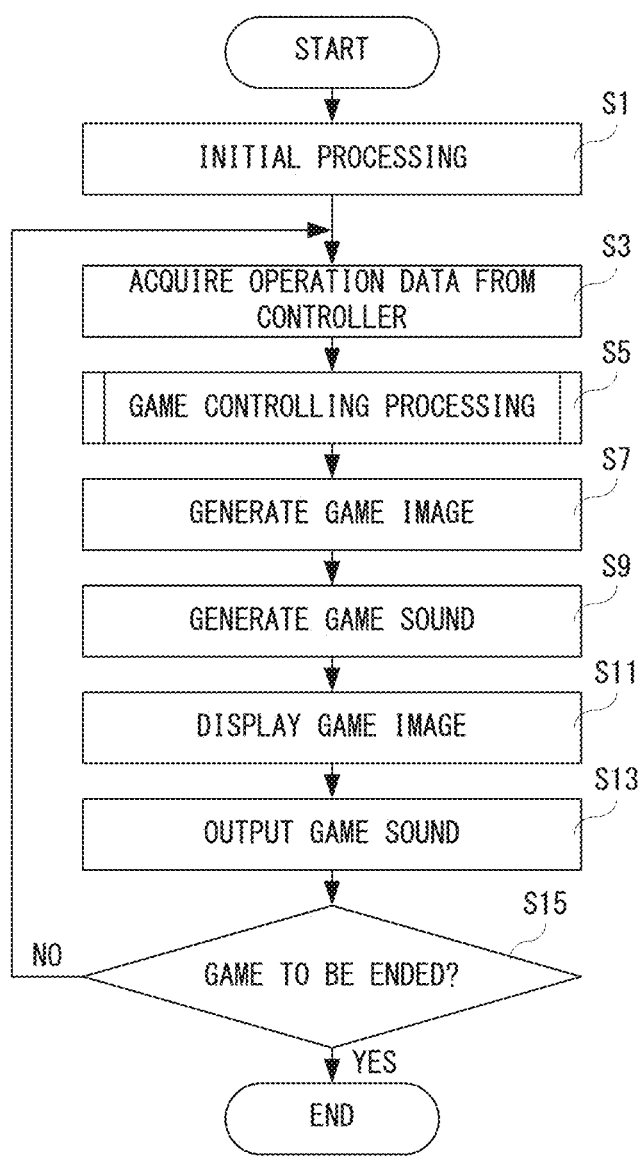
FIG. 25 is a flowchart showing non-limiting example overall game processing of a processor of the main body apparatus shown in FIG. 6.
Figure 26:
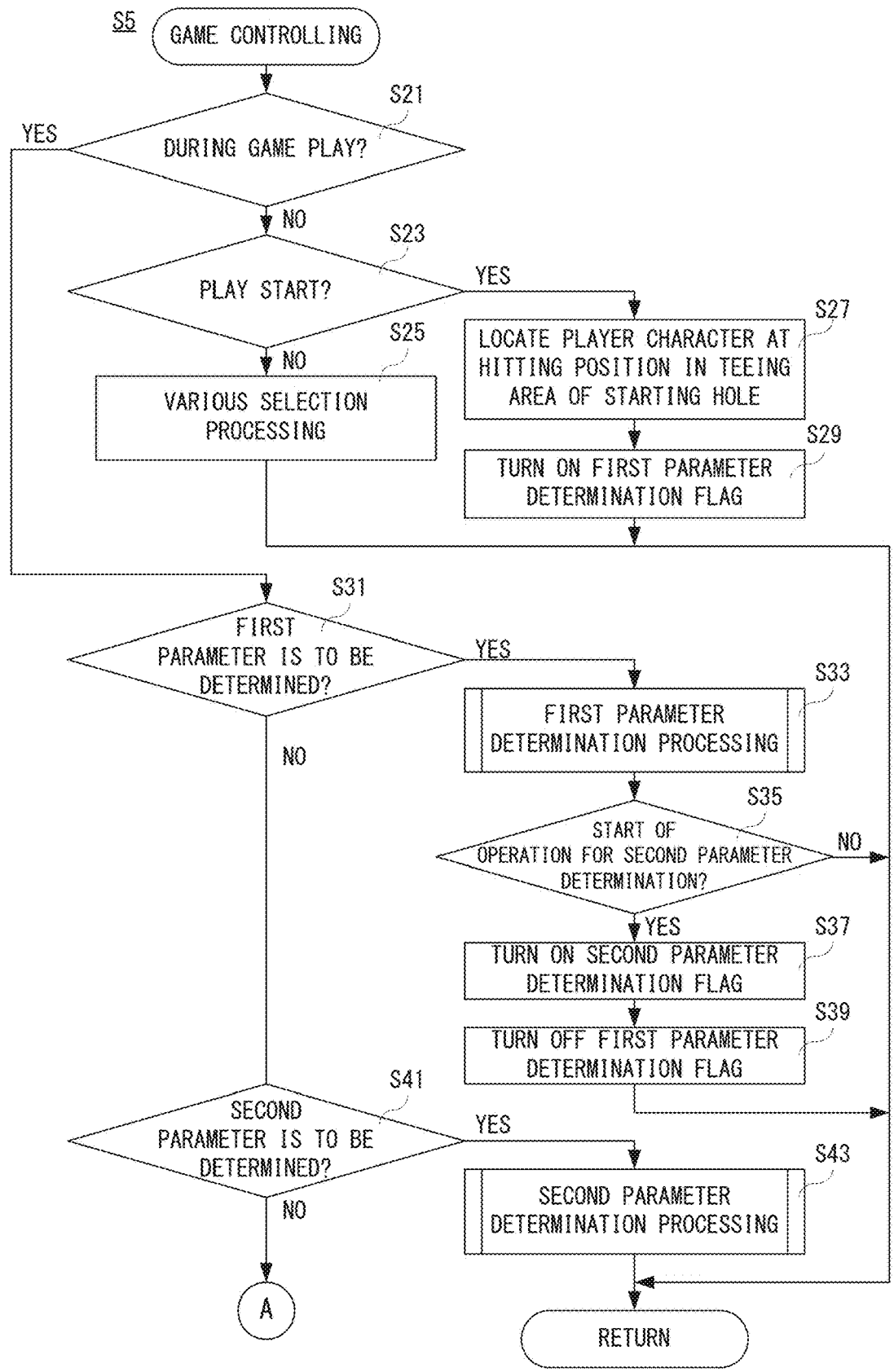
FIG. 26 is a flowchart showing a part of non-limiting example game controlling processing shown in FIG. 25.
Figure 27:
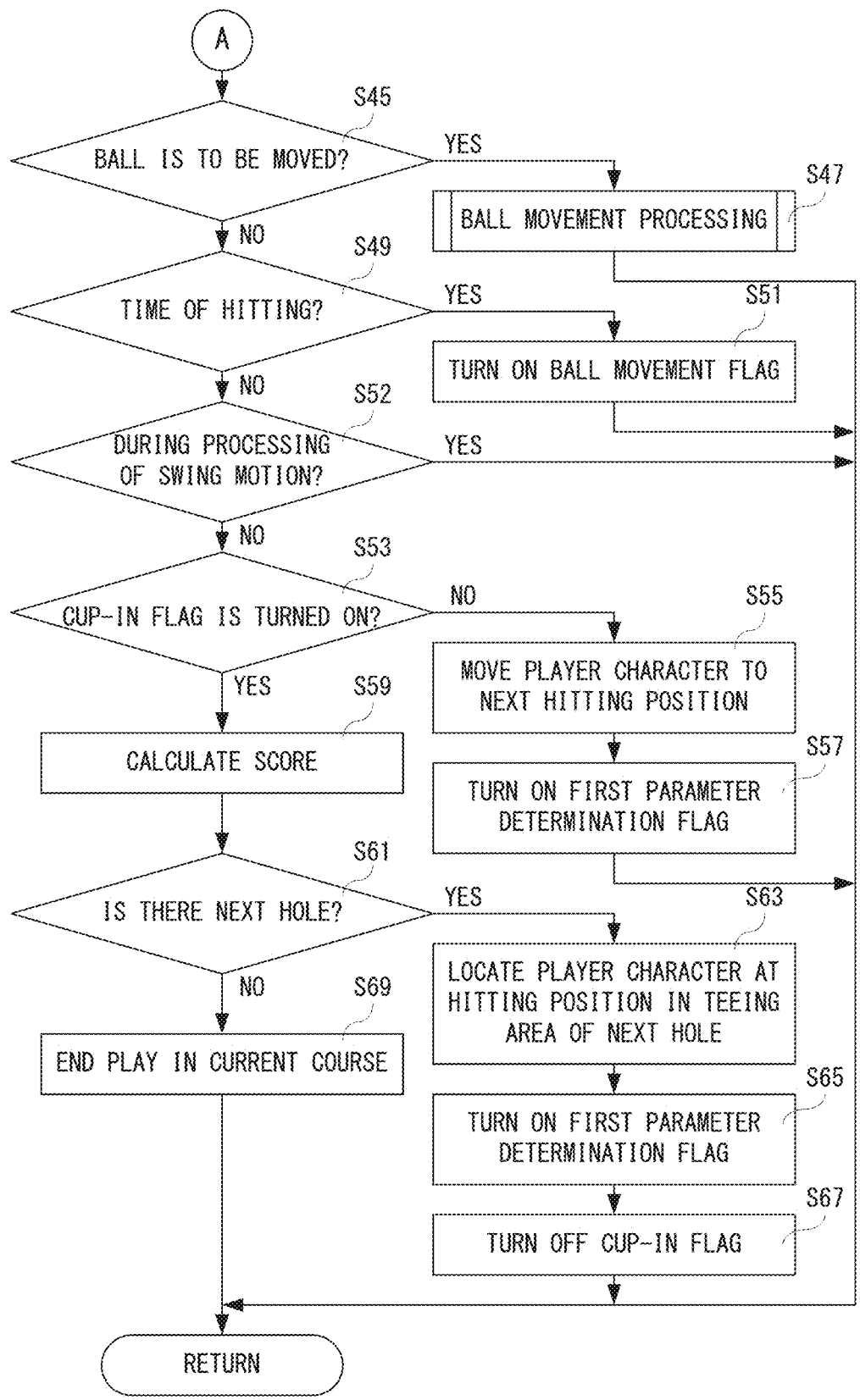
FIG. 27 is a flowchart showing the other part of the non-limiting example game controlling processing shown in FIG. 25, following FIG. 26.
Figure 28:
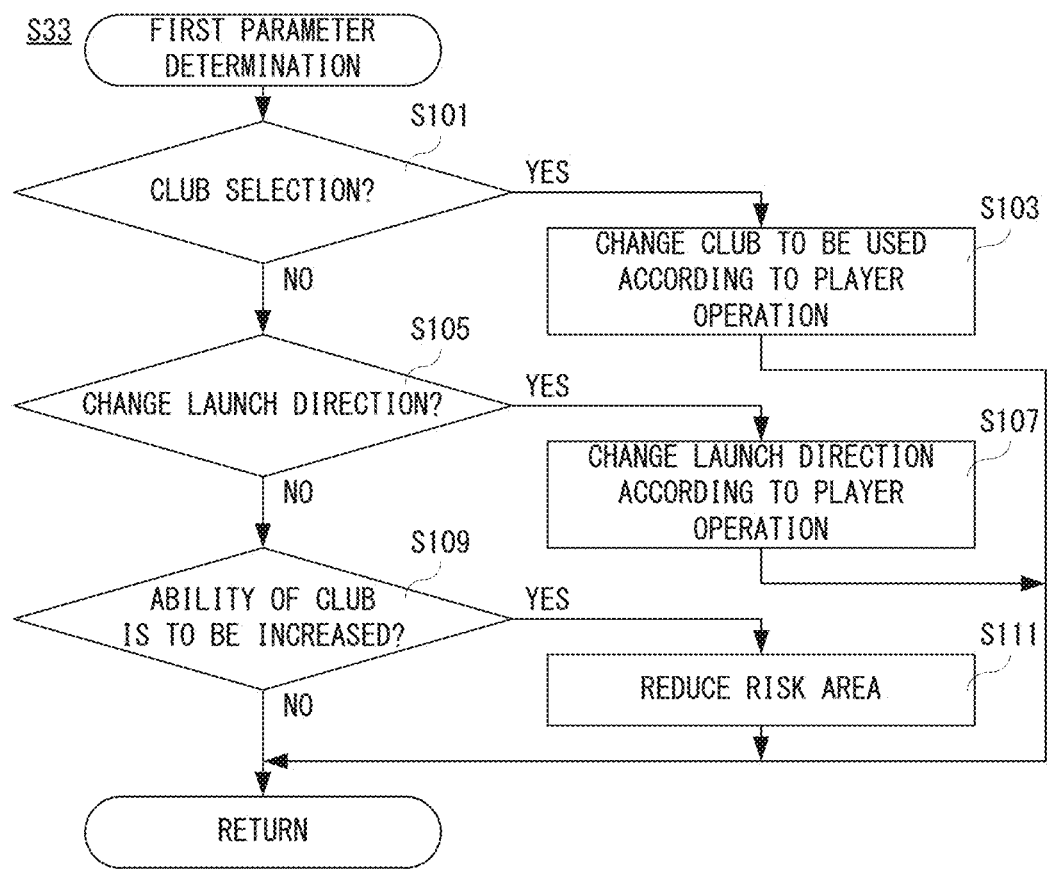
FIG. 28 is a flowchart showing non-limiting example first parameter determination processing shown in FIG. 26.
Figure 29:
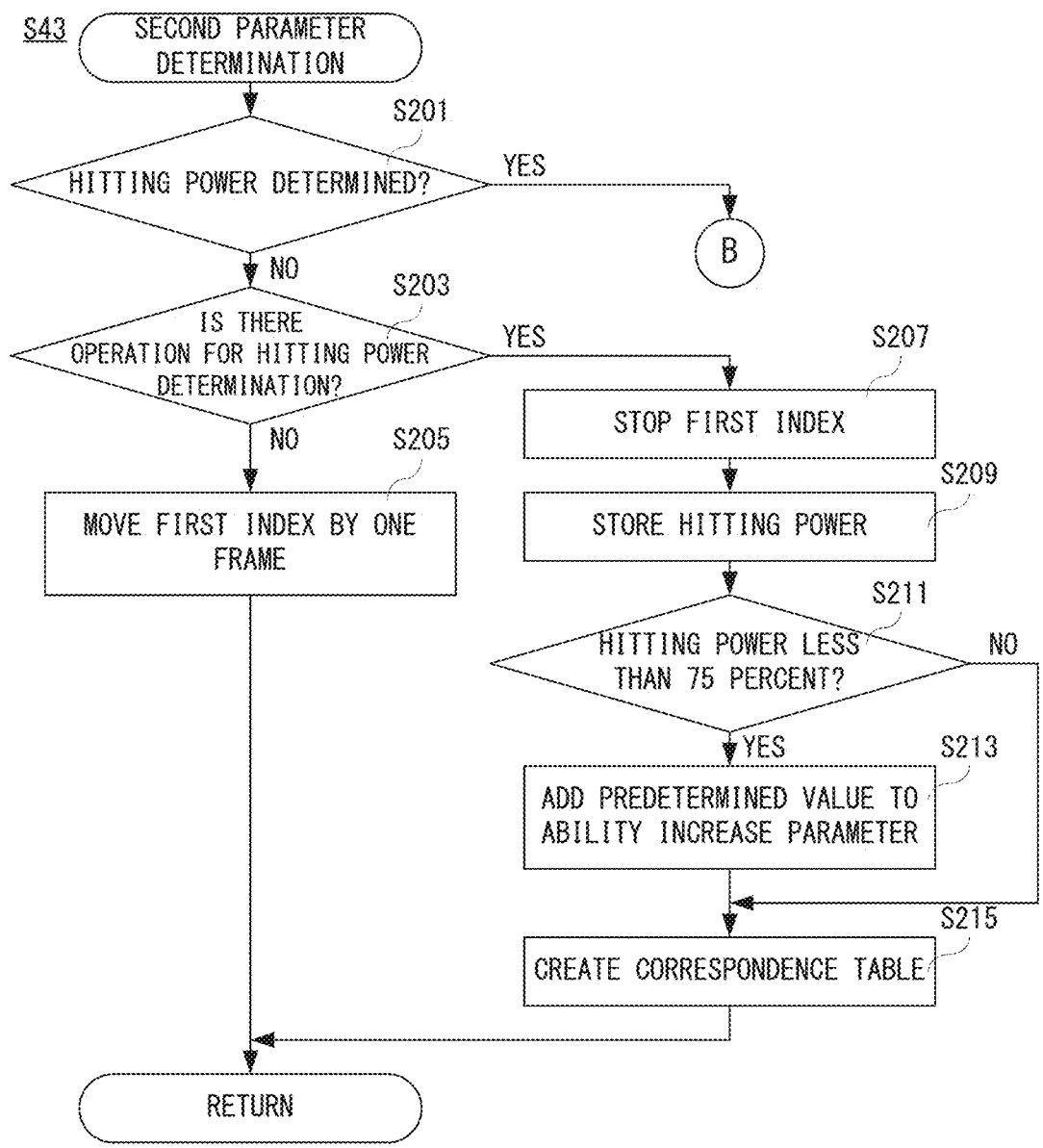
FIG. 29 is a flowchart showing a part of non-limiting example second parameter determination processing shown in FIG. 26.
Figure 30:
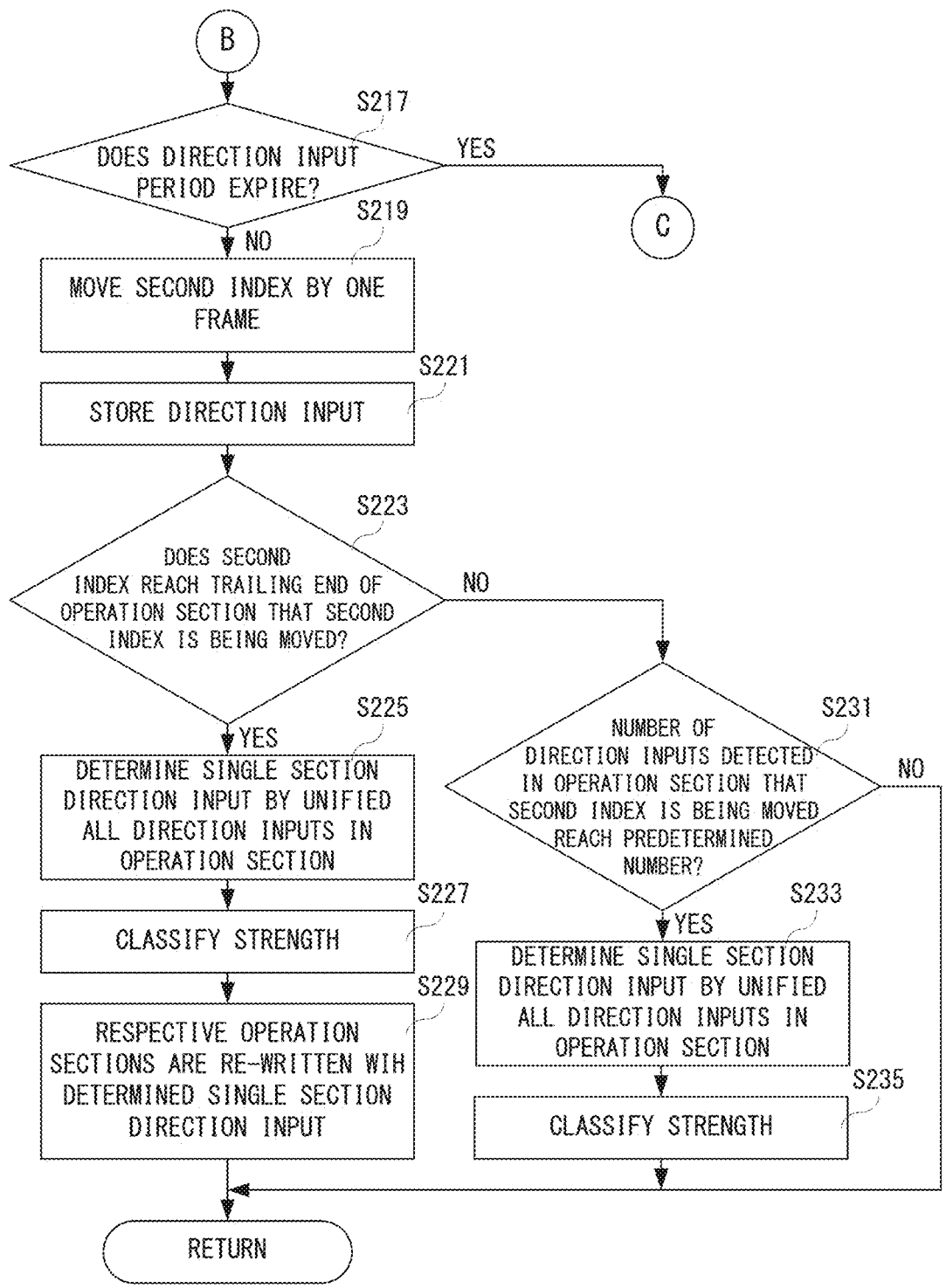
FIG. 30 is a flowchart showing another part of the non-limiting example second parameter determination processing shown in FIG. 26, following FIG. 29.
Figure 31:
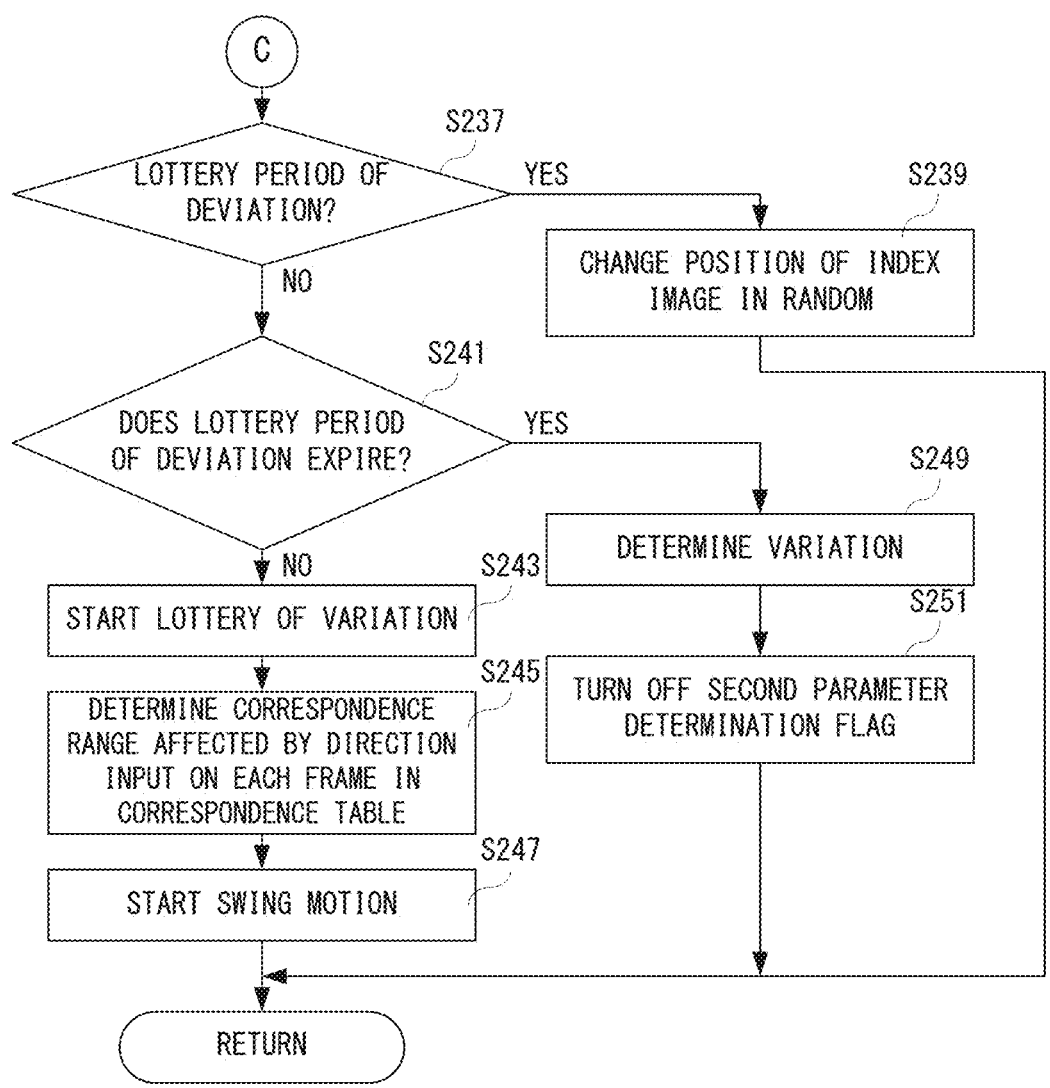
FIG. 31 is a flowchart showing a further part of the non-limiting example second parameter determination processing shown in FIG. 26, following FIG. 30.
Figure 32:
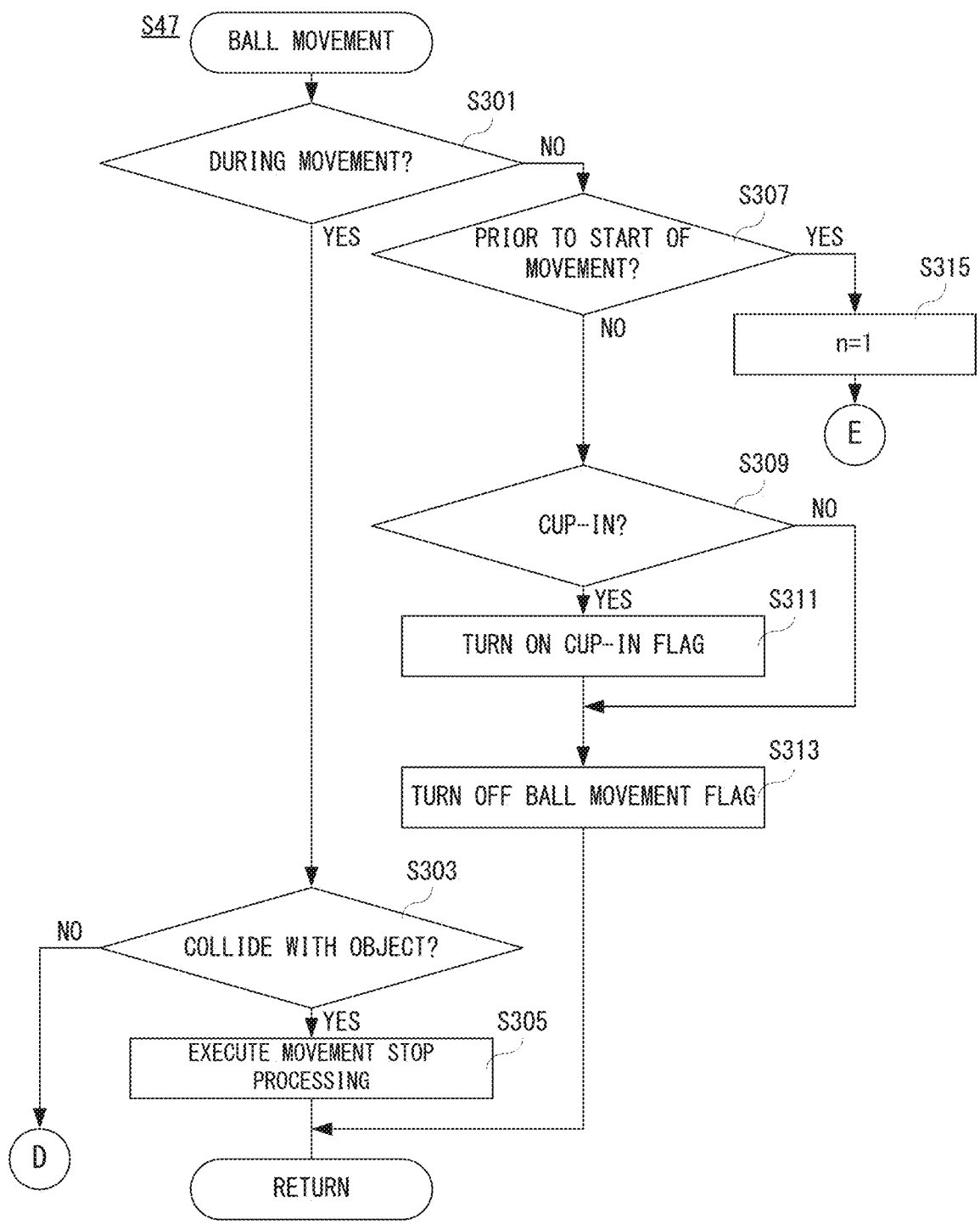
FIG. 32 is a flowchart showing a part of non-limiting example ball movement processing shown in FIG. 26.
Figure 33:
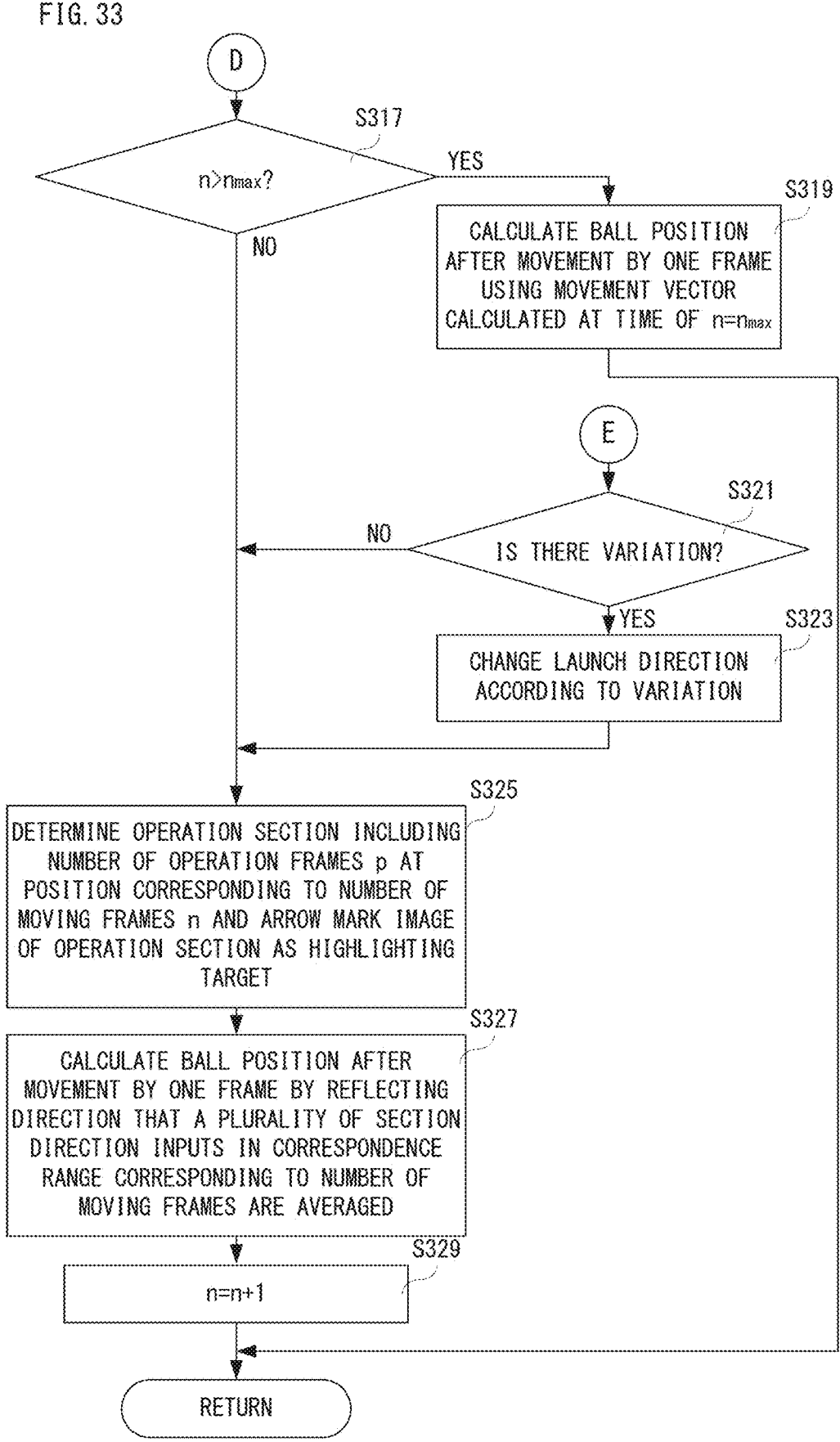
FIG. 33 a flowchart showing another part of the non-limiting example ball movement processing shown in FIG. 26, following FIG. 32.

FIG. 25 is a flowchart showing non-limiting example processing of the game program (i.e., "overall game processing") by the processor 81 (or computer) of the main body apparatus 2. FIG. 26 and FIG. 27 are flowcharts showing non-limiting example game controlling processing by the processor 81 (or computer) of the main body apparatus 2. Furthermore, FIG. 28 is a flowchart showing non-limiting example first parameter determination processing by the processor 81 (or computer) of the main body apparatus 2. Furthermore, FIG. 29-FIG. 31 are flowcharts showing non-limiting example second parameter determination processing of the ball by the processor 81 (or computer) of the main body apparatus 2. Moreover, FIG. 32 and FIG. 33 are flowcharts showing non-limiting example ball movement processing by the processor 81 (or computer) of the main body apparatus 2.

However, in each processing of FIG. 25-FIG. 33, only the processing for the player will be described while omitting processing for other players. The processing for other players is the same as the processing for the player, and is executed so as to hit the ball in an order according to the same rules as the golf of general sports.

In the following, although the overall game processing, the game controlling processing, the first parameter determination processing, the second parameter determination processing and the ball movement processing are described using FIG. 25-FIG. 33, duplicate description on steps executing the same or similar processing will be omitted.

However, processing of respective steps of the flowcharts shown in FIG. 25-FIG. 33 are mere examples, and if the same or similar result is obtainable, an order of the respective steps may be exchanged. Moreover, in this embodiment, it will be described that the processor 81 executes the processing of the respective steps of the flowcharts shown in FIG. 25-FIG. 33 basically; however, some steps may be executed by a processor(s) or/and a dedicated circuit(s) other than the processor 81.

When the power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing if execution of the game program of this embodiment is instructed by the player.

As shown in FIG. 25, if the overall game processing is started, the processor 81 executes initial setting in a step S1. In this embodiment, a game selection screen for selecting a golf game of stroke play or a golf game of match play is displayed, and a type of the golf game to be played is determined according to a selection operation of the player. Although a case where a player selects the stroke play will be described in the following, when a plurality of players play the stroke play, the golf game is advanced by hitting balls in an order of farer distance to the cup from the ball according to general rules of the actual golf. Moreover, when the match play is selected, the golf game is advanced according to the rule of the match play.

In a subsequent step S3, operation data 854a sent from the left controller 3 or/and the right controller 4 is acquired, and in a step S5, the game controlling processing (see FIG. 26 and FIG. 27) described later in detail is executed. However, in the step S3, the acquired operation data 854a is stored in the data storage area 854.

In a next step S7, a game image is generated. Here, the processor 81 generates, based on a result of the game controlling processing in the step S5, game image data corresponding to the game images (i.e., various screens such as the parameter determination screen 300, etc.). In addition, when generating the game image data corresponding to the parameter determination screen 300, according to the type of club 304 and the lie of the ball 306, a size of the movement gauge 320 (including the risk area 324) is changed appropriately. Moreover, when processing of a swing motion of the player character 302 is executed in parallel to the game controlling processing, the game image data is generated based on a result of the game controlling processing and a result of the swing motion.

Moreover, in a step S9, a game sound is generated. Here, the processor 81 generates sound data corresponding to the game sound according to the result of the game controlling processing in the step S5.

Subsequently, the game image is displayed in a step S11. Here, the processor 81 outputs the game image data generated in the step S7 to the display 12. Moreover, in a step S13, the game sound is output. Here, the processor 81 outputs the game sound data generated in the step S9 to the speaker 88 through the codec circuit 87.

Then, in a step S15, it is determined whether the game is to be ended. Determination in the step S15 is executed according to whether the player instructs to end the game, and so on. If "NO" is determined in the step S15, that is, if the game is not to be ended, the process returns to the step S3. On the other hand, if "YES" is determined in the step S15, that is, if the game is to be ended, the overall game processing is ended.

As shown in FIG. 26, if the game controlling processing is started shown in the step S5, the processor 81 determines, in a step S21, whether it is during play of the golf game. If "YES" is determined in the step S21, that is, if it is during the play of the golf game, the process proceeds to a step S31. On the other hand, if "NO" is determined in the step S21, that is, if it is not during the play of the golf game, it is determined, in a step S23, whether it is a start of the golf game. Here, the processor 81 determines whether a start of the golf game is instructed by the player.

If "NO" is determined in the step S23, that is, if it is not a start of the golf game, various selection processing is executed in a step S25, and the game controlling processing is ended, and the process returns to the overall game processing shown in FIG. 25.

In addition, the above-described various selection processing are selection processing of a player character and selection processing of a golf course. When playing the golf game of stroke play, selection processing of the number of the players and types of respective other players (i.e., a human being or a computer), and selection processing of the number of holes are further executed. Moreover, when playing the golf game of match play, selection processing of the type of another player that is an opponent is executed. Although illustration is omitted, the processor 81 starts the golf game in response to an operation of the player after ending various selection processing.

On the other hand, if "YES" is determined in the step S23, that is, if it is a start of the golf game, the player character 302 is located in a hitting position of a teeing area of a start hole in a step S27, and the first parameter determination flag 854n is turned on in a step S29, and then, the process returns to the overall game processing. Moreover, if "YES" is determined in the step S21, that is, if it is during the play of the golf game, it is determined, in a step S31, whether a first parameter is to be determined. Here, the processor 81 determines whether the first parameter determination flag 854n is turned on. If "NO" is determined in the step S31, that is, if the first parameter is not to be determined, the process proceeds to a step S41.

On the other hand, if "YES" is determined in the step S31, that is, if the first parameter is to be determined, the first parameter determination processing (see FIG. 28) described later is executed in a step S33, and it is determined, in a step S35, whether it is a start of the second parameter determination operation. Here, the processor 81 determines whether the A-button 53 is depressed when the parameter determination screen 300 in a state that the first index image 326 is stopped at the initial position is being displayed. However, when executing the first parameter determination processing in the step S33, the processor 81 generates, in the overall game processing, the game image of the parameter determination screen 300 as shown in FIG. 8 and FIG. 19-21 to output to the display 12.

If "NO" is determined in the step S35, that is, if it is not a start of the second parameter determination operation, the process returns to the overall game processing. On the other hand, if "YES" is determined in the step S35, that is, if it is a start of the second parameter determination operation, the second parameter determination flag 854p is turned on in a step S37, and the first parameter determination flag 854n is turned off in a step S39, and then, the process returns to the overall game processing.

In the step S41, it is determined whether the second parameter is to be determined. Here, the processor 81 determines whether the second parameter determination flag 854p is turned on. If "YES" is determined in the step S41, that is, if the second parameter is to be determined, the second parameter determination processing (see FIG. 29-FIG. 31) described later is executed in a step S43, and then, the process returns to the overall game processing. However, at the time of executing the second parameter determination processing in the step S43, the processor 81 generates, in the overall game processing, the game image of the parameter determination screen 300 as shown in FIG. 9-FIG. 12 to output to the display 12.

On the other hand, if "NO" is determined in the step S41, that is, if the second parameter is not to be determined, it is determined that the ball 306 is to be moved in a step S45 shown in FIG. 27. Here, the processor 81 determines whether the ball movement flag 854q is turned on.

If "YES" is determined in the step S45, that is, if the ball 306 is to be moved, in a step S47, the ball movement processing (see FIG. 32 and FIG. 33) described later is executed in a step S47, and then, the process returns to the overall game processing. On the other hand, if "NO" is determined in the step S45, that is, if the ball 306 is not to be moved, it is determined, in a step S49, whether it is a timing that the player character 302 has hit the ball 306.

If "YES" is determined in the step S49, that is, if it is a timing that the player character 302 has hit the ball 306, the ball movement flag 854q is turned on in a step S51, and then, the process returns to the overall game processing. On the other hand, if "NO" is determined in the step S49, that is, if it is not a timing that the player character 302 has hit the ball 306, it is determined, in a step S52, whether it is during processing of the swing motion.

If "YES" is determined in the step S52, that is, if it is during the processing of the swing motion, it is determined that it is prior to hitting the ball 306 after the player character 302 starts a swing motion, and then, the process returns to the overall game processing. On the other hand, if "NO" is determined in the step S52, that is, if it is not during the processing of the swing motion, it is determined, in a step S53, whether the cup-in flag 900e is turned on.

If "NO" is determined in the step S53, that is, if the cup-in flag 900e is turned off, the player character 302 is made to be moved to a next hitting position in a step S55, and the first parameter determination flag 854n is turned on in a step S57, and then, the process returns to the overall game processing. On the other hand, if "YES" is determined in the step S53, that is, if the cup-in flag 900e is turned on, the score is calculated in a step S59. Here, the processor 81 calculates the score of the cupped-in hole, and the total score up to the current hole.

In a subsequent step S61, it is determined whether there is a next hole to be played. If "YES" is determined in the step S61, that is, if there is a next hole to be played, the player character 302 is made to be moved to a next hitting position of a teeing area of the next hole in a step S63, the first parameter determination flag 854n is turned on in a step S65, and the cup-in flag 900e is turned off in a step S67, and then, the process returns to the overall game processing.

On the other hand, if "NO" is determined in the step S61, that is, if there is no next hole to be played, the play of the current golf course is ended in a step S69, and the process returns to the overall game processing.

In addition, although illustration is omitted, as described later, after swing motion of the player character 302 is started, processing of the swing motion of the player character 302 in parallel to the game controlling processing shown in FIG. 26 and FIG. 27 is executed. In the processing of the swing motion of the player character 302, an animation frame of the swing motion of the player character 302 is advanced for each frame to the last animation frame.

As shown in FIG. 28, if the first parameter determination processing shown in the step S33 is started, the processor 81 determines, in a step S101, whether it is club selection. Here, the processor 81 determines whether the L-button 38 or the R-button 60 is depressed. If "YES" is determined in the step S101, that is, if it is club selection, the club 304 to be used is changed according to an operation of the player in a step S103, and the process returns to the game controlling processing. On the other hand, if "NO" is determined in the step S101, that is, if it is not club selection, it is determined, in a step S105, whether the launch direction is to be changed. Here, the processor 81 determines whether the analog stick 32 is tilted to the left or the right.

If "YES" is determined in the step S105, that is, if it is change of the launch direction, the launch direction is changed according to an operation of the player in a step S107, and then, the process returns to the game controlling processing. On the other hand, if "NO" is determined in the step S105, that is, if it is not change of the launch direction, it is determined, in a step S109, whether the ability of the club 304 to be used is to be increased. Here, the processor 81 determines whether the Y button 56 is depressed. However, in a case where the ability increase parameter is less than the maximum value (100), even if the Y button 56 is depressed, that operation is made invalid.

If "YES" is determined in the step S109, that is, if the ability of the club 304 to be used is to be increased, the risk area 324 is reduced in a step S111, and then, the process returns to the game controlling processing. On the other hand, if "NO" is determined in the step S109, that is, if the ability of the club 304 to be used is not to be increased, the process returns to the game controlling processing.

As shown in FIG. 29, if the second parameter determination processing shown in the step S43 is started, the processor 81 determines, in a step S201, whether the hitting power has been determined. The processor 81 determines whether the hitting power data 854*e* is stored in the data storage area 854 of the DRAM 85. If "YES" is determined in the step S201, that is, if the hitting power has been determined, the process proceeds to a step 217 shown in FIG. 30. On the other hand, if "NO" is determined in the step S201, that is, if the hitting power has not been determined, it is determined, in a step S203, whether there is a determination operation of the hitting power. Here, the processor 81 determines whether the A-button 53 is depressed when the first index image 326 is being moved in the parameter determination screen 300.

If "NO" is determined in the step S203, that is, if there is no determination operation of the hitting power, the first index image 326 is moved by one frame in a step S205, and then, the process returns to the game controlling processing. As described above, the first index image 326 is moved toward the upper end of the movement gauge 320 from the initial position, and when arriving at the upper end of the movement gauge 320, it is moved toward the initial position. On the other hand, if "YES" is determined in the step S203, that is, if there is a determination operation of the hitting power, the first index image 326 is stopped in a step S207, and the hitting power is stored in a step S209. That is, the processor 81 stores the hitting power data 854*e* corresponding to the determined hitting power to the data storage area 854.

In a next step S211, it is determined whether the determined hitting power is less than 75%. If "YES" is determined in the step S211, that is, if the determined hitting power is less than 75%, a predetermined value (for example, 20) is added to the ability increase parameter in a step S213, and then, the process proceeds to a step S215. On the other hand, if "NO" is determined in the step S211, that is, if the determined hitting power is 75% or more, the process proceeds to the step S215.

In the step S215, the correspondence table as shown in FIG. 16 is created, and the process returns to the game controlling processing. However, the processor 81 stores the correspondence table data 854*i* corresponding to the created correspondence table to the data storage area 854.

As shown in FIG. 30, in the step S217, it is determined whether the direction input period expires. That is, it is determined whether the second index image 330 reaches the position that the first index image 326 is stopped. If "NO" is determined in the step S217, that is, if the direction input period does not expire, the second index image 330 is moved by one frame in a step S219, and a direction input detected at this time is stored in a step S221. As described above, the direction input corresponds to tilt direction and the tilt amount of the analog stick 32, and is divided into the tilt amount of the vertical (up and down) direction, and the tilt amount of the horizontal (left and right) direction in this embodiment.

Then, it is determined, in a step S223, whether the second index image 330 reaches the trailing end of the operation section 322*a*, 322*b*, 322*c* or 322*d* in which the same is being moved. If "YES" is determined in the step S223, that is, if the second index image 330 reaches the trailing end of the operation section 322*a*, 322*b*, 322*c* or 322*d* in which the same is being moved, all the direction inputs in the operation section 322*a*, 322*b*, 322*c* or 322*d* are unified so as to determine single direction input, that is, the section direction input in a step S225, a strength level for the determined single section direction input is classified in a step S227, the determined section direction input is rewritten as respective direction inputs in the operation section 322*a*, 322*b*, 322*c* or 322*d*, and then, the process returns to the game controlling processing.

In addition, as to the operation section 322*a*, 322*b*, 322*c* or 322*d* that the processing of the step S229 is executed, in the subsequent second parameter determination processing, the determined single section direction input and the classified strength are never changed.

The processor 81 rewrites the direction input data corresponding to the respective direction inputs detected in the operation section 322*a*, 322*b*, 322*c* or 322*d* with the section direction input data corresponding to single section direction input that is determined in the step S225, and updates the direction input data 854*g*.

In addition, the single section direction input determined in the step S225 is used for displaying the arrow image 332 in the operation section 322*a*, 322*b*, 322*c* or 322*d* during a time up to the player character 302 hits the ball 306 after the second index image 330 is moved to the trailing end of the operation section 322*a*, 322*b*, 322*c* or 322*d*. Moreover, this arrow image 332 is an image according to the strength level having been classified in the step S227. The same is also applied to a step S235 described later.

On the other hand, if "NO" is determined in the step S223, that is, if the second index image 330 does not reach the trailing end of the operation section 322*a*, 322*b*, 322*c* or 322*d* in which the same is being moved, it is determined, in a step S231, whether the number of the direction inputs detected in the operation section 322a, 322b, 322c or 322d in which the second index image 330 is being moved reaches a predetermined number (for example, 10). If "NO" is determined in the step S231, that is, if the number of the direction inputs detected in the operation section 322a, 322b, 322c or 322d in which the second index image 330 is being moved does not reach the predetermined number, the process returns to the game controlling processing. On the other hand, if "YES" is determined in the step S231, that is, if the number of the direction inputs detected in the operation section 322a, 322b, 322c or 322d in which the second index image 330 is being moved has reached the predetermined number, a single section direction input that the predetermined number of the direction inputs detected in the operation section 322a, 322b, 322c or 322d are unified is determined in step S233, and a strength level of the determined single section direction input is classified in a step S235, and then, the process returns to the game controlling processing.

Moreover, if "YES" is determined in the step S217, that is, if the direction input period expires, it is determined whether it is during a lottery period of deviation in a step S237 shown in FIG. 31. If "YES" is determined in the step S237, that is, if it is during the lottery period of deviation, a position of the designation image 328 is changed at random in a step S239, and the process returns to the game controlling processing.

On the other hand, if "NO" is determined in the step S237, that is, if it is not during the lottery period of deviation, it is determined, in a step S241, whether it is an end of the lottery period of deviation. If "NO" is determined in the step S241, that is, if it is not an end of the lottery period of deviation, it is determined that the lottery period of deviation is not started, and therefore, the lottery period of deviation is started in a step S243. In a next step S245, for each of the moving frames of the correspondence table, the correspondence range that affects the trajectory of the ball 306 is determined, and a swing motion of the player character 302 is started in a step S247, and then, the process returns to the game controlling processing.

Moreover, if "YES" is determined in the step S241, that is, if it is an end of the lottery period of deviation, the deviation is determined in a step S249, the second parameter determination flag 854p is turned off in a step S251, and then, the process returns to game controlling processing. In the step S249, the processor 81 stores the deviation data 854f corresponding to the determined deviation to the data storage area 854.

In addition, the single section direction input determined in the step S233 shown in FIG. 30 is used for displaying the arrow image 332 in the operation section 322a, 322b, 322c or 322d during the time that the second index image 330 is moved to the trailing end of the operation section 322a, 322b, 322c or 322d.

As shown in FIG. 32, when the ball movement processing shown in the step S47 is started, the processor 81 determines, in a step S301, whether the ball 306 is being moved (during movement). If "YES" is determined in the step S301, that is, if the ball 306 is being moved, it is determined, in a step S303, whether the ball 306 collides a background object. That is, the processor 81 determines whether the ball 306 is landed onto the ground objects such as fairway, rough, bunker, etc., or whether the ball 306 collides the water hazard or the object in the OB zone, or whether the ball 306 collides the object on the ground such as tree, building, etc., or the object in the air such as airship, balloon, block, etc.

If "NO" is determined in the step S303, that is, if the ball 306 does not collide the background object, the process proceeds to a step S317 shown in FIG. 33. On the other hand, if "YES" is determined in the step S303, that is, if the ball 306 collides the background object, movement stop processing as described above is executed in a step S305, and the process returns to the game controlling processing.

Moreover, if "NO" is determined in the step S301, that is, if the ball 306 is not being moved, it is determined, in a step S307, whether it is prior to a start of movement of the ball 306. If "NO" is determined in the step S307, that is, if it is not prior to a start of movement of the ball 306, it is determined, in a step S309, whether the ball is cupped-in assuming that the ball 306 is stopped.

If "NO" is determined in the step S309, that is, if the ball 306 is not cupped-in, the process proceeds to a step S313. On the other hand, if "YES" is determined in the step S309, that is, if the ball 306 is cupped-in, the cup-in flag 900e is turned on in a step S311, and then, the process proceeds to the step S313. In the step S313, the ball movement flag 854q is turned off, and the process returns to the game controlling processing.

In addition, by executing the processing of the step S313, the ball 306 becomes to be not during movement.

Moreover, if "YES" is determined in the step S307, that is, if it is prior to a start of movement of the ball 306, the variable n is set to 1 (one) (n=1) in a step S315, and the process proceeds to a step S321 shown in FIG. 33. The variable n is indicative of the number of moving frames in the correspondence table.

As shown in FIG. 33, in a step S317, it is determined whether the variable n exceeds the maximum value $n_{max}$. If "NO" is determined in the step S317, that is, if the variable n does not exceed the maximum value $n_{max}$, the process proceeds to a step S325. On the other hand, if "YES" is determined in the step S317, that is, if the variable n exceeds the maximum value $n_{max}$, in a step S319, the position of the ball 306 after movement by one frame is calculated with using the velocity vector calculated at the time that the variable n is the maximum value $n_{max}$, and then, the process returns to the game controlling processing.

Moreover, in a step S321, it is determined whether there is any deviation. If "NO" is determined in the step S321, that is, if there is no deviation, the process proceeds to a step S325. On the other hand, if "YES" is determined in the step S321, that is, if there is deviation, the launch direction of the ball 306 is changed according to deviation in a step S323, and the process proceeds to the step S325.

In the step S325, the operation section 322a, 322b, 322c or 322d that the direction inputs of the number p of operation frames of the position corresponding to the number n of moving frames are detected and the arrow image 332 in that operation section 322a, 322b, 322c or 322d are determined as the highlighting target. In a next step S327, the position of the ball 306 after movement by one frame is calculated with reflecting a direction that a plurality of section direction inputs in the correspondence range corresponding to the number n of moving frames are averaged. Then, the variable n is incremented by 1 (one) (n=n+1) in a step S329, and the process returns to the game controlling processing.

According to this embodiment, since it is possible to move the ball in a direction based on a temporal direction inputs detected during a time until the player character starts the swing motion after the hitting power is determined, that is, since it is possible to move the ball with reflecting the temporal direction inputs into the trajectory temporally, it is possible to make the player be interested in the direction input itself and in the change of the trajectory of the ball after the movement. That is, it is possible to make the player be interest in the game continuously. Therefore, the interest of game can be increased.

In addition, although the hitting power when hitting the ball is determined dependent on the position that the first index image is stopped, the initial velocity of the ball, the horizontal arrival distance of the ball or the movement distance of the ball may be determined. That is, according to the position that the first index image is stopped, any of the parameters on the movement distance of the ball is determined.

Moreover, although the movement gauge is displayed on a position determined in advance and the first index image and the second index image are moved inside the movement gauge in this embodiment, it does not need to be limited to this. It is conceivable the following. Without displaying the movement gauge in advance, and a gauge (or bar) is displayed so as to be gradually extended to an another side end from an initial position, and the extension of the gauge is stopped in response to an operation of the player, thereby to determine the hitting power, and an index image equivalent to the second index image is moved from the initial position up to the upper end of the gauge inside or along the gauge being displayed for determining hitting power, and the trajectory of the ball is changed based on direction inputs detected during that time.

Furthermore, in this embodiment, using the section direction input that the direction inputs detected during the direction input period are unified for each section, the arrow image is displayed and the whole or a part of the trajectory is changed, but it does not need to be limited to this. In other embodiments, a calculation method of the section direction input may differ in a case of displaying the arrow image and in a case of changing the trajectory from each other. As an example, the average value is calculated described in the embodiment when displaying the arrow image, but when changing the trajectory, a direction input having a maximum tilt amount out of a plurality of direction inputs in the operation section is calculated (or derived). Moreover, even when the average value is calculated, the number of the direction inputs used for calculating the average value may be different in a case of displaying the arrow image and in a case of changing the trajectory from each other.

Furthermore, although the second index image is moved from the lower end of the movement gauge to the position that first index image is stopped in this embodiment, the second index image may be moved from the lower end to the upper end of the movement gauge. Even in this case, the direction input period is a period of time until the second index image is stopped at the position that the first index image is stopped from the lower end of the movement gauge. However, the direction input period may be a period of time that the second index image is moved up to the upper end from the lower end of the movement gauge. That is, a fixed direction input period may be provided irrespective of the position that the first index image is stopped.

Moreover, although the average value of all the direction inputs in each of the operation sections is calculated for each operation section in this embodiment, it does not need to be limited to this. In other embodiments, it may be possible to determine the direction input detected at a predetermined timing in the section as the direction input for each section.

Furthermore, in this embodiment, the movement gauge is divided evenly, but it is not necessary to divide the movement gauge evenly. For example, the movement gauge may be set to become longer toward the fourth operation section from the first operation section.

Furthermore, in this embodiment, the movement gauge is divided into the four operation sections, but if the operation sections are two or more, the movement gauge may be divided into five or more. However, since the number of operation times for changing the trajectory of the ball for one stroke becomes larger as the number of the operation sections becomes larger, as the difficulty of the game or the level of the player becomes higher, the number of divisions of the movement gauge may be increased. In this case, the movement gauge is not divided at the beginning of the game, and if the difficulty of the game or the level of the player becomes higher to some extent, the movement gauge is divided into two, and the number of divisions may be gradually increased as the difficulty of the game or the level of the player becomes further higher. Moreover, the number that the movement gauge is divided may be set according to the ability such as the type of the character that the player uses, the level of the character and so on. Furthermore, the number of divisions of the movement gauge may be set according to an item used by the player or the player character. Moreover, the player may be able to set a desired number of divisions.

Moreover, although the movement gauge is made in a shape that has breadth and is extended in a longitudinal direction in this embodiment, it does not need to be limited to this. The movement gauge is made in a shape prolonged in a horizontal direction, or may be formed in an L-letter shape with rounded corner. That is, the movement gauge may be a shape that the first index image and the second index image can be moved from one end toward the other end.

Furthermore, although the movement gauge is displayed on the fixed position in this embodiment, it does not need to be limited to this. In other embodiments, the first index image may be displayed in an arbitrary position that does not become an obstacle of the background image when an operation for the second parameter determination is started, and the second index image may be moved in a predetermined direction (for example, in an upper direction) from an initial position when a position that the first index image is first displayed is regarded as the initial position. However, a movable range (length) is determined in advance as similar to the movement gauge shown in the embodiment.

Furthermore, although lines in sides of trailing ends of respective areas are slanted in the movement gauge in this embodiment, it is not necessary to make slant. In this case, the movement distance may be or may not be changed according to the deviation.

Moreover, although the first index image and the designation image are formed as separate images in this embodiment, it does not need to be limited to this. For example, a point image that functions as the first index image and the designation image is displayed, and the point image may be moved in a long side direction inside the movement gauge when the hitting power is to be determined, and when the deviation is to be determined, the point image may be moved in a short side direction inside the movement gauge.

Furthermore, although the risk area is provided outside the basic area of the movement gauge in this embodiment, the risk area may be formed inside the basic area. In such a case, the risk area is enlarged so that the deviation rate and the deviation amount increase as the hitting power is increased.

Furthermore, in this embodiment, there is deviation even within the basic area of the movement gauge, but in other embodiments, there may be no deviation within the basic area and there may be deviation within the risk area.

Moreover, in this embodiment, the deviation is determined when the direction input period expires, but the deviation may be determined at arbitrary timing prior to a movement start of the ball after the hitting power is determined.

Furthermore, although deviation is determined by a lottery in this embodiment, it does not need to be limited to this. Movement of the designation image may be stopped according to an operation of the player, whereby the position of the designation image, that is, deviation may be determined.

Furthermore, although the hitting power is determined according to the position that the first index image is stopped in this embodiment, the hitting power may be determined according to a position of the designation image at the time that the deviation is determined. Since the first index image is slanted as it goes to the trailing end of the movement gauge as described above and the magnitude of the hitting power is changed according to the deviation, the horizontal arrival distance of the reference trajectory is changed. Even in this way, it is possible to change the movement distance dependent on the difference between a draw ball and a fade ball.

Moreover, although the first index image and the second index image are moved inside the movement gauge, the color of the move portion is change accordingly, it is not necessary to change the color.

Furthermore, although an operation input is performed by operating the operating button and the analog stick of the controller(s) in this embodiment, it does not need to be limited to this. In other embodiments, a motion sensor such as a gyro-sensor (2 axes or 3 axes) is provided on the controller, and an operation input may be performed by holding and swinging by the player the controller (either one of the left controller 3 and the right controller 4) removed from the main body apparatus 2. That is, the hitting power and the trajectory of the ball are determined at once by an operation that the player moves the controller. In this case, the gyro-sensor detects a magnitude of a swing when the player swings up the controller from an address state, and detects a rotation angle of a wrist from a position of the controller that is swung up to a position that the controller is swung down to return to the address state position. As an example, the hitting power is determined by the magnitude of swing up of the controller. Moreover, a time change of a rotation angle of the wrist at the time of swinging correctly (hereinafter, referred to as "reference rotation angle") is stored in advance, and a type of the trajectory of the ball (for example, draw, fade, hook, slice) is determined based on the difference between the reference rotation angle and the rotation angle of the wrist when the player moves the controller. According to this determination result, the arrow image that is determined in advance according to the type of trajectory of the ball is displayed in the movement gauge, and the ball is moved according to the determined trajectory. However, the launch angle of the ball is determined by the selected club. Moreover, by providing an acceleration sensor, the acceleration of the controller when the controller is swung down and returned to the position of the address state may be detected so as to be converted into the hitting power.

Furthermore, this embodiment is described on the golf game, but is applicable to other sport games. As other sports, soccer, baseball, tennis, volleyball, bowling, badminton, etc. correspond. In a case of soccer, a trajectory of a ball that is kicked in the scene of shooting or free kick may be changed according to a temporal direction input. Moreover, in a case of baseball, a trajectory of a ball that a pitcher pitches or a butter hits may be changed according to a temporal direction input. Furthermore, in a case of tennis or volleyball, a trajectory of a ball that is hit by a hand or a racket may be changed according to a temporal direction input. In a case of bowling, a trajectory of a ball that is throwed, like the pitcher of baseball, may be changed according to a temporal direction input. In a case of badminton, a trajectory of a shuttle that is hit by a racket, like tennis, may be changed according to a temporal direction input.

Moreover, although the game system 1 is shown as an example of an information processing system in the above-described embodiment, its configuration should not be limited, and other configurations may be adopted. For example, in the above-described embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Furthermore, in other embodiments, a server on a network such as the internet may execute a part (S5-S9) of the overall game processing. In such a case, the processor 81 of the main body apparatus 2 transmits the operation data received from the left controller 3 and the right controller 4 to the above-described server via the network communication section 82 and the network, receives a result of execution of a part of the overall game processing by the server (i.e., game image data and the game sound data), thereby displaying the game image on the display 12 and outputting the game sound from the speaker 88. That is, it is possible to constitute the information processing system including the game system 1 shown in the above-described embodiment and the server on the network.

Moreover, although a case where the game image is displayed on the display 12 is described in the above-described embodiment, it does not need to be limited to this. The game image can be displayed also on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, and an information processing such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

For example, determination of the deviation may be performed prior to an end of detection of the direction input after the hitting power is determined, or prior to hitting the ball after the player character starts the swing motion.

Moreover, the second parameter determination processing includes processing (S203-S209) that determines the hitting power, the processing (S217-S221) that detects the direction input by the player, and the processing that determines the deviation (S237-S243, S249), but may include only the processing that detects the direction input by the player. In such a case, the processing that determines the hitting power and the processing that determines the deviation may be omitted, for example, or may be executed prior to the second parameter determination processing as further parameter determination processing (for example, third parameter determination processing).

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium storing a game program, which is for a sports game advanceable by moving a moving object according to a player operation, executable by a computer provided with one or more processors, wherein the game program causes the one or more processors to provide execution comprising:
   receiving a first direction input, for changing a trajectory of a moving object, at a first timing prior to starting movement of the moving object;
   receiving a second direction input, for changing the trajectory of the moving object, at a second timing after the first timing and prior to starting the movement of the moving object;
   determining a parameter for moving the moving object according to, at least, the first direction input and the second direction input;
   detecting, during a predetermined period of time while the parameter is being determined, and that includes the first timing and the second timing, a player operation indicative of a temporal direction input for determining the change of the trajectory after starting of the movement of the moving object;
   moving the moving object based on a detected player operation indicative of the temporal direction input after determining the parameter while reflecting the temporal direction input onto the trajectory;
   changing the trajectory of the moving object to move in a first direction, based on the first direction input, at a third timing after the second timing and after starting the movement of the moving object; and
   changing the trajectory of the moving object to move in a second direction, based on the second direction input, at a fourth timing after the third timing and after starting the movement of the moving object.

2. The storage medium according to the claim 1, wherein the game program further causes the one or more processors to provide execution comprising:
   setting a movement distance parameter related to a movement distance of the moving object, and
   making the predetermined period of time longer as a set movement distance parameter is larger.

3. The storage medium according to the claim 2, wherein the game program further causes the one or more processors to provide execution comprising:
   enabling to increase ability associated with an object used by a player character and related to movement of the moving object from a next time by satisfying a predetermined condition, the predetermined condition including that the movement distance parameter that is set in the setting is less than a predetermined value.

4. The storage medium according to the claim 1, wherein the game program further causes the one or more processors to provide execution comprising:
   setting a movement distance parameter related to a movement distance of the moving object;
   moving a first index indicative of the movement distance parameter toward one end from an initial position;
   stopping the first index according to an operation of the player; and
   making the predetermined period of time longer as a distance between the initial position and a stop position that the first index is stopped is larger.

5. The storage medium according to the claim 4, wherein the game program further causes the one or more processors to provide execution comprising:
   moving a second index for the temporal direction input toward at least the stop position from the initial position when the movement distance parameter is made to be set; and
   detecting a player operation indicative of the temporal direction input until the second index is moved from the initial position to the stop position.

6. The storage medium according to the claim 5, wherein the game program further causes the one or more processors to provide execution comprising:
   displaying a designation image indicative of a detected temporal direction input on a display portion, superposed with or along a movement path of the second index.

7. The storage medium according to the claim 6, wherein the game program further causes the one or more processors to provide execution comprising:
   displaying the designation image by a number smaller than a number of the temporal direction inputs represented by the detected player operation.

8. The storage medium according to the claim 6, wherein the designation image indicates a section direction input that is a single direction input determined, in each of a plurality of sections in the predetermined period of time, based on a plurality of temporal direction inputs.

9. The storage medium according to the claim 8, wherein the game program further causes the one or more processors to provide execution comprising:
   determining the section direction input based on strength of a plurality of temporal direction inputs in the section;
   applying strenth that is determined based on the strength of the temporal direction input to the section direction input designated by the designation image; and
   classifying applied strength into a plurality of classifications that are set according to strength.

10. The storage medium according to the claim 8, wherein the game program further causes the one or more processors to provide execution comprising:
   on assumption that a distance that the first index is moved from the initial position to a position that the first index is stopped corresponds to a straight-line distance of the reference trajectory of the moving object, reflecting changes due to a plurality of temporal direction inputs within a target section including a position corresponding to a position of the reference trajectory in a time from the moving object starts moving into the trajectory of the moving object.

11. The storage medium according to the claim 10, wherein the game program further causes the one or more processors to provide execution comprising:
  replacing each of the plurality of temporal direction inputs with a corresponding section direction input for each of the plurality of sections; and
  reflecting changes due to a predetermined number of section direction inputs including the section direction input of a position corresponding to a position of the reference trajectory in a time from the moving object starts moving into the trajectory of the moving object.

12. The storage medium according to the claim 11, wherein the game program further causes the one or more processors to provide execution comprising:
  determining the section direction input based on the strength of the plurality of temporal direction inputs in the section; and
  reflecting the change due to the section direction input into the trajectory of the moving object by using the strength.

13. The storage medium according to the claim 6, wherein the game program further causes the one or more processors to provide execution comprising:
  displaying a gauge for determining the stop position of the first index on the display portion, the gauge including the initial position and the one end for moving the first index, and being divided in advance corresponding to a plurality of sections; and
  displaying the designation image for each of divided areas of the gauge.

14. The storage medium according to the claim 13, wherein the game program further causes the one or more processors to provide execution comprising:
  shortening the predetermined period of time in a case where the first index is stopped in a middle of the divided area in comparison with a case where the first index is stopped at a trailing end of the division area.

15. The storage medium according to the claim 13, wherein the game program further causes the one or more processors to provide execution comprising:
  reducing or expanding the gauge according to progress of the sports game; and
  moving the second index at a speed in proportion to length that is reduce or expanded.

16. The storage medium according to the claim 6, wherein the game program further causes the one or more processors to provide execution comprising:
  setting a number of the plurality of sections according to at least one of a type of a character that the player uses, ability of the character and an item that the character uses.

17. The storage medium according to claim 1, wherein the game program further causes the one or more processors to provide execution comprising:
  displaying a designation image indicative of a detected temporal direction input, wherein
  the designation image indicates a section direction input including a single direction input determined, in each of a plurality of sections in a predetermined period of time, based on a plurality of temporal direction inputs.

18. The storage medium according to claim 1, wherein a designation image is displayed having at least a first section and a second section,
  the first section displaying indication corresponding to the first direction input, and
  the second section displaying indication corresponding to the second direction input.

19. A game apparatus configured to execute a sports game, the game apparatus comprising:
  a processor; and
  a memory configured to store computer readable instructions that, when executed by the processor, cause the game apparatus to:
    receive a first direction input, for changing a trajectory of a moving object, at a first timing prior to starting movement of the moving object;
    receive a second direction input, for changing the trajectory of the moving object, at a second timing after the first timing and prior to starting the movement of the moving object;
    determine a parameter for moving the moving object according to, at least, the first direction input and the second direction input;
    detect, during a predetermined period of time while the parameter is being determined, and that includes the first timing and the second timing, a player operation indicative of a temporal direction input for determining the change of the trajectory after starting of the movement of the moving object;
    move the moving object based on the detected palyer operation indicative of the temporal direction input after determining the parameter while reflecting the temporal direction input onto the trajectory;
    change the trajectory of the moving object to move in a first direction, based on the first direction input, at a third timing after the second timing and after starting the movement of the moving object; and
    change the trajectory of the moving object to move in a second direction, based on the second direction input, at a fourth timing after the third timing and after starting the movement of the moving object.

20. A game control method of a computer configured to execute a sports game, the game control method comprising:
  receiving a first direction input, for changing a trajectory of a moving object, at a first timing prior to starting movement of the moving object;
  receiving a second direction input, for changing the trajectory of the moving object, at a second timing after the first timing and prior to starting the movement of the moving object;
  determining a parameter for moving the moving object according to, at least, the first direction input and the second direction input;
  detecting, during a predetermined period while the parameter is being determined, and that includes the first timing and the second timing, a player operation indicative of a temporal direction input for determining the change of the trajectory after starting of the movement of the moving object;
  moving the moving object based on the detected player operation indicative of the temporal direction input after determining the parameter while reflecting the temporal direction input onto the trajectory;
  changing the trajectory of the moving object to move in a first direction, based on the first direction input, at a third timing after the second timing and after starting the movement of the moving object; and
  changing the trajectory of the moving object to move in a second direction, based on the second direction input, at a fourth timing after the third timing and after starting the movement of the moving object.

* * * * *